US012591115B2

(12) United States Patent
Chen et al.

(10) Patent No.: US 12,591,115 B2
(45) Date of Patent: Mar. 31, 2026

(54) OPTICAL IMAGING LENS ASSEMBLY, IMAGE CAPTURING UNIT AND ELECTRONIC DEVICE

(71) Applicant: LARGAN PRECISION CO., LTD., Taichung City (TW)

(72) Inventors: Chun-Yen Chen, Taichung City (TW); Tzu-Chieh Kuo, Taichung City (TW)

(73) Assignee: LARGAN PRECISION CO., LTD., Taichung City (TW)

( * ) Notice: Subject to any disclaimer, the term of this patent is extended or adjusted under 35 U.S.C. 154(b) by 333 days.

(21) Appl. No.: 18/403,062

(22) Filed: Jan. 3, 2024

(65) Prior Publication Data

US 2025/0189763 A1     Jun. 12, 2025

(30) Foreign Application Priority Data

Dec. 8, 2023     (TW) ................................. 112147913

(51) Int. Cl.
| *G02B 13/00* | (2006.01) |
| *G02B 9/60* | (2006.01) |
| *G03B 30/00* | (2021.01) |

(52) U.S. Cl.
CPC ........... *G02B 13/0045* (2013.01); *G02B 9/60* (2013.01); *G03B 30/00* (2021.01)

(58) Field of Classification Search
None
See application file for complete search history.

(56) References Cited

U.S. PATENT DOCUMENTS

| 2010/0046096 A1 | 2/2010 | Hirao et al. |
| 2010/0166413 A1 | 7/2010 | Hirao et al. |
| 2010/0321794 A1 | 12/2010 | Hirao et al. |
| 2011/0001865 A1 | 1/2011 | Hirao et al. |
| 2017/0139184 A1 | 5/2017 | Bae |
| 2020/0241247 A1 | 7/2020 | Zhang et al. |
| 2022/0026677 A1 | 1/2022 | Zhu |
| 2022/0035131 A1 | 2/2022 | Ke et al. |
| 2023/0305270 A1 | 9/2023 | Hsueh et al. |
| 2025/0093621 A1* | 3/2025 | Liu ........................ G02B 13/00 |

FOREIGN PATENT DOCUMENTS

| CN | 106324808 A | 1/2017 |
| CN | 113433677 A | 9/2021 |
| CN | 114326029 A | 4/2022 |

OTHER PUBLICATIONS

TW Office Action dated Aug. 2, 2024 in application 112147913.

* cited by examiner

*Primary Examiner* — Richard H Kim
(74) *Attorney, Agent, or Firm* — Maschoff Brennan

(57) ABSTRACT

An optical imaging lens assembly includes five lens elements which are, in order from an object side to an image side along an optical path: a first lens element, a second lens element, a third lens element, a fourth lens element and a fifth lens element. The first lens element has an image-side surface being concave in a paraxial region thereof. The second lens element has an object-side surface being concave in a paraxial region thereof. The third lens element has an object-side surface being concave in a paraxial region thereof. The fourth lens element with positive refractive power has an object-side surface being convex in a paraxial region thereof and an image-side surface being concave in a paraxial region thereof. At least one surface of at least one lens element in the optical imaging lens assembly has at least one critical point in an off-axis region thereof.

21 Claims, 24 Drawing Sheets

OPTICAL IMAGING LENS ASSEMBLY, IMAGE CAPTURING UNIT AND ELECTRONIC DEVICE

RELATED APPLICATIONS

This application claims priority to Taiwan Application 112147913, filed on Dec. 8, 2023, which is incorporated by reference herein in its entirety.

BACKGROUND

Technical Field

The present disclosure relates to an optical imaging lens assembly, an image capturing unit and an electronic device, more particularly to an optical imaging lens assembly and an image capturing unit applicable to an electronic device.

Description of Related Art

With the development of semiconductor manufacturing technology, the performance of image sensors has improved, and the pixel size thereof has been scaled down. Therefore, featuring high image quality becomes one of the indispensable features of an optical system nowadays.

Furthermore, due to the rapid changes in technology, electronic devices equipped with optical systems are trending towards multi-functionality for various applications, and therefore the functionality requirements for the optical systems have been increasing. However, it is difficult for a conventional optical system to obtain a balance among the requirements such as high image quality, low sensitivity, a proper aperture size, miniaturization and a desirable field of view.

SUMMARY

According to one aspect of the present disclosure, an optical imaging lens assembly includes five lens elements. The five lens elements are, in order from an object side to an image side along an optical path, a first lens element, a second lens element, a third lens element, a fourth lens element and a fifth lens element. Each of the five lens elements has an object-side surface facing toward the object side and an image-side surface facing toward the image side.

Preferably, the first lens element has positive refractive power. Preferably, the object-side surface of the first lens element is convex in a paraxial region thereof. Preferably, the image-side surface of the first lens element is concave in a paraxial region thereof. Preferably, the object-side surface of the second lens element is concave in a paraxial region thereof. Preferably, the object-side surface of the third lens element is concave in a paraxial region thereof. Preferably, the fourth lens element has positive refractive power. Preferably, the object-side surface of the fourth lens element is convex in a paraxial region thereof. Preferably, the image-side surface of the fourth lens element is concave in a paraxial region thereof. Preferably, the object-side surface of the fifth lens element is convex in a paraxial region thereof. Preferably, at least one surface of at least one lens element in the optical imaging lens assembly has at least one critical point in an off-axis region thereof.

When a curvature radius of the image-side surface of the first lens element is R2, a curvature radius of the object-side surface of the second lens element is R3, a curvature radius of the object-side surface of the third lens element is R5, and a central thickness of the third lens element is CT3, the following conditions are preferably satisfied:

$$R3/R2 < -1.1; \text{ and}$$

$$-25 < R5/CT3 < -5.0.$$

According to another aspect of the present disclosure, an optical imaging lens assembly includes five lens elements. The five lens elements are, in order from an object side to an image side along an optical path, a first lens element, a second lens element, a third lens element, a fourth lens element and a fifth lens element. Each of the five lens elements has an object-side surface facing toward the object side and an image-side surface facing toward the image side.

Preferably, the image-side surface of the first lens element is concave in a paraxial region thereof. Preferably, the object-side surface of the second lens element is concave in a paraxial region thereof. Preferably, the object-side surface of the third lens element is concave in a paraxial region thereof. Preferably, the fourth lens element has positive refractive power. Preferably, the object-side surface of the fourth lens element is convex in a paraxial region thereof. Preferably, the image-side surface of the fourth lens element is concave in a paraxial region thereof. Preferably, the image-side surface of the fifth lens element is concave in a paraxial region thereof. Preferably, at least one surface of at least one lens element in the optical imaging lens assembly has at least one critical point in an off-axis region thereof.

When a curvature radius of the image-side surface of the first lens element is R2, a curvature radius of the object-side surface of the second lens element is R3, a curvature radius of the object-side surface of the third lens element is R5, and the central thickness of the third lens element is CT3, the following conditions are preferably satisfied:

$$R3/R2 < -1.1; \text{ and}$$

$$-16 < R5/CT3 < -5.0.$$

According to another aspect of the present disclosure, an image capturing unit includes one of the aforementioned optical imaging lens assemblies and an image sensor, wherein the image sensor is disposed on an image surface of the optical imaging lens assembly.

According to another aspect of the present disclosure, an electronic device includes the aforementioned image capturing unit.

BRIEF DESCRIPTION OF THE DRAWINGS

The disclosure can be better understood by reading the following detailed description of the embodiments, with reference made to the accompanying drawings as follows.

DETAILED DESCRIPTION

An optical imaging lens assembly includes five lens elements. The five lens elements are, in order from an object side to an image side along an optical path, a first lens element, a second lens element, a third lens element, a fourth lens element and a fifth lens element. Each of the five lens elements of the optical imaging lens assembly has an object-side surface facing toward the object side and an image-side surface facing toward the image side.

The first lens element can have positive refractive power. Therefore, it is favorable for reducing the size of the object side of the optical imaging lens assembly. The object-side surface of the first lens element can be convex in a paraxial region thereof. Therefore, it is favorable for increasing the field of view. The image-side surface of the first lens element is concave in a paraxial region thereof. Therefore, it is favorable for adjusting the surface shape of the first lens element so as to correct aberrations such as astigmatism.

The second lens element can have negative refractive power. Therefore, it is favorable for balancing the refractive power distribution at the object side of the optical imaging lens assembly so as to correct aberrations such as spherical aberration. The object-side surface of the second lens element is concave in a paraxial region thereof. Therefore, it is favorable for increasing the field of view and reducing the outer diameter at the object side of the optical imaging lens assembly.

The object-side surface of the third lens element is concave in a paraxial region thereof. Therefore, it is favorable for balancing the size distribution between the object side and the image side of the optical imaging lens assembly. The image-side surface of the third lens element can be convex in a paraxial region thereof. Therefore, it is favorable for adjusting the travelling direction of light so as to reduce surface reflection.

The fourth lens element has positive refractive power. Therefore, it is favorable for reducing the size of the image side of the optical imaging lens assembly. The object-side surface of the fourth lens element is convex in a paraxial region thereof. Therefore, it is favorable for the fourth lens element to be collaborated with the third lens element so as to correct aberrations. The image-side surface of the fourth lens element is concave in a paraxial region thereof. Therefore, it is favorable for adjusting the surface shape and refractive power of the fourth lens element so as to correct aberrations.

The object-side surface of the fifth lens element can be convex in a paraxial region thereof. Therefore, it is favorable for reducing the length of the image side of the optical imaging lens assembly. The image-side surface of the fifth lens element can be concave in a paraxial region thereof. Therefore, it is favorable for reducing the back focal length.

Figure 21:
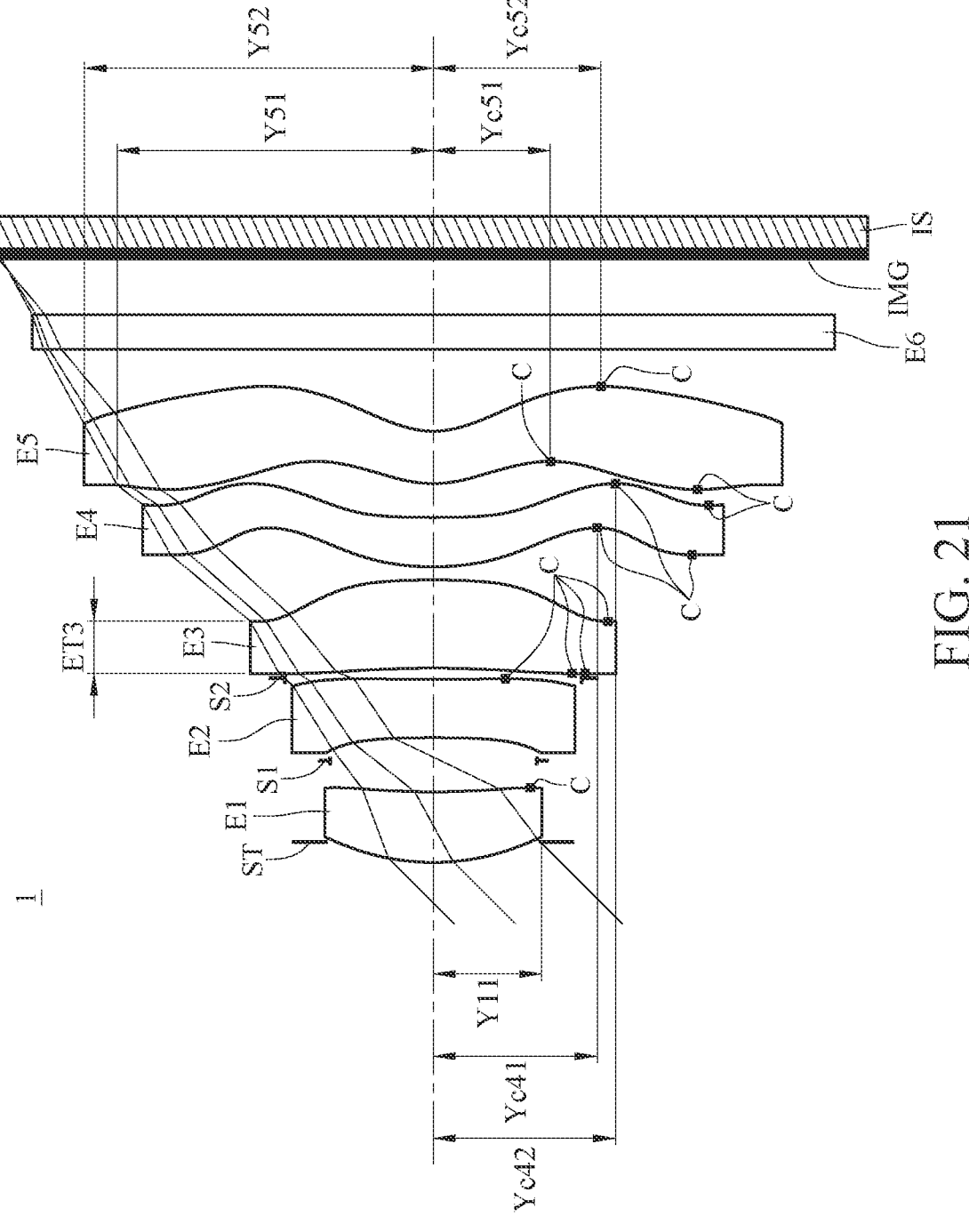
FIG. 21 shows a schematic view of critical points on lens surfaces and ET3, Y11, Y51, Y52, Yc41, Yc42, Yc51 and Yc52 according to the 1st embodiment of the present disclosure.

Among the five lens elements of the optical imaging lens assembly, at least one lens element has at least one critical point in an off-axis region thereof. In detail, among the first lens element through the fifth lens element, one or more lens elements each have at least one critical point in an off-axis region thereof, and the said lens element having at least one critical point in the off-axis region thereof refers to a lens element in which at least one of the object-side surface and the image-side surface has at least one critical point in an off-axis region thereof. Therefore, it is favorable for increasing the shape variation of the lens element(s) so as to reduce size and improve image quality. Moreover, each of at least two of the five lens elements of the optical imaging lens assembly can have at least one critical point in an off-axis region thereof. Please refer to FIG. 21, which shows a schematic view of critical points C of the first lens element E1, the second lens element E2, the third lens element E3, the fourth lens element E4 and the fifth lens element E5 according to the 1st embodiment of the present disclosure. In FIG. 21, the image-side surface of the first lens element E1, the image-side surface of the second lens element E2, the image-side surface of the third lens element E3 and the image-side surface of the fifth lens element E5 each have one critical point C in an off-axis region thereof, and the object-side surface of the third lens element E3, the object-side surface and the image-side surface of the fourth lens element E4 and the object-side surface of the fifth lens element E5 each have two critical points C in an off-axis region thereof. The critical points of lens elements of 1st embodiment of the present disclosure shown in FIG. 21 are only exemplary. Each of the lens elements in various embodiments of the present disclosure can have one or more critical points in an off-axis region thereof.

The object-side surface of the fourth lens element can have at least one concave critical point in an off-axis region thereof. Therefore, it is favorable for adjusting the travelling direction of light so as to balance the size distribution between the object side and image side of the optical imaging lens assembly. Moreover, the image-side surface of the fourth lens element can have at least one convex critical point in an off-axis region thereof. Therefore, it is favorable for adjusting the travelling direction of light so as to enlarge the image surface. Moreover, when a vertical distance between a concave critical point on the object-side surface of the fourth lens element and an optical axis is Yc41, and a vertical distance between a convex critical point on the image-side surface of the fourth lens element and the optical axis is Yc42, the object-side surface of the fourth lens element can have at least one concave critical point in the off-axis region thereof and the image-side surface of the fourth lens element can have at least one convex critical point in the off-axis region thereof which satisfy the following condition: 0.70<Yc41/Yc42<1.2. Therefore, it is favorable for adjusting the surface shape of the fourth lens element so as to correct off-axis aberrations such as field curvature. Please refer to FIG. 21, which shows a schematic view of a non-axial concave critical point C on the object-side surface of the fourth lens element E4, a non-axial convex critical point C on the image-side surface of the fourth lens element E4, and Yc41 and Yc42 according to the 1st embodiment of the present disclosure. As shown in FIG. 21, the object-side surface of the fourth lens element E4 has one convex critical point C and one concave critical point C in the off-axis region thereof, and the image-side surface of the fourth lens element E4 also has one convex critical point C and one concave critical point C in the off-axis region thereof.

The object-side surface of the fifth lens element can have at least one concave critical point in an off-axis region thereof. Therefore, it is favorable for adjusting the incident angle of light on the fifth lens element so as to reduce surface reflection. Moreover, when a maximum effective radius of the object-side surface of the fifth lens element is Y51, and a vertical distance between a concave critical point on the object-side surface of the fifth lens element and the optical axis is Yc51, the object-side surface of the fifth lens element can have at least one concave critical point in the off-axis region thereof satisfying the following condition: 0.20<Yc51/Y51<0.60. Therefore, it is favorable for adjusting the surface shape of the fifth lens element so as to further improve image quality. Moreover, the image-side surface of the fifth lens element can have at least one convex critical point in an off-axis region thereof. Therefore, it is favorable for adjusting the incident angle of light on the image surface so as to increase illuminance at the wide field of view. Moreover, when a vertical distance between a convex critical point on the image-side surface of the fifth lens element and the optical axis is Yc52, and a maximum effective radius of the image-side surface of the fifth lens element is Y52, the image-side surface of the fifth lens element can have at least one convex critical point in the off-axis region thereof satisfying the following condition: 0.30<Yc52/Y52<0.70. Therefore, it is favorable for adjusting the surface shape of the fifth lens element so as to further improve image quality. Please refer to FIG. 21, which shows a schematic view of a non-axial concave critical point C on the object-side surface of the fifth lens element E5, a non-axial convex critical point C on the image-side surface of the fifth lens element E5, and Y51, Y52, Yc51 and Yc52 according to the 1st embodiment of the present disclosure. As shown in FIG. 21, the object-side surface of the fifth lens element E5 has one convex critical point C and one concave critical point C in an off-axis region thereof, and the image-side surface of the fifth lens element E5 has one convex critical point C in an off-axis region thereof.

When a curvature radius of the image-side surface of the first lens element is R2, and a curvature radius of the object-side surface of the second lens element is R3, the following condition(s) can be satisfied: −9.0<R3/R2 or R3/R2<−1.1. Therefore, it is favorable for the surface shape of the first lens element to be collaborated with that of the second lens element so as to correct aberrations. Moreover, the following condition can also be satisfied: −8.0<R3/R2. Moreover, the following condition can also be satisfied: −7.0<R3/R2. Moreover, the following condition can also be satisfied: −6.0<R3/R2. Moreover, the following condition can also be satisfied: −5.12≤R3/R2. Moreover, the following condition can also be satisfied: R3/R2<−1.2. Moreover, the following condition can also be satisfied: R3/R2<−1.3. Moreover, the following condition can also be satisfied: R3/R2≤−1.39. Moreover, the following condition can also be satisfied: −9.0<R3/R2<−1.2. Moreover, the following condition can also be satisfied: −5.12≤R3/R2≤−1.39.

When a central thickness of the third lens element is CT3, and a curvature radius of the object-side surface of the third lens element is R5, the following condition(s) can be satisfied: −25<R5/CT3 or R5/CT3<−5.0. Therefore, it is favorable for adjusting the surface shape of the third lens element so as to balance the size distribution between the object side and image side of the optical imaging lens assembly. Moreover, the following condition can also be satisfied: −20<R5/CT3. Moreover, the following condition can also be satisfied: −16<R5/CT3. Moreover, the following condition can also be satisfied: −14<R5/CT3. Moreover, the following condition can also be satisfied: −12.14≤R5/CT3. Moreover, the following condition can also be satisfied: R5/CT3<−5.5. Moreover, the following condition can also be satisfied: R5/CT3<−6.0. Moreover, the following condition can also be satisfied: R5/CT3≤−6.57. Moreover, the following condition can also be satisfied: −25<R5/CT3<−5.0. Moreover, the following condition can also be satisfied: −20<R5/CT3<−5.0. Moreover, the following condition can also be satisfied: −16<R5/CT3<−5.0. Moreover, the following condition can also be satisfied: −12.14≤R5/CT3≤−6.57.

When a central thickness of the first lens element is CT1, a central thickness of the second lens element is CT2, the central thickness of the third lens element is CT3, a central thickness of the fourth lens element is CT4, and a central thickness of the fifth lens element is CT5, the following condition can be satisfied: 1.0< (CT1+CT2+CT4+CT5)/CT3<4.5. Therefore, it is favorable for adjusting the distribution of lens elements so as to reduce the size of the optical imaging lens assembly. Moreover, the following condition can also be satisfied: 1.5<(CT1+CT2+CT4+CT5)/CT3<4.0. Moreover, the following condition can also be satisfied: 2.0< (CT1+CT2+CT4+CT5)/CT3<3.5.

When the central thickness of the third lens element is CT3, and a distance in parallel with the optical axis between a maximum effective radius position of the object-side surface of the third lens element and a maximum effective radius position of the image-side surface of the third lens element is ET3, the following condition can be satisfied: 1.3<CT3/ET3<2.4. Therefore, it is favorable for adjusting the surface shape of the third lens element so as to balance the size distribution between the object side and image side of the optical imaging lens assembly. Please refer to FIG. 21, which shows a schematic view of ET3 according to the 1st embodiment of the present disclosure.

When a curvature radius of the image-side surface of the fourth lens element is R8, and a curvature radius of the object-side surface of the fifth lens element is R9, the following condition can be satisfied: 6.5<R8/R9<14. Therefore, it is favorable for the surface shape of the fourth lens element to be collaborated with that of the fifth lens element so as to correct aberrations.

When a composite focal length of the first lens element and the second lens element is f12, and a composite focal length of the third lens element, the fourth lens element and the fifth lens element is f345, the following condition can be satisfied: 0.25<f12/f345<2.5. Therefore, it is favorable for adjusting the refractive power distribution of the optical imaging lens assembly so as to reduce sensitivity. Moreover, the following condition can also be satisfied: 0.50<f12/f345<1.9.

When a focal length of the second lens element is f2, and a focal length of the fourth lens element is f4, the following condition can be satisfied: f2/f4<−0.80. Therefore, it is favorable for adjusting the refractive power distribution of the optical imaging lens assembly so as to correct aberrations. Moreover, the following condition can also be satisfied: −4.0<f2/f4<−1.1. Moreover, the following condition can also be satisfied: −3.0<f2/f4<−1.3.

When the curvature radius of the object-side surface of the third lens element is R5, a curvature radius of the image-side surface of the third lens element is R6, and a focal length of the third lens element is f3, the following condition can be satisfied: (|R5|+|R6|)/|f3|<0.60. Therefore, it is favorable for adjusting the surface shape and refractive power of the third lens element so as to correct aberrations. Moreover, the following condition can also be satisfied: (|R5|+|R6|)/|f3|<0.48. Moreover, the following condition can also be satisfied: (|R5|+|R6|)/|f3|<0.36.

When half of a maximum field of view of the optical imaging lens assembly is HFOV, the following condition can be satisfied: 42.0 degrees<HFOV<51.0 degrees. Therefore, it is favorable for increasing the field of view and preventing aberrations, such as distortion, generated due to an overly large field of view.

When a maximum effective radius of the object-side surface of the first lens element is Y11, and a maximum effective radius of the image-side surface of the fifth lens element is Y52, the following condition can be satisfied: 2.7<Y52/Y11<4.0. Therefore, it is favorable for adjusting the travelling direction of light so as to obtain a proper balance between the field of view, the size of the image surface and the size distribution. Please refer to FIG. 21, which shows a schematic view of Y11 and Y52 according to the 1st embodiment of the present disclosure.

When an Abbe number of the first lens element is V1, and an Abbe number of the second lens element is V2, the following condition can be satisfied: 2.85<V1/V2<4.50. Therefore, it is favorable for the material of the first lens element to be collaborated with that of the second lens element so as to correct chromatic aberration.

When an axial distance between the object-side surface of the first lens element and the image surface is TL, and a maximum image height of the optical imaging lens assembly (which can be half of a diagonal length of an effective photosensitive area of an image sensor) is ImgH, the following condition can be satisfied: 1.1<TL/ImgH<1.5. Therefore, it is favorable for obtaining a balance between reduction in the total track length and enlargement of the image surface.

When an f-number of the optical imaging lens assembly is Fno, the following condition can be satisfied: 1.5<Fno<2.5. Therefore, it is favorable for obtaining a proper balance between the illuminance and depth of field. Moreover, the following condition can also be satisfied: 1.7<Fno<2.3.

When the central thickness of the second lens element is CT2, the central thickness of the third lens element is CT3, the central thickness of the fourth lens element is CT4, an axial distance between the second lens element and the third lens element is T23, and an axial distance between the third lens element and the fourth lens element is T34, the following condition can be satisfied: 4.0< (CT2+CT3+CT4)/(T23+T34)<15. Therefore, it is favorable for adjusting the distribution of lens elements so as to reduce the size of the optical imaging lens assembly. Moreover, the following condition can also be satisfied: 4.5<(CT2+CT3+CT4)/(T23+T34)<13.

When the central thickness of the third lens element is CT3, and the central thickness of the fourth lens element is CT4, the following condition can be satisfied: 1.1<CT3/CT4<3.5. Therefore, it is favorable for the third lens element to be collaborated with the fourth lens element so as to balance the size distribution of the image side of the optical imaging lens assembly. Moreover, the following condition can also be satisfied: 1.3<CT3/CT4<2.9. Moreover, the following condition can also be satisfied: 1.5<CT3/CT4<2.3.

When the focal length of the third lens element is f3, the focal length of the fourth lens element is f4, and a focal length of the fifth lens element is f5, the following condition can be satisfied: 0<f4/(|f3|+|f5|)<0.12. Therefore, it is favorable for balancing the refractive power distribution of the optical imaging lens assembly.

When a curvature radius of the object-side surface of the first lens element is R1, the curvature radius of the image-side surface of the first lens element is R2, and a focal length of the first lens element is f1, the following condition can be satisfied: 1.0< (R1+R2)/f1<2.3. Therefore, it is favorable for adjusting the surface shape and refractive power of the first lens element so as to reduce the outer diameter at the object side of the optical imaging lens assembly.

When a curvature radius of the object-side surface of the fourth lens element is R7, and the curvature radius of the image-side surface of the fourth lens element is R8, the following condition can be satisfied: −3.0< (R7+R8)/(R7−R8)<−1.4. Therefore, it is favorable for adjusting the surface shape of the fourth lens element so as to correct aberrations.

When the curvature radius of the object-side surface of the second lens element is R3, and the focal length of the second lens element is f2, the following condition can be satisfied: 0<R3/f2<6.0. Therefore, it is favorable for adjusting the surface shape and refractive power of the second lens element so as to correct aberrations. Moreover, the following condition can also be satisfied: 0.30<R3/f2<4.5.

When the maximum effective radius of the image-side surface of the fifth lens element is Y52, and a curvature radius of the image-side surface of the fifth lens element is R10, the following condition can be satisfied: 3.5<Y52/R10<4.5. Therefore, it is favorable for adjusting the surface shape of the fifth lens element so as to correct off-axis aberrations.

According to the present disclosure, the aforementioned features and conditions can be utilized in numerous combinations so as to achieve corresponding effects.

According to the present disclosure, the lens elements of the optical imaging lens assembly can be made of either glass or plastic material. When the lens elements are made of glass material, the refractive power distribution of the optical imaging lens assembly may be more flexible, and the influence on imaging caused by external environment temperature change may be reduced. The glass lens element can either be made by grinding or molding. When the lens elements are made of plastic material, the manufacturing costs can be effectively reduced. Furthermore, surfaces of each lens element can be arranged to be spherical or aspheric. Spherical lens elements are simple in manufacture. Aspheric lens element design allows more control variables for eliminating aberrations thereof and reducing the required number of lens elements, and the total track length of the optical imaging lens assembly can therefore be effectively shortened. Additionally, the aspheric surfaces may be formed by plastic injection molding or glass molding.

According to the present disclosure, when a lens surface is aspheric, it means that the lens surface has an aspheric shape throughout its optically effective area, or a portion(s) thereof.

According to the present disclosure, one or more of the lens elements' material may optionally include an additive which generates light absorption and interference effects and alters the lens elements' transmittance in a specific range of wavelength for a reduction in unwanted stray light or color deviation. For example, the additive may optionally filter out light in the wavelength range of 600 nm to 800 nm to reduce excessive red light and/or near infrared light; or may optionally filter out light in the wavelength range of 350 nm to 450 nm to reduce excessive blue light and/or near ultraviolet light from interfering the final image. The additive may be homogeneously mixed with a plastic material to be used in manufacturing a mixed-material lens element by injection molding. Moreover, the additive may be coated on the lens surfaces to provide the abovementioned effects.

According to the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly, unless otherwise stated, when the lens element has a convex surface, it indicates that the surface is convex in the paraxial region thereof; when the lens element has a concave surface, it indicates that the surface is concave in the paraxial region thereof. Moreover, when a region of refractive power or focus of a lens element is not defined, it indicates that the region of refractive power or focus of the lens element is in the paraxial region thereof.

According to the present disclosure, a critical point is a non-axial point of the lens surface where its tangent is perpendicular to the optical axis.

According to the present disclosure, the image surface of the optical imaging lens assembly, based on the corresponding image sensor, can be flat or curved, especially a curved surface being concave facing towards the object side of the optical imaging lens assembly.

According to the present disclosure, an image correction unit, such as a field flattener, can be optionally disposed between the lens element closest to the image side of the optical imaging lens assembly along the optical path and the image surface for correction of aberrations such as field curvature. The optical characteristics of the image correction unit, such as curvature, thickness, index of refraction, position and surface shape (convex or concave surface with spherical, aspheric, diffractive or Fresnel types), can be adjusted according to the design of the image capturing unit. In general, a preferable image correction unit is, for example, a thin transparent element having a concave object-side surface and a planar image-side surface, and the thin transparent element is disposed near the image surface.

Figure 22:
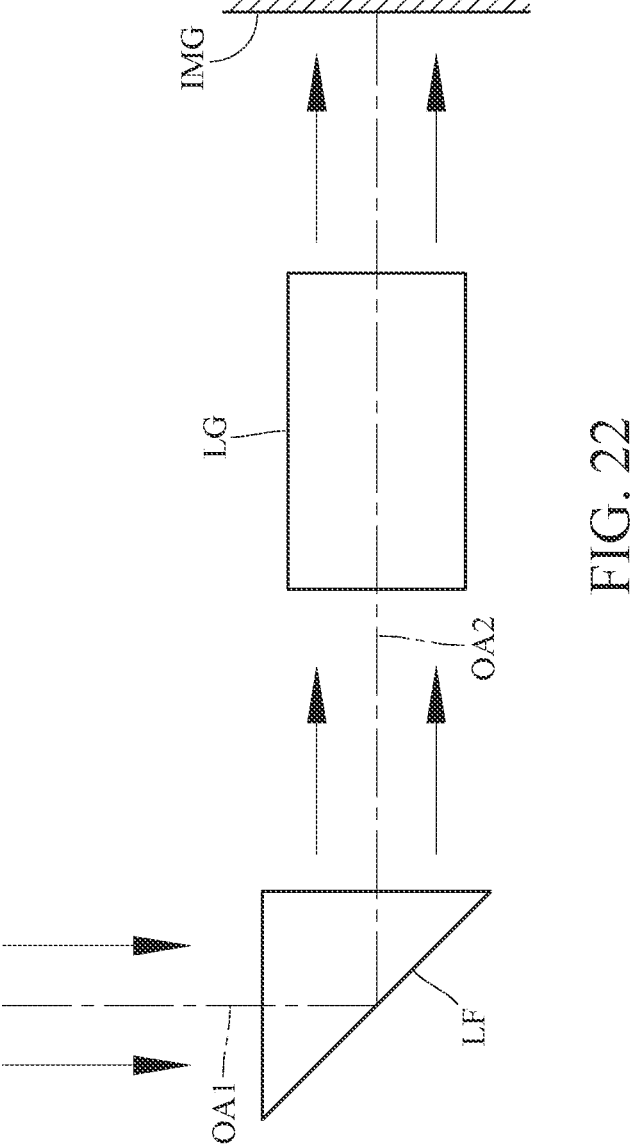
FIG. 22 shows a schematic view of a configuration of one light-folding element in an optical imaging lens assembly according to one embodiment of the present disclosure.
Figure 23:
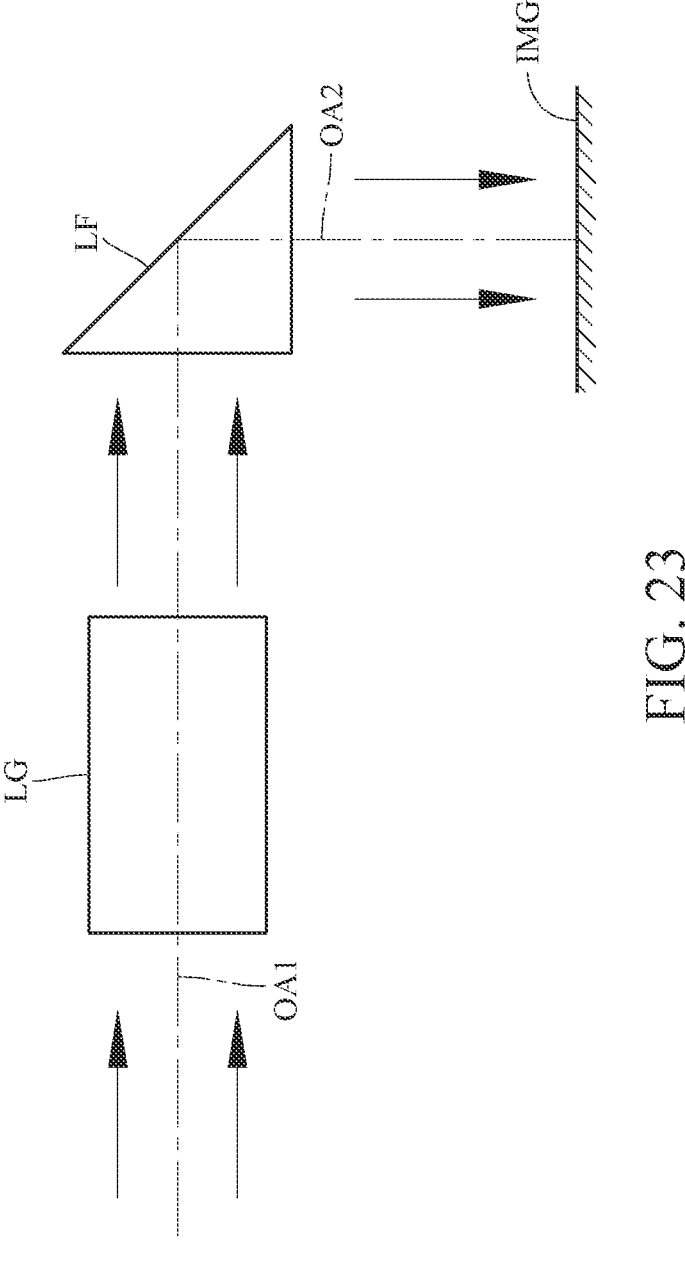
FIG. 23 shows a schematic view of another configuration of one light-folding element in an optical imaging lens assembly according to one embodiment of the present disclosure.
Figure 24:
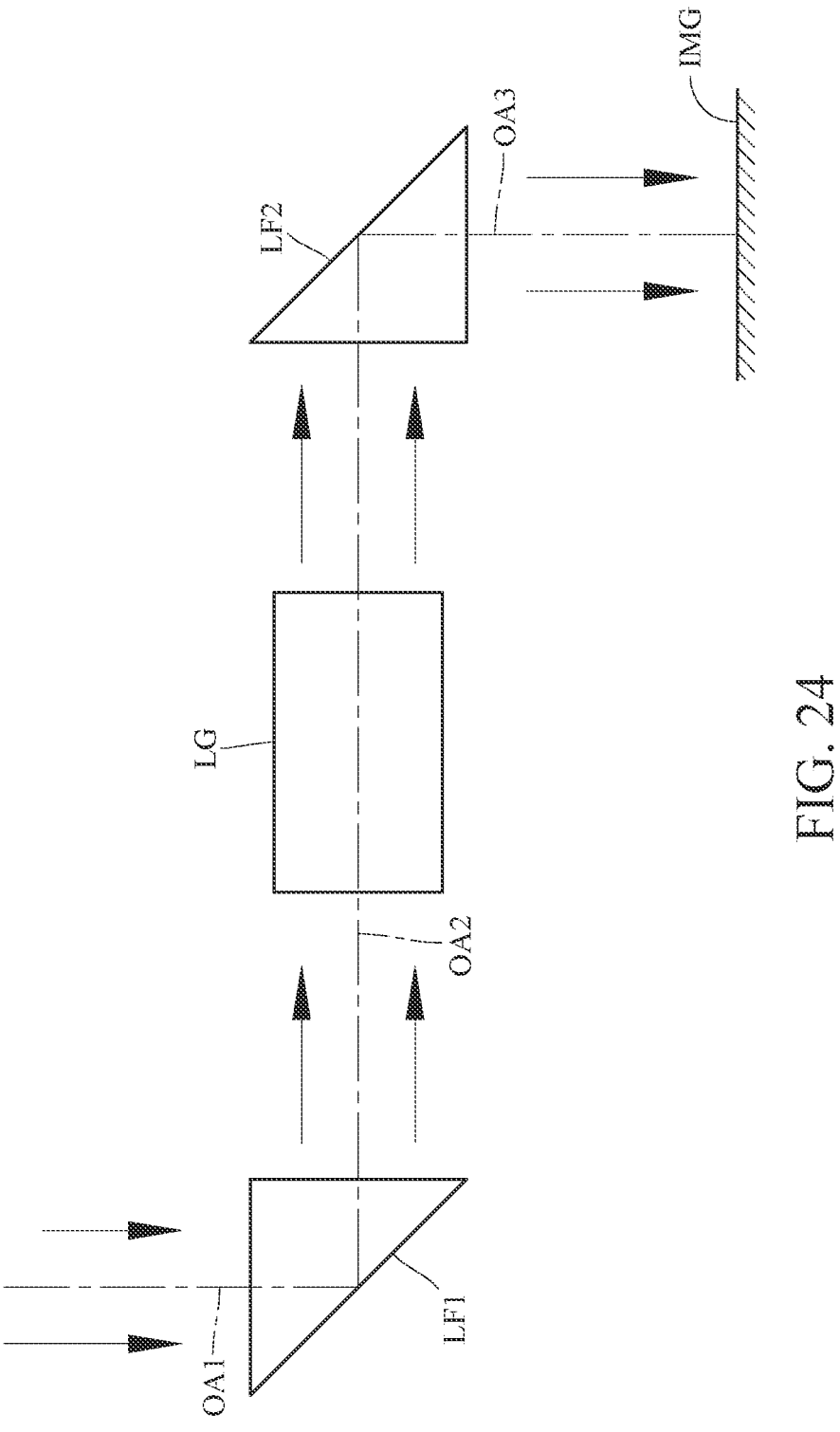
FIG. 24 shows a schematic view of a configuration of two light-folding elements in an optical imaging lens assembly according to one embodiment of the present disclosure.

According to the present disclosure, at least one light-folding element, such as a prism or a mirror, can be optionally provided between an imaged object and the image surface on the imaging optical path, and the surface shape of the prism or mirror can be planar, spherical, aspheric or freeform surface, such that the optical imaging lens assembly can be more flexible in space arrangement, and therefore the dimensions of an electronic device is not restricted by the total track length of the optical imaging lens assembly. Specifically, please refer to FIG. 22 and FIG. 23. FIG. 22 shows a schematic view of a configuration of one light-folding element in an optical imaging lens assembly according to one embodiment of the present disclosure, and FIG. 23 shows a schematic view of another configuration of one light-folding element in an optical imaging lens assembly according to one embodiment of the present disclosure. In FIG. 22 and FIG. 23, the optical imaging lens assembly can have, in order from an imaged object (not shown in the figures) to an image surface IMG along an optical path, a first optical axis OA1, a light-folding element LF and a second optical axis OA2. The light-folding element LF can be disposed between the imaged object and a lens group LG of the optical imaging lens assembly as shown in FIG. 22, or disposed between a lens group LG and the image surface IMG of the optical imaging lens assembly as shown in FIG. 23. Furthermore, please refer to FIG. 24, which shows a schematic view of a configuration of two light-folding elements in an optical imaging lens assembly according to one embodiment of the present disclosure. In FIG. 24, the optical imaging lens assembly can have, in order from an imaged object (not shown in the figure) to an image surface IMG along an optical path, a first optical axis OA1, a first light-folding element LF1, a second optical axis OA2, a second light-folding element LF2 and a third optical axis OA3. The first light-folding element LF1 is disposed between the imaged object and a lens group LG of the optical imaging lens assembly, the second light-folding element LF2 is disposed between the lens group LG and the image surface IMG of the optical imaging lens assembly, and the travelling direction of light on the first optical axis OA1 can be the same direction as the travelling direction of light on the third optical axis OA3 as shown in FIG. 24. The optical imaging lens assembly can be optionally provided with three or more light-folding elements, and the present disclosure is not limited to the type, amount and position of the light-folding elements of the embodiments disclosed in the aforementioned figures.

According to the present disclosure, the optical imaging lens assembly can include at least one stop, such as an aperture stop, a glare stop or a field stop. Said glare stop or said field stop is set for eliminating the stray light and thereby improving image quality thereof.

According to the present disclosure, an aperture stop can be configured as a front stop or a middle stop. A front stop disposed between an imaged object and the first lens element can provide a longer distance between an exit pupil of the optical imaging lens assembly and the image surface to produce a telecentric effect, and thereby improves the image-sensing efficiency of an image sensor (for example, CCD or CMOS). A middle stop disposed between the first lens element and the image surface is favorable for enlarging the viewing angle of the optical imaging lens assembly and thereby provides a wider field of view for the same.

According to the present disclosure, the optical imaging lens assembly can include an aperture control unit. The aperture control unit may be a mechanical component or a light modulator, which can control the size and shape of the aperture through electricity or electrical signals. The mechanical component can include a movable member, such as a blade assembly or a light shielding sheet. The light modulator can include a shielding element, such as a filter, an electrochromic material or a liquid-crystal layer. The aperture control unit controls the amount of incident light or exposure time to enhance the capability of image quality adjustment. In addition, the aperture control unit can be the aperture stop of the present disclosure, which changes the f-number to obtain different image effects, such as the depth of field or lens speed.

According to the present disclosure, the optical imaging lens assembly can include one or more optical elements for limiting the form of light passing through the optical imaging lens assembly. Each optical element can be, but not limited to, a filter, a polarizer, etc., and each optical element can be, but not limited to, a single-piece element, a composite component, a thin film, etc. The optical element can be located at the object side or the image side of the optical imaging lens assembly or between any two adjacent lens elements so as to allow light in a specific form to pass through, thereby meeting application requirements.

According to the present disclosure, the optical imaging lens assembly can include at least one optical lens element, an optical element, or a carrier, which has at least one surface with a low reflection layer. The low reflection layer can effectively reduce stray light generated due to light reflection at the interface. The low reflection layer can be disposed in an optical non-effective area of an object-side surface or an image-side surface of the said optical lens element, or a connection surface between the object-side surface and the image-side surface. The said optical element can be a light-blocking element, an annular spacer, a barrel element, a cover glass, a blue glass, a filter, a color filter, an optical path folding element (e.g., a reflective element), a prism, a mirror, etc. The said carrier can be a base for supporting a lens assembly, a micro lens disposed on an image sensor, a substrate surrounding the image sensor, a glass plate for protecting the image sensor, etc.

According to the present disclosure, the object side and image side are defined in accordance with the direction of the optical axis, and the axial optical data are calculated along the optical axis. Furthermore, if the optical axis is deflected by a light-folding element, the axial optical data are also calculated along the deflected optical axis.

According to the above description of the present disclosure, the following specific embodiments are provided for further explanation.

1st Embodiment

Figure 1:
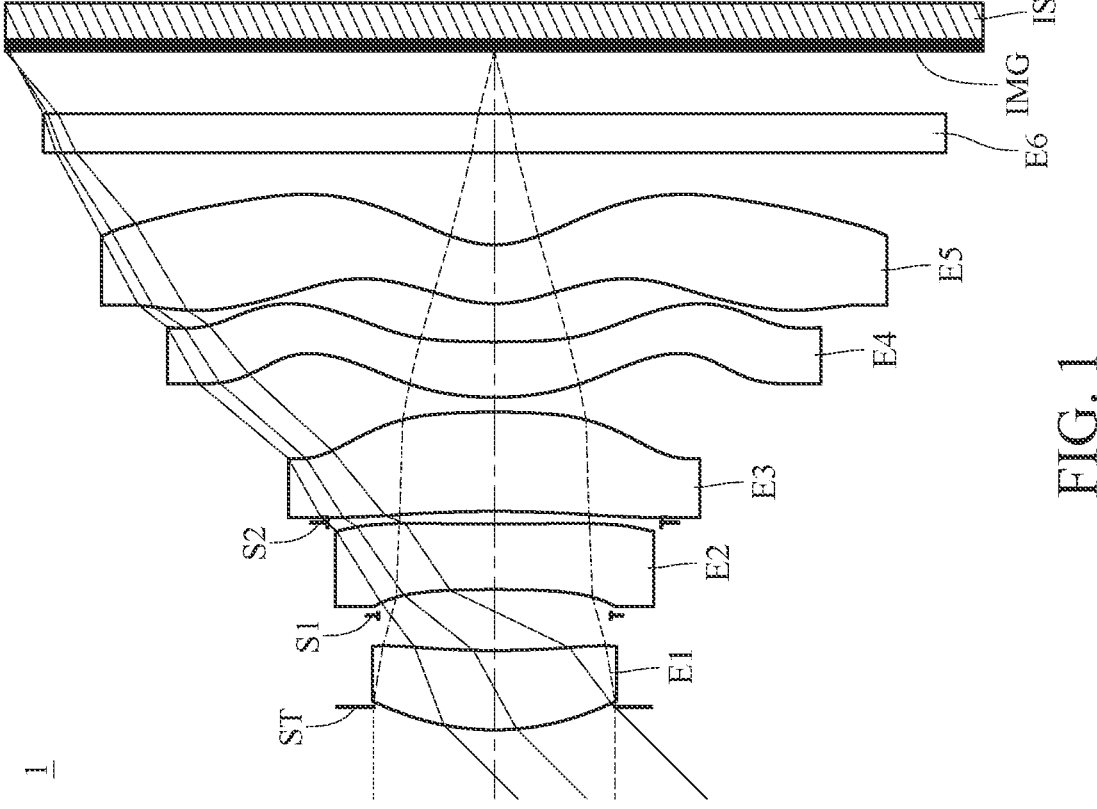
FIG. 1 is a schematic view of an image capturing unit according to the 1st embodiment of the present disclosure.
Figure 2:
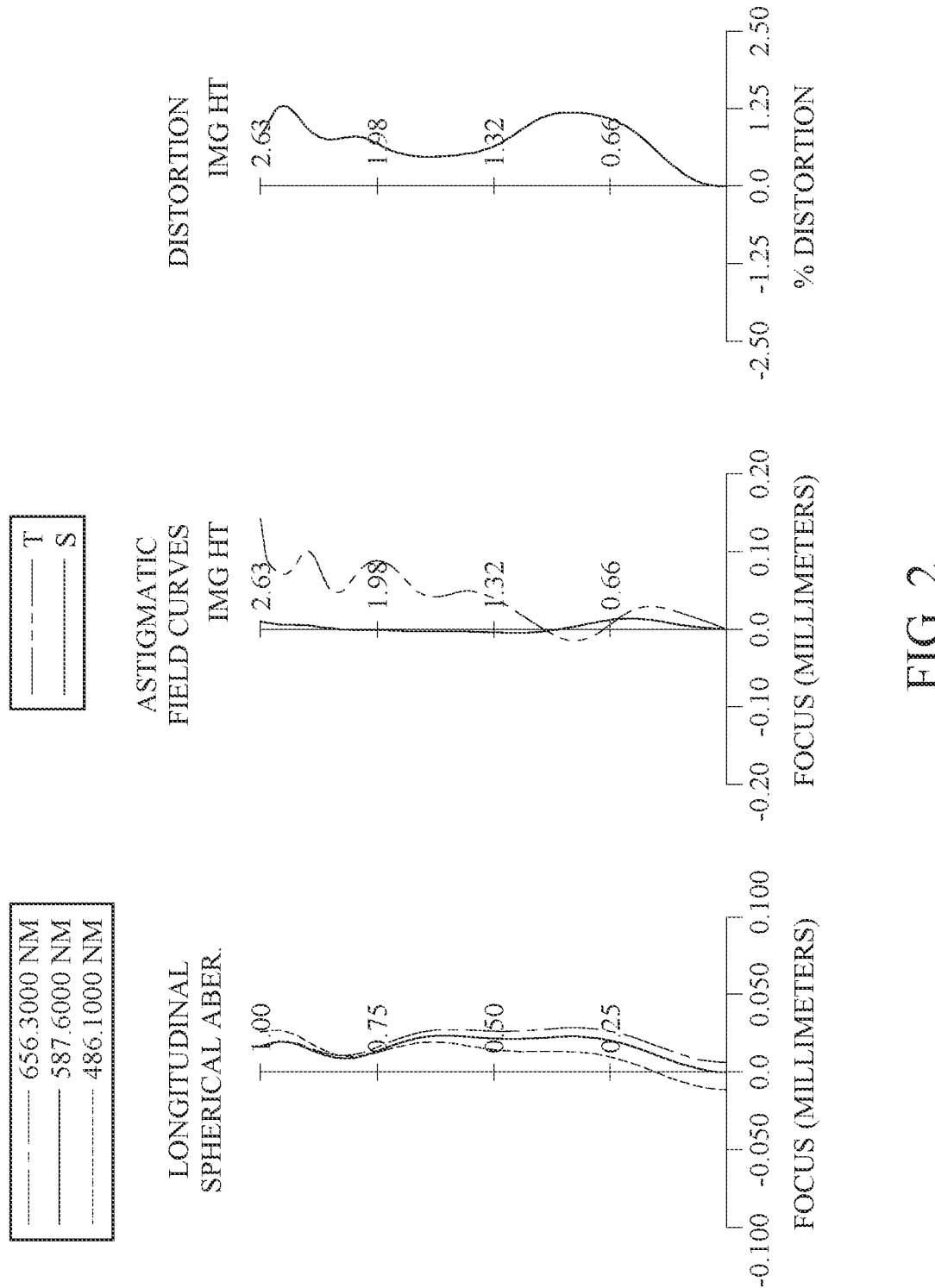
FIG. 2 shows spherical aberration curves, astigmatic field curves and a distortion curve of the image capturing unit according to the 1st embodiment.

FIG. 1 is a schematic view of an image capturing unit according to the 1st embodiment of the present disclosure. FIG. 2 shows, in order from left to right, spherical aberration curves, astigmatic field curves and a distortion curve of the image capturing unit according to the 1st embodiment. In FIG. 1, the image capturing unit 1 includes the optical imaging lens assembly (its reference numeral is omitted) of the present disclosure and an image sensor IS. The optical imaging lens assembly includes, in order from an object side to an image side along an optical axis, an aperture stop ST, a first lens element E1, a stop S1, a second lens element E2, a stop S2, a third lens element E3, a fourth lens element E4, a fifth lens element E5, a filter E6 and an image surface IMG. The optical imaging lens assembly includes five lens elements (E1, E2, E3, E4 and E5) with no additional lens element disposed between each of the adjacent five lens elements.

The first lens element E1 with positive refractive power has an object-side surface being convex in a paraxial region thereof and an image-side surface being concave in a paraxial region thereof. The first lens element E1 is made of glass material and has the object-side surface and the image-side surface being both aspheric. The image-side surface of the first lens element E1 has one convex critical point in an off-axis region thereof.

The second lens element E2 with negative refractive power has an object-side surface being concave in a paraxial region thereof and an image-side surface being concave in a paraxial region thereof. The second lens element E2 is made of plastic material and has the object-side surface and the image-side surface being both aspheric. The image-side surface of the second lens element E2 has one convex critical point in an off-axis region thereof.

The third lens element E3 with positive refractive power has an object-side surface being concave in a paraxial region thereof and an image-side surface being convex in a paraxial region thereof. The third lens element E3 is made of plastic material and has the object-side surface and the image-side surface being both aspheric. The object-side surface of the third lens element E3 has one convex critical point and one concave critical point in an off-axis region thereof. The image-side surface of the third lens element E3 has one concave critical point in an off-axis region thereof.

The fourth lens element E4 with positive refractive power has an object-side surface being convex in a paraxial region thereof and an image-side surface being concave in a paraxial region thereof. The fourth lens element E4 is made of plastic material and has the object-side surface and the image-side surface being both aspheric. The object-side surface of the fourth lens element E4 has one convex critical point and one concave critical point in an off-axis region thereof. The image-side surface of the fourth lens element E4 has one convex critical point and one concave critical point in an off-axis region thereof.

The fifth lens element E5 with negative refractive power has an object-side surface being convex in a paraxial region thereof and an image-side surface being concave in a paraxial region thereof. The fifth lens element E5 is made of plastic material and has the object-side surface and the image-side surface being both aspheric. The object-side surface of the fifth lens element E5 has one convex critical point and one concave critical point in an off-axis region thereof. The image-side surface of the fifth lens element E5 has one convex critical point in an off-axis region thereof.

The filter E6 is made of glass material and located between the fifth lens element E5 and the image surface IMG, and will not affect the focal length of the optical imaging lens assembly. The image sensor IS is disposed on or near the image surface IMG of the optical imaging lens assembly.

The equation of the aspheric surface profiles of the aforementioned lens elements of the 1st embodiment is expressed as follows:

$$X(Y) = (Y^2/R)/(1 + sqrt(1 - (1 + k) \times (Y/R)^2)) + \sum_i (Ai) \times (Y^i),$$

where,

X is the displacement in parallel with the optical axis from an axial vertex on the aspheric surface to a point at a distance of Y from the optical axis on the aspheric surface;

Y is the vertical distance from the point on the aspheric surface to the optical axis;

R is the curvature radius;

k is the conic coefficient; and

Ai is the i-th aspheric coefficient, and in the embodiments, i may be, but is not limited to, 4, 6, 8, 10, 12, 14, 16, 18, 20, 22, 24, 26 and 28.

In the optical imaging lens assembly of the image capturing unit 1 according to the 1st embodiment, when a focal length of the optical imaging lens assembly is f, an f-number of the optical imaging lens assembly is Fno, and half of a maximum field of view of the optical imaging lens assembly is HFOV, these parameters have the following values: f=2.59 millimeters (mm), Fno=1.99, HFOV=45.0 degrees (deg.).

When an Abbe number of the first lens element E1 is V1, and an Abbe number of the second lens element E2 is V2, the following condition is satisfied: V1/V2=3.37.

When a central thickness of the first lens element E1 is CT1, a central thickness of the second lens element E2 is CT2, a central thickness of the third lens element E3 is CT3, a central thickness of the fourth lens element E4 is CT4, and a central thickness of the fifth lens element E5 is CT5, the following condition is satisfied: (CT1+CT2+CT4+CT5)/CT3=2.61.

When the central thickness of the second lens element E2 is CT2, the central thickness of the third lens element E3 is CT3, the central thickness of the fourth lens element E4 is CT4, an axial distance between the second lens element E2 and the third lens element E3 is T23, and an axial distance between the third lens element E3 and the fourth lens element E4 is T34, the following condition is satisfied: (CT2+CT3+CT4)/(T23+T34)=7.90. In this embodiment, an axial distance between two adjacent lens elements is a distance in a paraxial region between two adjacent lens surfaces of the two adjacent lens elements.

When the central thickness of the third lens element E3 is CT3, and the central thickness of the fourth lens element E4 is CT4, the following condition is satisfied: CT3/CT4=1.79.

When the central thickness of the third lens element E3 is CT3, and a distance in parallel with the optical axis between a maximum effective radius position of the object-side surface of the third lens element E3 and a maximum effective radius position of the image-side surface of the third lens element E3 is ET3, the following condition is satisfied: CT3/ET3=1.70.

When an axial distance between the object-side surface of the first lens element E1 and the image surface IMG is TL, and a maximum image height of the optical imaging lens assembly is ImgH, the following condition is satisfied: TL/ImgH=1.40.

When a curvature radius of the object-side surface of the third lens element E3 is R5, a curvature radius of the image-side surface of the third lens element E3 is R6, and a focal length of the third lens element E3 is f3, the following condition is satisfied: (|R5|+|R6|)/|f3|=0.29.

When a curvature radius of the object-side surface of the first lens element E1 is R1, a curvature radius of the image-side surface of the first lens element E1 is R2, and a focal length of the first lens element E1 is f1, the following condition is satisfied: (R1+R2)/f1=1.72.

When a curvature radius of the object-side surface of the fourth lens element E4 is R7, and a curvature radius of the image-side surface of the fourth lens element E4 is R8, the following condition is satisfied: (R7+R8)/(R7−R8)=−1.78.

When a curvature radius of the object-side surface of the second lens element E2 is R3, and a focal length of the second lens element E2 is f2, the following condition is satisfied: R3/f2=1.03.

When the curvature radius of the image-side surface of the first lens element E1 is R2, and the curvature radius of the object-side surface of the second lens element E2 is R3, the following condition is satisfied: R3/R2=−1.90.

When the curvature radius of the object-side surface of the third lens element E3 is R5, and the central thickness of the third lens element E3 is CT3, the following condition is satisfied: R5/CT3=−10.66.

When the curvature radius of the image-side surface of the fourth lens element E4 is R8, and a curvature radius of the object-side surface of the fifth lens element E5 is R9, the following condition is satisfied: R8/R9=10.17.

When a composite focal length of the first lens element E1 and the second lens element E2 is f12, and a composite focal length of the third lens element E3, the fourth lens element E4 and the fifth lens element E5 is f345, the following condition is satisfied: f12/f345=1.15.

When the focal length of the second lens element E2 is f2, and a focal length of the fourth lens element E4 is f4, the following condition is satisfied: f2/f4=−1.67.

When the focal length of the third lens element E3 is f3, the focal length of the fourth lens element E4 is f4, and a focal length of the fifth lens element E5 is f5, the following condition is satisfied: f4/(|f3|+|f5|)=0.10.

When a maximum effective radius of the image-side surface of the fifth lens element E5 is Y52, and a curvature radius of the image-side surface of the fifth lens element E5 is R10, the following condition is satisfied: Y52/R10=3.96.

When a maximum effective radius of the object-side surface of the first lens element E1 is Y11, and the maximum effective radius of the image-side surface of the fifth lens element E5 is Y52, the following condition is satisfied: Y52/Y11=3.22.

When a vertical distance between a concave critical point on the object-side surface of the fourth lens element E4 and the optical axis is Yc41, and a vertical distance between a convex critical point on the image-side surface of the fourth lens element E4 and the optical axis is Yc42, the following condition is satisfied: Yc41/Yc42=0.90.

When a vertical distance between a concave critical point on the object-side surface of the fifth lens element E5 and the optical axis is Yc51, and a maximum effective radius of the object-side surface of the fifth lens element E5 is Y51, the following condition is satisfied: Yc51/Y51=0.37.

When a vertical distance between a convex critical point on the image-side surface of the fifth lens element E5 and the optical axis is Yc52, and the maximum effective radius of the image-side surface of the fifth lens element E5 is Y52, the following condition is satisfied: Yc52/Y52=0.48.

The detailed optical data of the 1st embodiment are shown in Table 1A and the aspheric surface data are shown in Table 1B below.

TABLE 1A

| Surface # | | Curvature Radius | | Thickness | Material | Index | Abbe # | Focal Length |
|---|---|---|---|---|---|---|---|---|
| 0 | Object | Plano | | 400.000 | | | | |
| 1 | Ape. Stop | Plano | | −0.125 | | | | |
| 2 | Lens 1 | 1.44549 | (ASP) | 0.430 | Glass | 1.589 | 61.2 | 3.44 |
| 3 | | 4.48530 | (ASP) | 0.189 | | | | |
| 4 | Stop | Plano | | 0.142 | | | | |
| 5 | Lens 2 | −8.53980 | (ASP) | 0.355 | Plastic | 1.680 | 18.2 | −8.27 |
| 6 | | 16.76640 | (ASP) | 0.007 | | | | |
| 7 | Stop | Plano | | 0.063 | | | | |
| 8 | Lens 3 | −5.73520 | (ASP) | 0.538 | Plastic | 1.544 | 56.0 | 34.96 |
| 9 | | −4.55200 | (ASP) | 0.081 | | | | |
| 10 | Lens 4 | 1.97847 | (ASP) | 0.300 | Plastic | 1.544 | 56.0 | 4.95 |
| 11 | | 7.06840 | (ASP) | 0.207 | | | | |
| 12 | Lens 5 | 0.69473 | (ASP) | 0.320 | Plastic | 1.534 | 56.0 | −15.25 |
| 13 | | 0.53746 | (ASP) | 0.500 | | | | |
| 14 | Filter | Plano | | 0.210 | Glass | 1.517 | 64.2 | — |
| 15 | | Plano | | 0.339 | | | | |
| 16 | Image | Plano | | — | | | | |

Note:

Reference wavelength is 587.6 nm (d-line).

An effective radius of the stop S1 (Surface 4) is 0.630 mm.

An effective radius of the stop S2 (Surface 7) is 0.905 mm.

TABLE 1B

Aspheric Coefficients

| Surface # | 2 | 3 | 5 | 6 |
|---|---|---|---|---|
| k= | 0.00000E+00 | 0.00000E+00 | 0.00000E+00 | 0.00000E+00 |
| A4= | 3.01329264E−04 | 9.64121972E−02 | −1.19717023E−01 | 2.25185774E−02 |
| A6= | −1.89768359E−01 | −3.38798475E+00 | −1.66830705E+00 | −2.24456299E−01 |
| A8= | 2.90034661E+00 | 3.56811823E+01 | 6.96618311E+00 | −2.86011026E+00 |
| A10= | −2.13104736E+01 | −2.17907511E+02 | −1.26243861E+01 | 1.77422660E+01 |
| A12= | 8.17949878E+01 | 7.47612845E+02 | −1.43134265E+01 | −4.47672580E+01 |
| A14= | −1.73386936E+02 | −1.33753757E+03 | 7.44842492E+01 | 5.67140433E+01 |
| A16= | 1.88795743E+02 | 7.90410075E+02 | −6.59871823E+01 | −3.52175790E+01 |
| A18= | −8.17279053E+01 | 8.39987035E+02 | — | 8.48873421E+00 |
| A20= | — | −1.04383493E+03 | — | — |

| Surface # | 8 | 9 | 10 | 11 |
|---|---|---|---|---|
| k= | 0.00000E+00 | 0.00000E+00 | 0.00000E+00 | 0.00000E+00 |
| A4= | 4.96543959E−02 | 1.91169303E−01 | 7.43260830E−01 | −3.50407732E−04 |
| A6= | 9.79583591E−01 | −4.11028580E+00 | −2.84602591E+00 | 3.86843466E+00 |
| A8= | −1.01734859E+01 | 1.62156929E+01 | 8.00863482E+00 | −1.49639970E+01 |
| A10= | 4.53033150E+01 | −3.96305911E+01 | −1.89592446E+01 | 2.91763833E+01 |
| A12= | −1.09706317E+02 | 6.71178102E+01 | 3.16629190E+01 | −3.63172103E+01 |
| A14= | 1.56240972E+02 | −7.89383076E+01 | −3.59533607E+01 | 3.11399090E+01 |
| A16= | −1.31632642E+02 | 6.33730516E+01 | 2.79165772E+01 | −1.89605673E+01 |
| A18= | 6.12672962E+01 | −3.30415770E+01 | −1.49399986E+01 | 8.26566421E+00 |
| A20= | −1.22851683E+01 | 1.00169255E+01 | 5.50318556E+00 | −2.55912900E+00 |
| A22= | — | −1.33150647E+00 | −1.37089135E+00 | 5.48561507E−01 |
| A24= | — | — | 2.20798489E−01 | −7.72840573E−02 |
| A26= | — | — | −2.07782441E−02 | 6.42948394E−03 |
| A28= | — | — | 8.68960183E−04 | −2.39110307E−04 |

| Surface # | 12 | 13 | | |
|---|---|---|---|---|
| k= | −1.01133E+00 | −9.99182E−01 | — | — |
| A4= | −1.55850384E+00 | −1.71656940E+00 | — | — |
| A6= | 2.34007594E+00 | 2.68669889E+00 | — | — |
| A8= | −3.12032210E+00 | −3.52290853E+00 | — | — |
| A10= | 2.91017275E+00 | 3.43342714E+00 | — | — |
| A12= | −1.56810786E+00 | −2.39558784E+00 | — | — |
| A14= | 3.08975400E−01 | 1.18409947E+00 | — | — |
| A16= | 1.61494822E−01 | −4.08658779E−01 | — | — |
| A18= | −1.42876965E−01 | 9.53528012E−02 | — | — |
| A20= | 5.15482803E−02 | −1.39591629E−02 | — | — |
| A22= | −1.08092061E−02 | 1.01536248E−03 | — | — |

TABLE 1B-continued

| Aspheric Coefficients | | | | |
|---|---|---|---|---|
| A24= | 1.36333155E−03 | 1.45243083E−05 | — | — |
| A26= | −9.60136195E−05 | −8.04855956E−06 | — | — |
| A28= | 2.89727751E−06 | 4.12067342E−07 | — | — |

In Table 1A, the curvature radius, the thickness and the focal length are shown in millimeters (mm). Surface numbers 0-16 represent the surfaces sequentially arranged from the object side to the image side along the optical axis. In Table 1B, k represents the conic coefficient of the equation of the aspheric surface profiles. A4-A28 represent the aspheric coefficients ranging from the 4th order to the 28th order. The tables presented below for each embodiment are the corresponding schematic parameter and aberration curves, and the definitions of the tables are the same as Table 1A and Table 1B of the 1st embodiment. Therefore, an explanation in this regard will not be provided again.

2nd Embodiment

Figure 3:
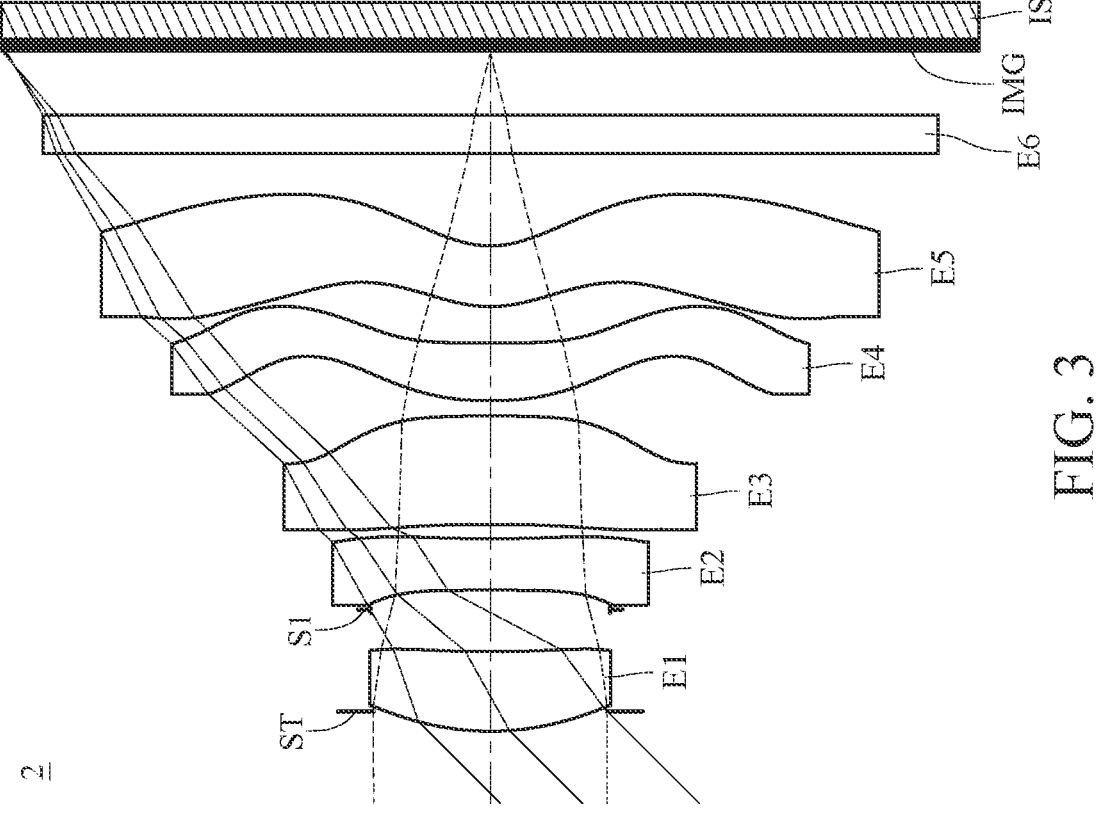
FIG. 3 is a schematic view of an image capturing unit according to the 2nd embodiment of the present disclosure.
Figure 4:
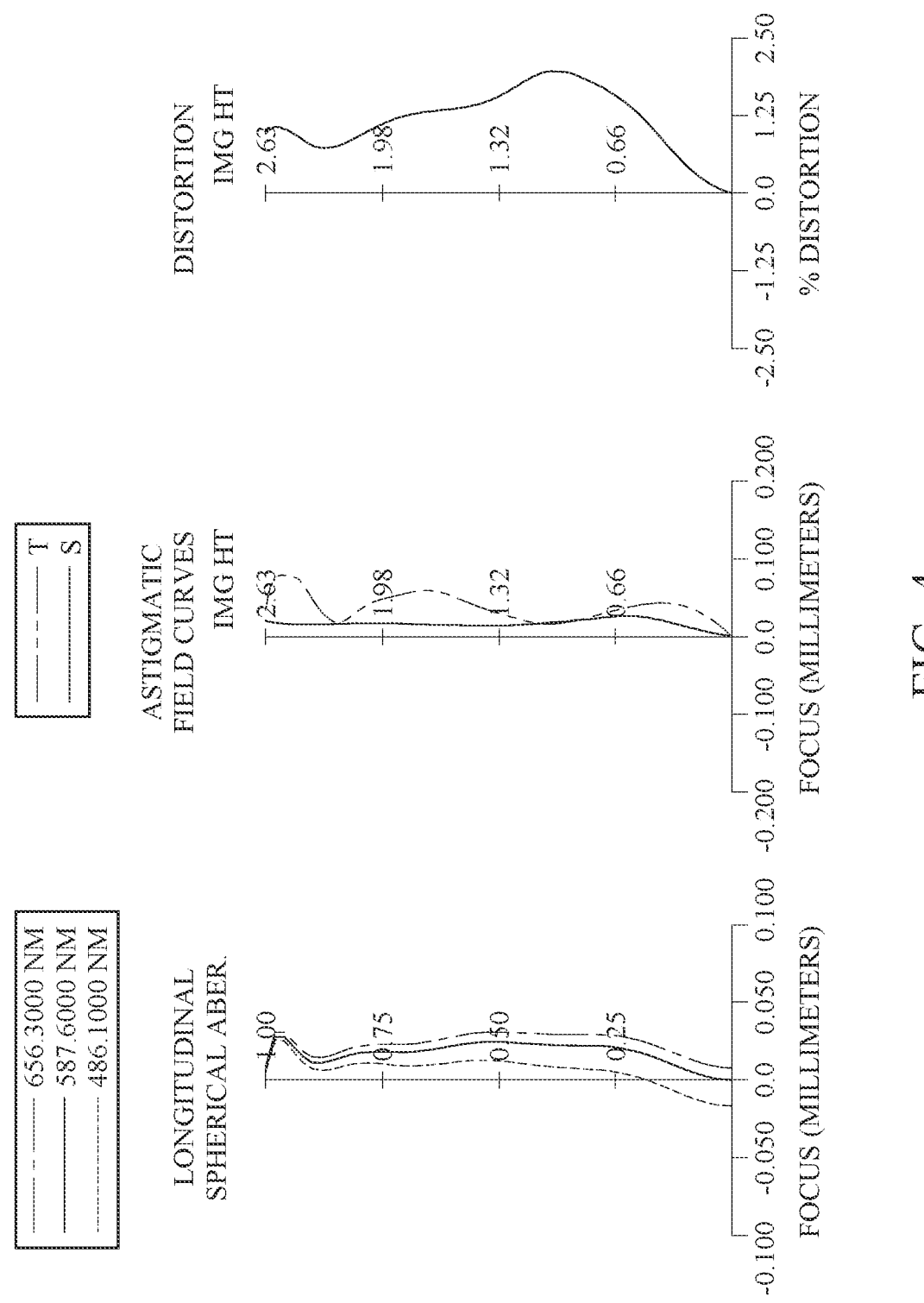
FIG. 4 shows spherical aberration curves, astigmatic field curves and a distortion curve of the image capturing unit according to the 2nd embodiment.

FIG. 3 is a schematic view of an image capturing unit according to the 2nd embodiment of the present disclosure. FIG. 4 shows, in order from left to right, spherical aberration curves, astigmatic field curves and a distortion curve of the image capturing unit according to the 2nd embodiment. In FIG. 3, the image capturing unit 2 includes the optical imaging lens assembly (its reference numeral is omitted) of the present disclosure and an image sensor IS. The optical imaging lens assembly includes, in order from an object side to an image side along an optical axis, an aperture stop ST, a first lens element E1, a stop S1, a second lens element E2, a third lens element E3, a fourth lens element E4, a fifth lens element E5, a filter E6 and an image surface IMG. The optical imaging lens assembly includes five lens elements (E1, E2, E3, E4 and E5) with no additional lens element disposed between each of the adjacent five lens elements.

The first lens element E1 with positive refractive power has an object-side surface being convex in a paraxial region thereof and an image-side surface being concave in a paraxial region thereof. The first lens element E1 is made of plastic material and has the object-side surface and the image-side surface being both aspheric. The image-side surface of the first lens element E1 has one convex critical point in an off-axis region thereof.

The second lens element E2 with negative refractive power has an object-side surface being concave in a paraxial region thereof and an image-side surface being concave in a paraxial region thereof. The second lens element E2 is made of plastic material and has the object-side surface and the image-side surface being both aspheric. The image-side surface of the second lens element E2 has one convex critical point in an off-axis region thereof.

The third lens element E3 with negative refractive power has an object-side surface being concave in a paraxial region thereof and an image-side surface being convex in a paraxial region thereof. The third lens element E3 is made of plastic material and has the object-side surface and the image-side surface being both aspheric. The object-side surface of the third lens element E3 has one convex critical point in an off-axis region thereof. The image-side surface of the third lens element E3 has one concave critical point in an off-axis region thereof.

The fourth lens element E4 with positive refractive power has an object-side surface being convex in a paraxial region thereof and an image-side surface being concave in a paraxial region thereof. The fourth lens element E4 is made of plastic material and has the object-side surface and the image-side surface being both aspheric. The object-side surface of the fourth lens element E4 has one concave critical point in an off-axis region thereof. The image-side surface of the fourth lens element E4 has one convex critical point in an off-axis region thereof.

The fifth lens element E5 with negative refractive power has an object-side surface being convex in a paraxial region thereof and an image-side surface being concave in a paraxial region thereof. The fifth lens element E5 is made of plastic material and has the object-side surface and the image-side surface being both aspheric. The object-side surface of the fifth lens element E5 has one convex critical point and one concave critical point in an off-axis region thereof. The image-side surface of the fifth lens element E5 has one convex critical point in an off-axis region thereof.

The filter E6 is made of glass material and located between the fifth lens element E5 and the image surface IMG, and will not affect the focal length of the optical imaging lens assembly. The image sensor IS is disposed on or near the image surface IMG of the optical imaging lens assembly.

The detailed optical data of the 2nd embodiment are shown in Table 2A and the aspheric surface data are shown in Table 2B below.

TABLE 2A

| 2nd Embodiment f = 2.58 mm, Fno = 2.05, HFOV = 45.0 deg. | | | | | | | |
|---|---|---|---|---|---|---|---|
| Surface # | | Curvature Radius | | Thickness | Material | Index | Abbe # | Focal Length |
| 0 | Object | Plano | | 380.000 | | | | |
| 1 | Ape. Stop | Plano | | −0.108 | | | | |
| 2 | Lens 1 | 1.48187 | (ASP) | 0.432 | Plastic | 1.545 | 56.1 | 3.53 |
| 3 | | 5.78710 | (ASP) | 0.226 | | | | |
| 4 | Stop | Plano | | 0.108 | | | | |
| 5 | Lens 2 | −29.63220 | (ASP) | 0.279 | Plastic | 1.669 | 19.5 | −9.77 |
| 6 | | 8.42240 | (ASP) | 0.078 | | | | |
| 7 | Lens 3 | −5.88270 | (ASP) | 0.588 | Plastic | 1.544 | 56.0 | −85.97 |
| 8 | | −6.96610 | (ASP) | 0.082 | | | | |
| 9 | Lens 4 | 1.95766 | (ASP) | 0.312 | Plastic | 1.544 | 56.0 | 4.67 |

TABLE 2A-continued

2nd Embodiment f = 2.58 mm, Fno = 2.05, HFOV = 45.0 deg.

| Surface # | | Curvature Radius | | Thickness | Material | Index | Abbe # | Focal Length |
|---|---|---|---|---|---|---|---|---|
| 10 | | 8.05430 | (ASP) | 0.199 | | | | |
| 11 | Lens 5 | 0.68318 | (ASP) | 0.330 | Plastic | 1.544 | 56.0 | −23.62 |
| 12 | | 0.53829 | (ASP) | 0.500 | | | | |
| 13 | Filter | Plano | | 0.210 | Glass | 1.517 | 64.2 | — |
| 14 | | Plano | | 0.348 | | | | |
| 15 | Image | Plano | | — | | | | |

Note:

Reference wavelength is 587.6 nm (d-line).

An effective radius of the stop S1 (Surface 4) is 0.650 mm.

TABLE 2B

Aspheric Coefficients

| Surface # | 2 | 3 | 5 | 6 |
|---|---|---|---|---|
| k= | 0.00000E+00 | 0.00000E+00 | 0.00000E+00 | 0.00000E+00 |
| A4= | −3.94480663E−02 | −2.85524015E−02 | −2.40319148E−01 | 1.51163874E−01 |
| A6= | 1.04080248E+00 | −2.41130037E+00 | 3.62206116E−01 | −1.96449540E+00 |
| A8= | −1.87073318E+01 | 4.09208444E+01 | −1.41959265E+01 | 6.45133087E+00 |
| A10= | 1.70264250E+02 | −4.08211217E+02 | 1.11816349E+02 | −1.13650268E+01 |
| A12= | −8.97906099E+02 | 2.41071476E+03 | −4.54809881E+02 | 8.72725639E+00 |
| A14= | 2.79110521E+03 | −8.66782009E+03 | 1.01260486E+03 | 5.94383776E+00 |
| A16= | −4.96080697E+03 | 1.86056644E+04 | −1.17620348E+03 | −2.27140127E+01 |
| A18= | 4.51950309E+03 | −2.19177036E+04 | 5.63286136E+02 | 2.31388027E+01 |
| A20= | −1.53536998E+03 | 1.09095568E+04 | — | −8.44893447E+00 |

| Surface # | 7 | 8 | 9 | 10 |
|---|---|---|---|---|
| k= | 0.00000E+00 | 0.00000E+00 | 0.00000E+00 | 0.00000E+00 |
| A4= | 2.06596276E−01 | 3.77550777E−01 | 9.23598086E−01 | −8.56073368E−02 |
| A6= | −7.96655994E−01 | −6.08807105E+00 | −4.20136582E+00 | 3.86661853E+00 |
| A8= | −2.83414314E+00 | 2.57676477E+01 | 1.33730043E+01 | −1.33900353E+01 |
| A10= | 3.70957370E+01 | −6.92803918E+01 | −3.15858076E+01 | 2.37298625E+01 |
| A12= | −1.62852183E+02 | 1.22118497E+02 | 5.06688873E+01 | −2.69594674E+01 |
| A14= | 4.38744731E+02 | −1.25899056E+02 | −5.52544279E+01 | 2.12088698E+01 |
| A16= | −7.93199539E+02 | 3.73186466E+01 | 4.14252883E+01 | −1.19174963E+01 |
| A18= | 9.57055133E+02 | 8.44528687E+01 | −2.13147128E+01 | 4.82010316E+00 |
| A20= | −7.34838421E+02 | −1.30000525E+02 | 7.32960117E+00 | −1.39038637E+00 |
| A22= | 3.23430015E+02 | 8.56099774E+01 | −1.55210569E+00 | 2.78460589E−01 |
| A24= | −6.19519584E+01 | −2.84580460E+01 | 1.48074972E−01 | −3.67078732E−02 |
| A26= | — | 3.88410486E+00 | 1.09044360E−02 | 2.85794927E−03 |
| A28= | — | — | −4.18522447E−03 | −9.93709185E−05 |
| A30= | — | — | 3.08799780E−04 | — |

| Surface # | 11 | 12 | — | — |
|---|---|---|---|---|
| k= | −1.02865E+00 | −9.94995E−01 | — | — |
| A4= | −1.63576108E+00 | −1.68878306E+00 | — | — |
| A6= | 2.63091382E+00 | 2.61251663E+00 | — | — |
| A8= | −4.13794452E+00 | −3.49270181E+00 | — | — |
| A10= | 5.05530894E+00 | 3.59958664E+00 | — | — |
| A12= | −4.18631557E+00 | −2.74700575E+00 | — | — |
| A14= | 2.31104174E+00 | 1.54979495E+00 | — | — |
| A16= | −8.54134335E−01 | −6.51371684E−01 | — | — |
| A18= | 2.09061800E−01 | 2.05182160E−01 | — | — |
| A20= | −3.22486369E−02 | −4.84471485E−02 | — | — |
| A22= | 2.66427250E−03 | 8.49438135E−03 | — | — |
| A24= | −2.98237584E−05 | −1.07874274E−03 | — | — |
| A26= | −1.29376893E−05 | 9.41777990E−05 | — | — |
| A28= | 7.52237848E−07 | −5.06677231E−06 | — | — |
| A30= | — | 1.26613524E−07 | — | — |

In the 2nd embodiment, the equation of the aspheric surface profiles of the aforementioned lens elements is the same as the equation of the 1st embodiment. Also, the definitions of these parameters shown in Table 2C below are the same as those stated in the 1st embodiment with corresponding values for the 2nd embodiment, so an explanation in this regard will not be provided again.

Moreover, these parameters can be calculated from Table 2A and Table 2B as the following values and satisfy the following conditions:

TABLE 2C

| Values of Conditional Expressions | | | |
|---|---|---|---|
| f [mm] | 2.58 | R3/f2 | 3.03 |
| Fno | 2.05 | R3/R2 | −5.12 |
| HFOV [deg.] | 45.0 | R5/CT3 | −10.00 |
| V1/V2 | 2.88 | R8/R9 | 11.79 |
| (CT1 + CT2 + CT4 + CT5)/CT3 | 2.30 | f12/f345 | 1.05 |
| (CT2 + CT3 + CT4)/(T23 + T34) | 7.37 | f2/f4 | −2.09 |
| CT3/CT4 | 1.88 | f4/(|f3| + |f5|) | 0.04 |
| CT3/ET3 | 1.64 | Y52/R10 | 3.92 |
| TL/ImgH | 1.40 | Y52/Y11 | 3.28 |
| (|R5| + |R6|)/|f3| | 0.15 | Yc41/Yc42 | 0.88 |
| (R1 + R2)/f1 | 2.06 | Yc51/Y51 | 0.37 |
| (R7 + R8)/(R7 − R8) | −1.64 | Yc52/Y52 | 0.51 |

3rd Embodiment

Figure 5:
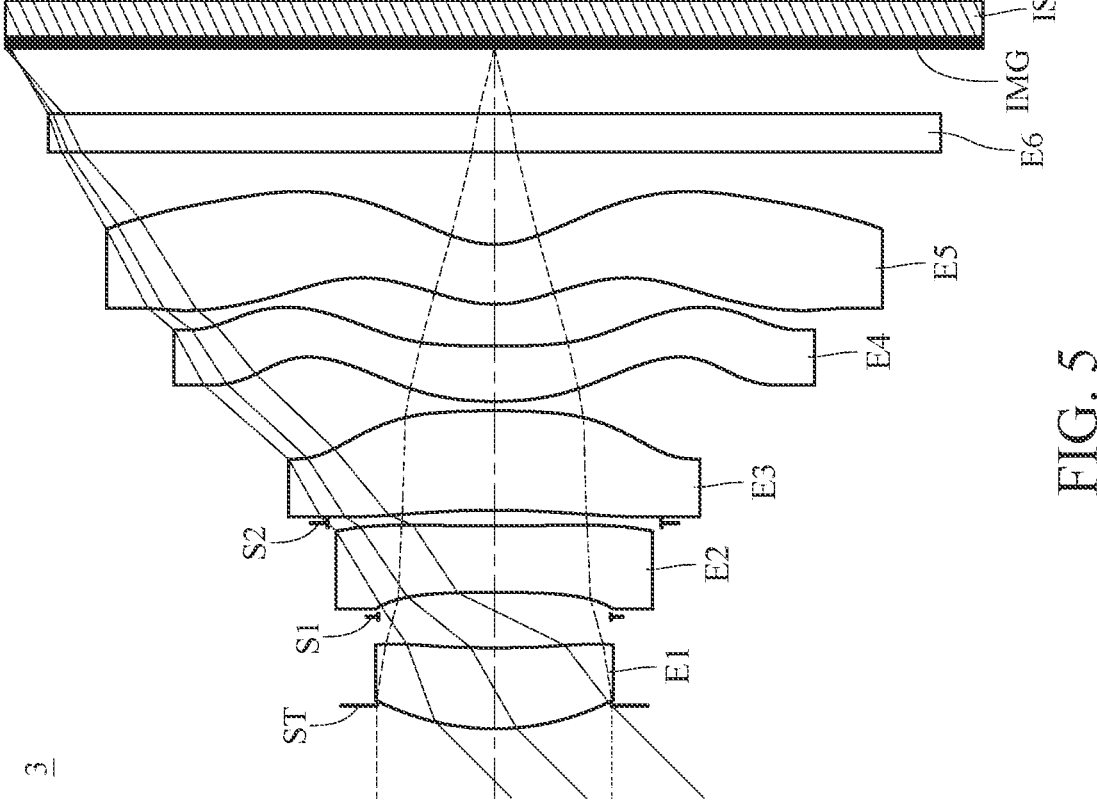
FIG. 5 is a schematic view of an image capturing unit according to the 3rd embodiment of the present disclosure.
Figure 6:
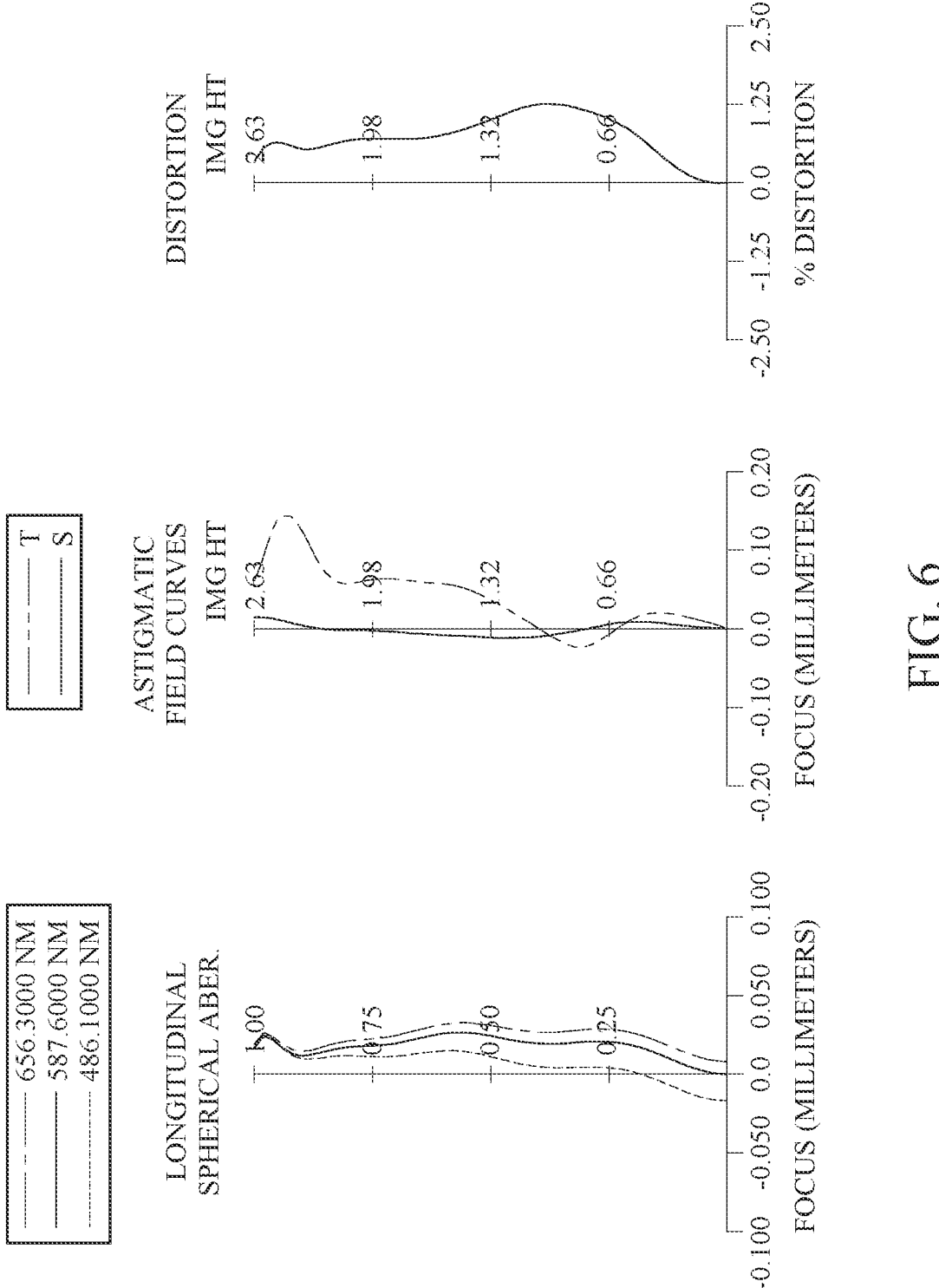
FIG. 6 shows spherical aberration curves, astigmatic field curves and a distortion curve of the image capturing unit according to the 3rd embodiment.

FIG. 5 is a schematic view of an image capturing unit according to the 3rd embodiment of the present disclosure. FIG. 6 shows, in order from left to right, spherical aberration curves, astigmatic field curves and a distortion curve of the image capturing unit according to the 3rd embodiment. In FIG. 5, the image capturing unit 3 includes the optical imaging lens assembly (its reference numeral is omitted) of the present disclosure and an image sensor IS. The optical imaging lens assembly includes, in order from an object side to an image side along an optical axis, an aperture stop ST, a first lens element E1, a stop S1, a second lens element E2, a stop S2, a third lens element E3, a fourth lens element E4, a fifth lens element E5, a filter E6 and an image surface IMG. The optical imaging lens assembly includes five lens elements (E1, E2, E3, E4 and E5) with no additional lens element disposed between each of the adjacent five lens elements.

The first lens element E1 with positive refractive power has an object-side surface being convex in a paraxial region thereof and an image-side surface being concave in a paraxial region thereof. The first lens element E1 is made of plastic material and has the object-side surface and the image-side surface being both aspheric. The image-side surface of the first lens element E1 has one convex critical point in an off-axis region thereof.

The second lens element E2 with negative refractive power has an object-side surface being concave in a paraxial region thereof and an image-side surface being concave in a paraxial region thereof. The second lens element E2 is made of plastic material and has the object-side surface and the image-side surface being both aspheric. The image-side surface of the second lens element E2 has one convex critical point in an off-axis region thereof.

The third lens element E3 with negative refractive power has an object-side surface being concave in a paraxial region thereof and an image-side surface being convex in a paraxial region thereof. The third lens element E3 is made of plastic material and has the object-side surface and the image-side surface being both aspheric. The object-side surface of the third lens element E3 has one convex critical point and one concave critical point in an off-axis region thereof.

The fourth lens element E4 with positive refractive power has an object-side surface being convex in a paraxial region thereof and an image-side surface being concave in a paraxial region thereof. The fourth lens element E4 is made of plastic material and has the object-side surface and the image-side surface being both aspheric. The object-side surface of the fourth lens element E4 has one convex critical point and one concave critical point in an off-axis region thereof. The image-side surface of the fourth lens element E4 has one convex critical point and one concave critical point in an off-axis region thereof.

The fifth lens element E5 with negative refractive power has an object-side surface being convex in a paraxial region thereof and an image-side surface being concave in a paraxial region thereof. The fifth lens element E5 is made of plastic material and has the object-side surface and the image-side surface being both aspheric. The object-side surface of the fifth lens element E5 has one convex critical point and one concave critical point in an off-axis region thereof. The image-side surface of the fifth lens element E5 has one convex critical point in an off-axis region thereof.

The filter E6 is made of glass material and located between the fifth lens element E5 and the image surface IMG, and will not affect the focal length of the optical imaging lens assembly. The image sensor IS is disposed on or near the image surface IMG of the optical imaging lens assembly.

The detailed optical data of the 3rd embodiment are shown in Table 3A and the aspheric surface data are shown in Table 3B below.

TABLE 3A

| | | 3rd Embodiment f = 2.60 mm, Fno = 2.05, HFOV = 45.0 deg. | | | | | | |
|---|---|---|---|---|---|---|---|---|
| Surface # | | Curvature Radius | | Thickness | Material | Index | Abbe # | Focal Length |
| 0 | Object | Plano | | 380.000 | | | | |
| 1 | Ape. Stop | Plano | | −0.125 | | | | |
| 2 | Lens 1 | 1.37370 | (ASP) | 0.439 | Plastic | 1.545 | 56.1 | 3.42 |
| 3 | | 4.63610 | (ASP) | 0.169 | | | | |
| 4 | Stop | Plano | | 0.133 | | | | |
| 5 | Lens 2 | −8.38550 | (ASP) | 0.362 | Plastic | 1.669 | 19.5 | −10.05 |
| 6 | | 34.49800 | (ASP) | 0.014 | | | | |
| 7 | Stop | Plano | | 0.070 | | | | |
| 8 | Lens 3 | −4.27200 | (ASP) | 0.539 | Plastic | 1.544 | 56.0 | −75.95 |
| 9 | | −4.97640 | (ASP) | 0.051 | | | | |
| 10 | Lens 4 | 1.95870 | (ASP) | 0.300 | Plastic | 1.544 | 56.0 | 4.87 |
| 11 | | 7.09590 | (ASP) | 0.227 | | | | |

TABLE 3A-continued

|  |  | 3rd Embodiment<br>f = 2.60 mm, Fno = 2.05, HFOV = 45.0 deg. |  |  |  |  |  |  |
| --- | --- | --- | --- | --- | --- | --- | --- | --- |
| Surface # |  | Curvature Radius |  | Thickness | Material | Index | Abbe # | Focal Length |
| 12 | Lens 5 | 0.68698 | (ASP) | 0.326 | Plastic | 1.544 | 56.0 | −20.49 |
| 13 |  | 0.53891 | (ASP) | 0.500 |  |  |  |  |
| 14 | Filter | Plano |  | 0.210 | Glass | 1.517 | 64.2 | — |
| 15 |  | Plano |  | 0.353 |  |  |  |  |
| 16 | Image | Plano |  | — |  |  |  |  |

Note:

Reference wavelength is 587.6 nm (d-line).

An effective radius of the stop S1 (Surface 4) is 0.630 mm.

An effective radius of the stop S2 (Surface 7) is 0.905 mm.

TABLE 3B

| | Aspheric Coefficients | | | |
| --- | --- | --- | --- | --- |
| Surface # | 2 | 3 | 5 | 6 |
| k= | 0.00000E+00 | 0.00000E+00 | 0.00000E+00 | 0.00000E+00 |
| A4= | −1.22465394E−01 | 3.06914955E−02 | −1.14534318E−02 | 1.25829645E−01 |
| A6= | 2.48579276E+00 | −2.97690131E+00 | −3.29708819E+00 | −9.90797298E−01 |
| A8= | −2.80449954E+01 | 4.66268302E+01 | 2.07019435E+01 | 2.36244886E+00 |
| A10= | 1.83895569E+02 | −4.65370574E+02 | −8.05413773E+01 | −3.10484858E+00 |
| A12= | −7.27770495E+02 | 2.84963825E+03 | 1.73756365E+02 | 3.51015691E+00 |
| A14= | 1.70340893E+03 | −1.07700465E+04 | −1.98952389E+02 | −7.06581059E+00 |
| A16= | −2.17278433E+03 | 2.43863071E+04 | 9.57534377E+01 | 9.32918668E+00 |
| A18= | 1.16270615E+03 | −3.02838686E+04 | — | −4.28658947E+00 |
| A20= | — | 1.58460978E+04 | — | — |

| Surface # | 8 | 9 | 10 | 11 |
| --- | --- | --- | --- | --- |
| k= | 0.00000E+00 | 0.00000E+00 | 0.00000E+00 | 0.00000E+00 |
| A4= | 9.93639250E−02 | 1.87559884E−01 | 7.38791096E−01 | −1.05922139E−02 |
| A6= | 5.16105313E−01 | −4.21805199E+00 | −2.91474434E+00 | 3.81195261E+00 |
| A8= | −5.28868799E+00 | 1.68638141E+01 | 8.37379380E+00 | −1.45277012E+01 |
| A10= | 2.13552616E+01 | −4.20316062E+01 | −1.98100366E+01 | 2.79973363E+01 |
| A12= | −4.46556843E+01 | 7.28249014E+01 | 3.29399563E+01 | −3.44516981E+01 |
| A14= | 5.18048237E+01 | −8.79933444E+01 | −3.73501552E+01 | 2.91960093E+01 |
| A16= | −3.25146554E+01 | 7.25176070E+01 | 2.90673658E+01 | −1.75650462E+01 |
| A18= | 9.53425487E+00 | −3.88234252E+01 | −1.56453885E+01 | 7.56418594E+00 |
| A20= | −7.76250605E−01 | 1.20568596E+01 | 5.81483041E+00 | −2.31293689E+00 |
| A22= | — | −1.63698945E+00 | −1.46603103E+00 | 4.89530234E−01 |
| A24= | — | — | 2.39677866E−01 | −6.80775098E−02 |
| A26= | — | — | −2.29571742E−02 | 5.58849648E−03 |
| A28= | — | — | 9.79516350E−04 | −2.04986070E−04 |

| Surface # | 12 | 13 | — | — |
| --- | --- | --- | --- | --- |
| k= | −1.01794E+00 | −1.00015E+00 | — | — |
| A4= | −1.47405155E+00 | −1.65995033E+00 | — | — |
| A6= | 1.97111502E+00 | 2.56429062E+00 | — | — |
| A8= | −2.20430151E+00 | −3.39606402E+00 | — | — |
| A10= | 1.40501325E+00 | 3.44142164E+00 | — | — |
| A12= | 1.22303996E−01 | −2.57011663E+00 | — | — |
| A14= | −1.01622091E+00 | 1.40231616E+00 | — | — |
| A16= | 8.98133316E−01 | −5.56191024E−01 | — | — |
| A18= | −4.35081895E−01 | 1.59036410E−01 | — | — |
| A20= | 1.33758428E−01 | −3.22815175E−02 | — | — |
| A22= | −2.68415786E−02 | 4.52084773E−03 | — | — |
| A24= | 3.42510087E−03 | −4.14202966E−04 | — | — |
| A26= | −2.53347012E−04 | 2.22941847E−05 | — | — |
| A28= | 8.29645591E−06 | −5.33373223E−07 | — | — |

In the 3rd embodiment, the equation of the aspheric surface profiles of the aforementioned lens elements is the same as the equation of the 1st embodiment. Also, the definitions of these parameters shown in Table 3C below are the same as those stated in the 1st embodiment with corre-sponding values for the 3rd embodiment, so an explanation in this regard will not be provided again.

Moreover, these parameters can be calculated from Table 3A and Table 3B as the following values and satisfy the following conditions:

TABLE 3C

| Values of Conditional Expressions | | | |
|---|---|---|---|
| f [mm] | 2.60 | R3/f2 | 0.83 |
| Fno | 2.05 | R3/R2 | −1.81 |
| HFOV [deg.] | 45.0 | R5/CT3 | −7.93 |
| V1/V2 | 2.88 | R8/R9 | 10.33 |
| (CT1 + CT2 + CT4 + CT5)/CT3 | 2.65 | f12/f345 | 0.92 |
| (CT2 + CT3 + CT4)/(T23 + T34) | 8.90 | f2/f4 | −2.06 |
| CT3/CT4 | 1.80 | f4/(|f3| + |f5|) | 0.05 |
| CT3/ET3 | 1.72 | Y52/R10 | 3.90 |
| TL/ImgH | 1.40 | Y52/Y11 | 3.26 |
| (|R5| + |R6|)/|f3| | 0.12 | Yc41/Yc42 | 0.89 |
| (R1 + R2)/f1 | 1.76 | Yc51/Y51 | 0.39 |
| (R7 + R8)/(R7 − R8) | −1.76 | Yc52/Y52 | 0.50 |

4th Embodiment

Figure 7:
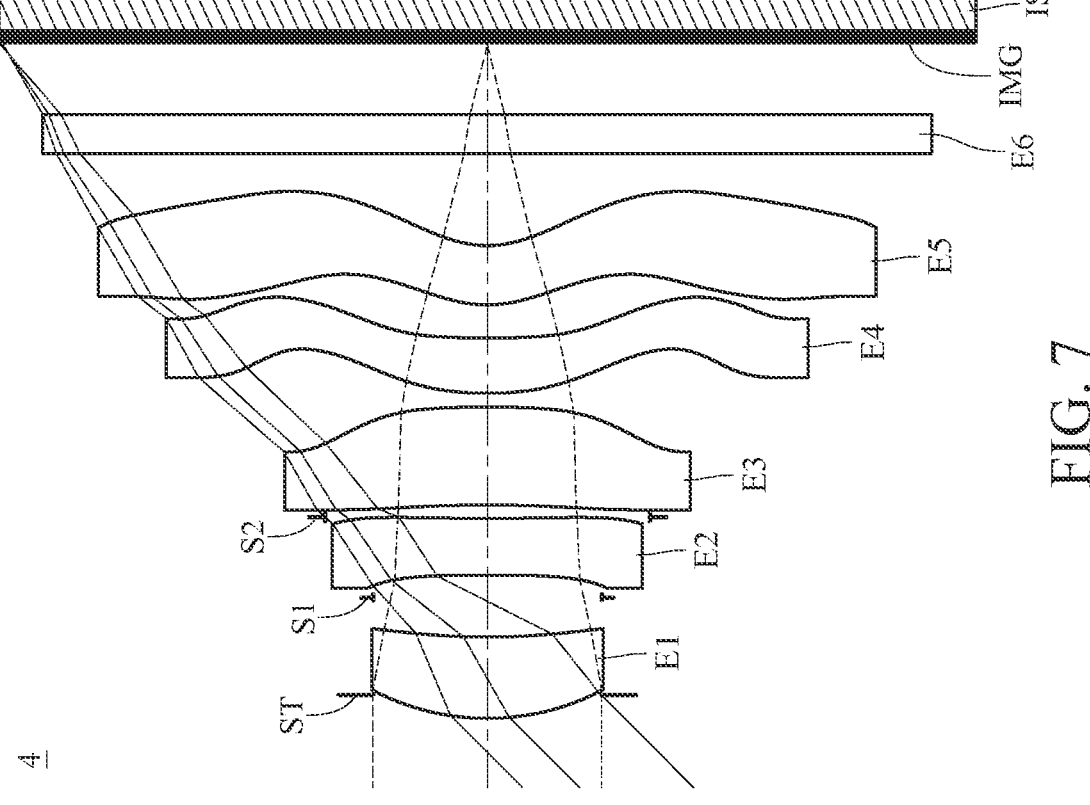
FIG. 7 is a schematic view of an image capturing unit according to the 4th embodiment of the present disclosure.
Figure 8:
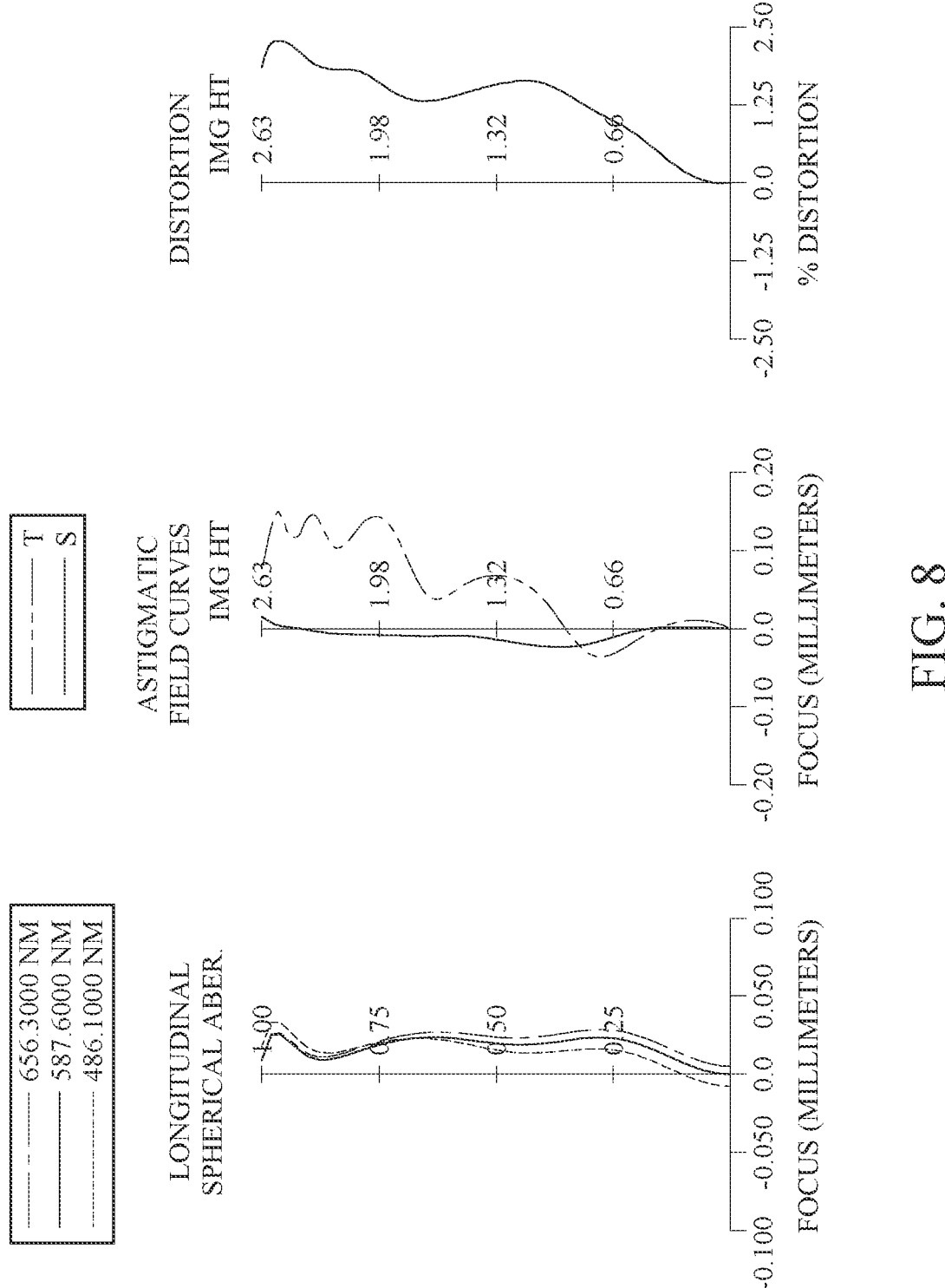
FIG. 8 shows spherical aberration curves, astigmatic field curves and a distortion curve of the image capturing unit according to the 4th embodiment.

FIG. 7 is a schematic view of an image capturing unit according to the 4th embodiment of the present disclosure. FIG. 8 shows, in order from left to right, spherical aberration curves, astigmatic field curves and a distortion curve of the image capturing unit according to the 4th embodiment. In FIG. 7, the image capturing unit 4 includes the optical imaging lens assembly (its reference numeral is omitted) of the present disclosure and an image sensor IS. The optical imaging lens assembly includes, in order from an object side to an image side along an optical axis, an aperture stop ST, a first lens element E1, a stop S1, a second lens element E2, a stop S2, a third lens element E3, a fourth lens element E4, a fifth lens element E5, a filter E6 and an image surface IMG. The optical imaging lens assembly includes five lens elements (E1, E2, E3, E4 and E5) with no additional lens element disposed between each of the adjacent five lens elements.

The first lens element E1 with positive refractive power has an object-side surface being convex in a paraxial region thereof and an image-side surface being concave in a paraxial region thereof. The first lens element E1 is made of plastic material and has the object-side surface and the image-side surface being both aspheric.

The second lens element E2 with negative refractive power has an object-side surface being concave in a paraxial region thereof and an image-side surface being concave in a paraxial region thereof. The second lens element E2 is made of plastic material and has the object-side surface and the image-side surface being both aspheric. The image-side surface of the second lens element E2 has one convex critical point in an off-axis region thereof.

The third lens element E3 with positive refractive power has an object-side surface being concave in a paraxial region thereof and an image-side surface being convex in a paraxial region thereof. The third lens element E3 is made of plastic material and has the object-side surface and the image-side surface being both aspheric. The object-side surface of the third lens element E3 has one convex critical point and one concave critical point in an off-axis region thereof.

The fourth lens element E4 with positive refractive power has an object-side surface being convex in a paraxial region thereof and an image-side surface being concave in a paraxial region thereof. The fourth lens element E4 is made of plastic material and has the object-side surface and the image-side surface being both aspheric. The object-side surface of the fourth lens element E4 has one convex critical point and one concave critical point in an off-axis region thereof. The image-side surface of the fourth lens element E4 has one convex critical point and one concave critical point in an off-axis region thereof.

The fifth lens element E5 with positive refractive power has an object-side surface being convex in a paraxial region thereof and an image-side surface being concave in a paraxial region thereof. The fifth lens element E5 is made of plastic material and has the object-side surface and the image-side surface being both aspheric. The object-side surface of the fifth lens element E5 has one convex critical point and one concave critical point in an off-axis region thereof. The image-side surface of the fifth lens element E5 has one convex critical point in an off-axis region thereof.

The filter E6 is made of glass material and located between the fifth lens element E5 and the image surface IMG, and will not affect the focal length of the optical imaging lens assembly. The image sensor IS is disposed on or near the image surface IMG of the optical imaging lens assembly.

The detailed optical data of the 4th embodiment are shown in Table 4A and the aspheric surface data are shown in Table 4B below.

TABLE 4A

| 4th Embodiment f = 2.56 mm, Fno = 2.08, HFOV = 44.9 deg. | | | | | | | |
|---|---|---|---|---|---|---|---|
| Surface # | | Curvature Radius | | Thickness | Material | Index | Abbe # | Focal Length |
| 0 | Object | Plano | | 450.000 | | | | |
| 1 | Ape. Stop | Plano | | −0.125 | | | | |
| 2 | Lens 1 | 1.35485 | (ASP) | 0.441 | Plastic | 1.545 | 56.1 | 3.58 |
| 3 | | 3.91750 | (ASP) | 0.215 | | | | |
| 4 | Stop | Plano | | 0.121 | | | | |
| 5 | Lens 2 | −13.78010 | (ASP) | 0.307 | Plastic | 1.705 | 14.0 | −8.35 |
| 6 | | 10.36040 | (ASP) | 0.009 | | | | |
| 7 | Stop | Plano | | 0.065 | | | | |
| 8 | Lens 3 | −6.44420 | (ASP) | 0.531 | Plastic | 1.566 | 37.4 | 125.97 |
| 9 | | −6.08610 | (ASP) | 0.075 | | | | |
| 10 | Lens 4 | 1.96997 | (ASP) | 0.300 | Plastic | 1.544 | 56.0 | 5.31 |
| 11 | | 5.84970 | (ASP) | 0.179 | | | | |
| 12 | Lens 5 | 0.65480 | (ASP) | 0.322 | Plastic | 1.534 | 56.0 | 86.59 |
| 13 | | 0.55046 | (ASP) | 0.500 | | | | |

TABLE 4A-continued

| | | | | | | | |
|---|---|---|---|---|---|---|---|
| | | | 4th Embodiment f = 2.56 mm, Fno = 2.08, HFOV = 44.9 deg. | | | | |
| Surface # | | Curvature Radius | Thickness | Material | Index | Abbe # | Focal Length |
| 14 | Filter | Plano | 0.210 | Glass | 1.517 | 64.2 | — |
| 15 | | Plano | 0.390 | | | | |
| 16 | Image | Plano | — | | | | |

Note:
Reference wavelength is 587.6 nm (d-line).
An effective radius of the stop S1 (Surface 4) is 0.620 mm.
An effective radius of the stop S2 (Surface 7) is 0.880 mm.

TABLE 4B

Aspheric Coefficients

| Surface # | 2 | 3 | 5 | 6 |
|---|---|---|---|---|
| k= | 0.00000E+00 | 0.00000E+00 | 0.00000E+00 | 0.00000E+00 |
| A4= | −1.56048390E−02 | 3.16904679E−01 | 2.12976878E−02 | −3.63901361E−02 |
| A6= | 2.45960098E−01 | −8.31825323E+00 | −3.63659686E+00 | 3.99291235E−01 |
| A8= | −1.60411490E+00 | 1.13251619E+02 | 2.48574846E+01 | −7.24389371E+00 |
| A10= | 1.77534268E+01 | −9.32283491E+02 | −1.03371042E+02 | 3.46651234E+01 |
| A12= | −1.37783324E+02 | 4.82023279E+03 | 2.48255849E+02 | −8.08815206E+01 |
| A14= | 5.46491164E+02 | −1.58312720E+04 | −3.25954612E+02 | 9.88677600E+01 |
| A16= | −1.04653910E+03 | 3.21425477E+04 | 1.83149536E+02 | −6.01142638E+01 |
| A18= | 7.74748644E+02 | −3.68725993E+04 | — | 1.41658351E+01 |
| A20= | — | 1.83108323E+04 | — | — |

| Surface # | 8 | 9 | 10 | 11 |
|---|---|---|---|---|
| k= | 0.00000E+00 | 0.00000E+00 | 0.00000E+00 | 0.00000E+00 |
| A4= | 4.26871596E−02 | 1.75793254E−01 | 7.75880939E−01 | −4.26600312E−02 |
| A6= | 8.19925026E−01 | −4.34694747E+00 | −2.98606822E+00 | 3.94227658E+00 |
| A8= | −8.99077073E+00 | 1.83746224E+01 | 8.12668503E+00 | −1.50297494E+01 |
| A10= | 4.02002682E+01 | −4.83481876E+01 | −1.81731629E+01 | 2.92835382E+01 |
| A12= | −9.38956226E+01 | 8.66432710E+01 | 2.86991731E+01 | −3.65309329E+01 |
| A14= | 1.25304172E+02 | −1.05221887E+02 | −3.08360674E+01 | 3.13958181E+01 |
| A16= | −9.68680640E+01 | 8.51234351E+01 | 2.25204911E+01 | −1.91421873E+01 |
| A18= | 4.08897662E+01 | −4.38530974E+01 | −1.11794984E+01 | 8.34538901E+00 |
| A20= | −7.47007218E+00 | 1.29673027E+01 | 3.73092393E+00 | −2.58095310E+00 |
| A22= | — | −1.66910353E+00 | −8.10976160E−01 | 5.52144076E−01 |
| A24= | — | — | 1.07088197E−01 | −7.75925294E−02 |
| A26= | — | — | −7.35560044E−03 | 6.43719425E−03 |
| A28= | — | — | 1.68772158E−04 | −2.38720587E−04 |

| Surface # | 12 | 13 | — | — |
|---|---|---|---|---|
| k= | −1.02729E+00 | −1.00007E+00 | — | — |
| A4= | −1.48911527E+00 | −1.49943433E+00 | — | — |
| A6= | 2.37046316E+00 | 2.18586831E+00 | — | — |
| A8= | −3.79741841E+00 | −2.86974734E+00 | — | — |
| A10= | 4.66332864E+00 | 2.95233684E+00 | — | — |
| A12= | −4.01902957E+00 | −2.24918253E+00 | — | — |
| A14= | 2.49855612E+00 | 1.24235395E+00 | — | — |
| A16= | −1.16318069E+00 | −4.90369352E−01 | — | — |
| A18= | 4.12338309E−01 | 1.36038762E−01 | — | — |
| A20= | −1.09997768E−01 | −2.58533497E−02 | — | — |
| A22= | 2.12376749E−02 | 3.21501039E−03 | — | — |
| A24= | −2.77392662E−03 | −2.39148291E−04 | — | — |
| A26= | 2.17505488E−04 | 8.63552398E−06 | — | — |
| A28= | −7.68921306E−06 | −6.59848379E−08 | — | — |

In the 4th embodiment, the equation of the aspheric surface profiles of the aforementioned lens elements is the same as the equation of the 1st embodiment. Also, the definitions of these parameters shown in Table 4C below are the same as those stated in the 1st embodiment with corresponding values for the 4th embodiment, so an explanation in this regard will not be provided again.

Moreover, these parameters can be calculated from Table 4A and Table 4B as the following values and satisfy the following conditions:

TABLE 4C

Values of Conditional Expressions

| | | | |
|---|---|---|---|
| f [mm] | 2.56 | R3/f2 | 1.65 |
| Fno | 2.08 | R3/R2 | −3.52 |
| HFOV [deg.] | 44.9 | R5/CT3 | −12.14 |
| V1/V2 | 3.99 | R8/R9 | 8.93 |
| (CT1 + CT2 + CT4 + CT5)/CT3 | 2.58 | f12/f345 | 1.35 |
| (CT2 + CT3 + CT4)/(T23 + T34) | 7.64 | f2/f4 | −1.57 |
| CT3/CT4 | 1.77 | f4/(|f3| + |f5|) | 0.03 |

TABLE 4C-continued

| Values of Conditional Expressions | | | |
|---|---|---|---|
| CT3/ET3 | 1.69 | Y52/R10 | 3.83 |
| TL/ImgH | 1.39 | Y52/Y11 | 3.37 |
| (|R5| + |R6|)/|f3| | 0.10 | Yc41/Yc42 | 0.88 |
| (R1 + R2)/f1 | 1.47 | Yc51/Y51 | 0.41 |
| (R7 + R8)/(R7 − R8) | −2.02 | Yc52/Y52 | 0.50 |

5th Embodiment

Figure 9:
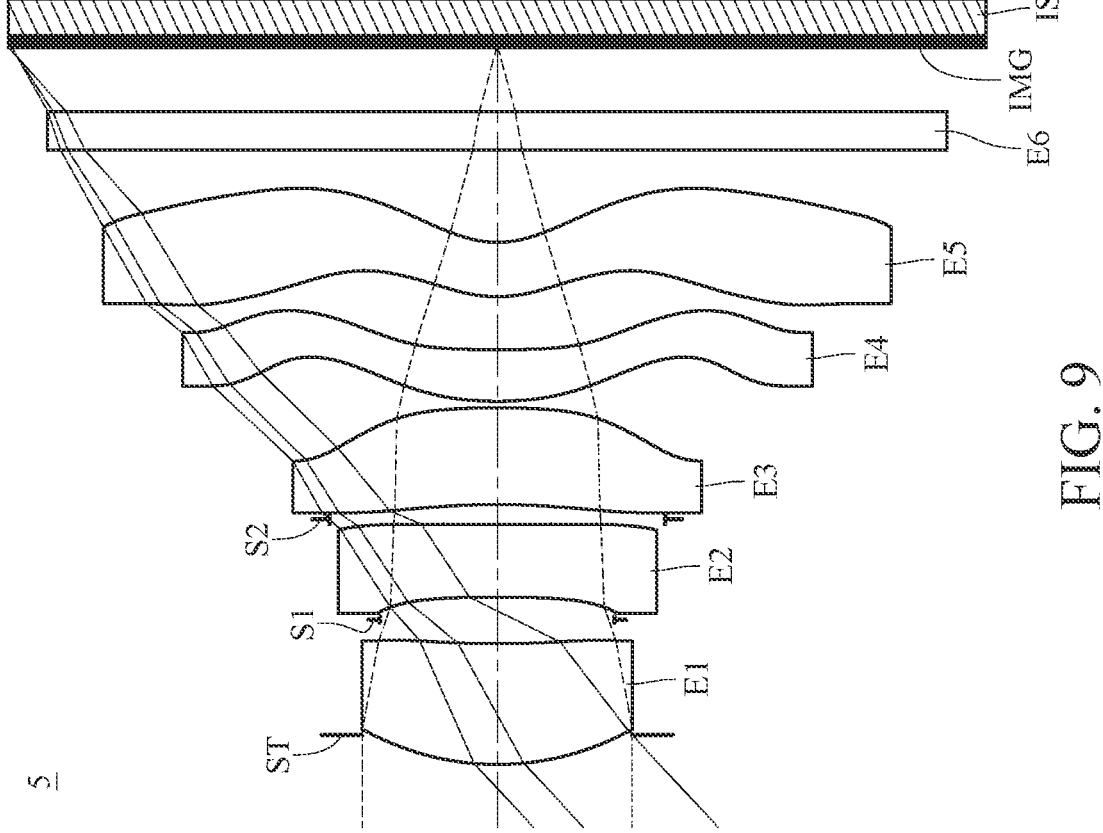
FIG. 9 is a schematic view of an image capturing unit according to the 5th embodiment of the present disclosure.
Figure 10:
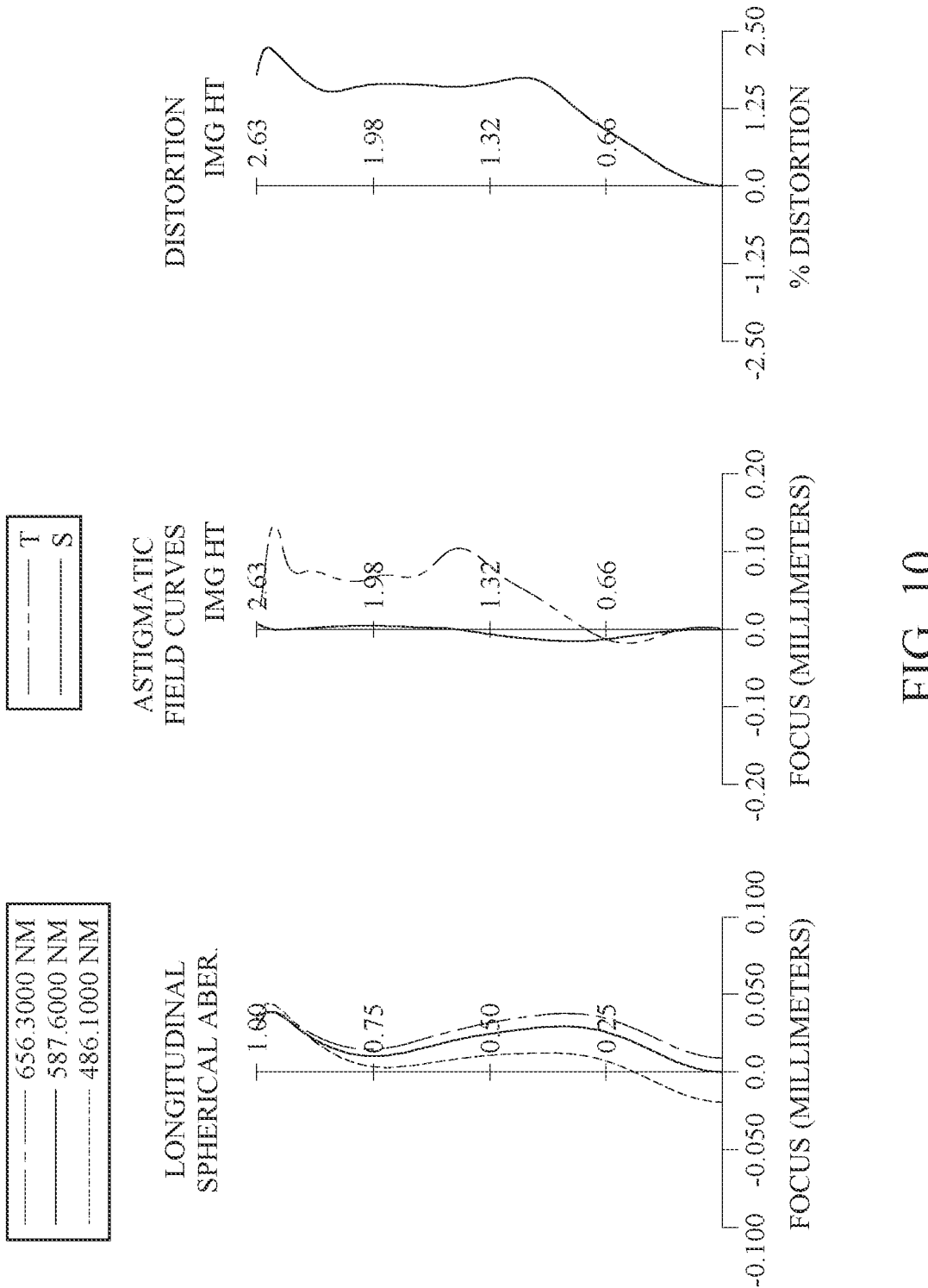
FIG. 10 shows spherical aberration curves, astigmatic field curves and a distortion curve of the image capturing unit according to the 5th embodiment.

FIG. 9 is a schematic view of an image capturing unit according to the 5th embodiment of the present disclosure. FIG. 10 shows, in order from left to right, spherical aberration curves, astigmatic field curves and a distortion curve of the image capturing unit according to the 5th embodiment. In FIG. 9, the image capturing unit 5 includes the optical imaging lens assembly (its reference numeral is omitted) of the present disclosure and an image sensor IS. The optical imaging lens assembly includes, in order from an object side to an image side along an optical axis, an aperture stop ST, a first lens element E1, a stop S1, a second lens element E2, a stop S2, a third lens element E3, a fourth lens element E4, a fifth lens element E5, a filter E6 and an image surface IMG. The optical imaging lens assembly includes five lens elements (E1, E2, E3, E4 and E5) with no additional lens element disposed between each of the adjacent five lens elements.

The first lens element E1 with positive refractive power has an object-side surface being convex in a paraxial region thereof and an image-side surface being concave in a paraxial region thereof. The first lens element E1 is made of plastic material and has the object-side surface and the image-side surface being both aspheric. The image-side surface of the first lens element E1 has one convex critical point in an off-axis region thereof.

The second lens element E2 with negative refractive power has an object-side surface being concave in a paraxial region thereof and an image-side surface being convex in a paraxial region thereof. The second lens element E2 is made of plastic material and has the object-side surface and the image-side surface being both aspheric. The image-side surface of the second lens element E2 has one convex critical point and one concave critical point in an off-axis region thereof.

The third lens element E3 with negative refractive power has an object-side surface being concave in a paraxial region thereof and an image-side surface being convex in a paraxial region thereof. The third lens element E3 is made of plastic material and has the object-side surface and the image-side surface being both aspheric. The object-side surface of the third lens element E3 has one convex critical point and one concave critical point in an off-axis region thereof.

The fourth lens element E4 with positive refractive power has an object-side surface being convex in a paraxial region thereof and an image-side surface being concave in a paraxial region thereof. The fourth lens element E4 is made of plastic material and has the object-side surface and the image-side surface being both aspheric. The object-side surface of the fourth lens element E4 has one concave critical point in an off-axis region thereof. The image-side surface of the fourth lens element E4 has one convex critical point and one concave critical point in an off-axis region thereof.

The fifth lens element E5 with negative refractive power has an object-side surface being convex in a paraxial region thereof and an image-side surface being concave in a paraxial region thereof. The fifth lens element E5 is made of plastic material and has the object-side surface and the image-side surface being both aspheric. The object-side surface of the fifth lens element E5 has one convex critical point and one concave critical point in an off-axis region thereof. The image-side surface of the fifth lens element E5 has one convex critical point in an off-axis region thereof.

The filter E6 is made of glass material and located between the fifth lens element E5 and the image surface IMG, and will not affect the focal length of the optical imaging lens assembly. The image sensor IS is disposed on or near the image surface IMG of the optical imaging lens assembly.

The detailed optical data of the 5th embodiment are shown in Table 5A and the aspheric surface data are shown in Table 5B below.

TABLE 5A

| 5th Embodiment f = 2.76 mm, Fno = 1.89, HFOV = 43.0 deg. | | | | | | | |
|---|---|---|---|---|---|---|---|
| Surface # | | Curvature Radius | | Thickness | Material | Index | Abbe # | Focal Length |
| 0 | Object | Plano | | Infinity | | | | |
| 1 | Ape. Stop | Plano | | −0.160 | | | | |
| 2 | Lens 1 | 1.48183 | (ASP) | 0.655 | Plastic | 1.545 | 56.1 | 3.54 |
| 3 | | 5.40620 | (ASP) | 0.131 | | | | |
| 4 | Stop | Plano | | 0.122 | | | | |
| 5 | Lens 2 | −7.50470 | (ASP) | 0.395 | Plastic | 1.669 | 19.5 | −12.62 |
| 6 | | −69.14610 | (ASP) | 0.026 | | | | |
| 7 | Stop | Plano | | 0.082 | | | | |
| 8 | Lens 3 | −3.45030 | (ASP) | 0.525 | Plastic | 1.544 | 56.0 | −72.59 |
| 9 | | −3.98330 | (ASP) | 0.035 | | | | |
| 10 | Lens 4 | 1.98250 | (ASP) | 0.280 | Plastic | 1.544 | 56.0 | 4.94 |
| 11 | | 7.18820 | (ASP) | 0.287 | | | | |
| 12 | Lens 5 | 0.68876 | (ASP) | 0.295 | Plastic | 1.534 | 56.0 | −12.42 |
| 13 | | 0.53094 | (ASP) | 0.500 | | | | |
| 14 | Filter | Plano | | 0.210 | Glass | 1.517 | 64.2 | — |
| 15 | | Plano | | 0.349 | | | | |
| 16 | Image | Plano | | — | | | | |

Note:
Reference wavelength is 587.6 nm (d-line).
An effective radius of the stop S1 (Surface 4) is 0.635 mm.
An effective radius of the stop S2 (Surface 7) is 0.910 mm.

TABLE 5B

| Aspheric Coefficients | | | | |
|---|---|---|---|---|
| Surface # | 2 | 3 | 5 | 6 |
| k= | 0.00000E+00 | 0.00000E+00 | 0.00000E+00 | 0.00000E+00 |
| A4= | −2.32655035E−02 | 2.02289283E−01 | 9.49535836E−02 | 2.77560604E−01 |
| A6= | 4.72514367E−01 | −3.94347713E+00 | −4.58090689E+00 | −2.04282510E+00 |
| A8= | −5.70266694E+00 | 2.48949841E+01 | 3.37642057E+01 | 7.57465606E+00 |
| A10= | 3.87955738E+01 | −4.77555273E+01 | −1.52070014E+02 | −1.81125429E+01 |
| A12= | −1.49378310E+02 | −2.94264368E+02 | 3.88612763E+02 | 2.85607068E+01 |
| A14= | 3.21653494E+02 | 2.02564171E+03 | −5.29780384E+02 | −3.03181315E+01 |
| A16= | −3.61198990E+02 | −5.16289085E+03 | 2.99275518E+02 | 1.99010296E+01 |
| A18= | 1.64507508E+02 | 6.21939627E+03 | — | −5.96189303E+00 |
| A20= | — | −2.93432952E+03 | — | — |

| Surface # | 8 | 9 | 10 | 11 |
|---|---|---|---|---|
| k= | 0.00000E+00 | 0.00000E+00 | 0.00000E+00 | 0.00000E+00 |
| A4= | 2.08795315E−01 | 1.72723528E−01 | 7.19051658E−01 | −7.39188229E−03 |
| A6= | −1.55682877E−02 | −3.69956769E+00 | −2.85365710E+00 | 3.82605526E+00 |
| A8= | −3.92639298E+00 | 1.38271256E+01 | 8.24879268E+00 | −1.46480495E+01 |
| A10= | 2.09722874E+01 | −3.20930944E+01 | −1.93272795E+01 | 2.83761175E+01 |
| A12= | −5.20313556E+01 | 5.23444935E+01 | 3.15398252E+01 | −3.51272775E+01 |
| A14= | 7.27049122E+01 | −6.03742150E+01 | −3.49734070E+01 | 2.99649390E+01 |
| A16= | −5.90907938E+01 | 4.82889260E+01 | 2.65732277E+01 | −1.81548708E+01 |
| A18= | 2.62481549E+01 | −2.53228357E+01 | −1.39456629E+01 | 7.87678009E+00 |
| A20= | −4.97162534E+00 | 7.74760946E+00 | 5.04551236E+00 | −2.42782124E+00 |
| A22= | — | −1.03882389E+00 | −1.23571451E+00 | 5.18306178E−01 |
| A24= | — | — | 1.95732151E−01 | −7.27665250E−02 |
| A26= | — | — | −1.81058744E−02 | 6.03669272E−03 |
| A28= | — | — | 7.43271016E−04 | −2.24053992E−04 |

| Surface # | 12 | 13 | — | — |
|---|---|---|---|---|
| k= | −1.01542E+00 | −1.00153E+00 | — | — |
| A4= | −1.50666319E+00 | −1.66668102E+00 | — | — |
| A6= | 2.15406790E+00 | 2.53087522E+00 | — | — |
| A8= | −2.76637462E+00 | −3.25186403E+00 | — | — |
| A10= | 2.42973327E+00 | 3.16951242E+00 | — | — |
| A12= | −1.07971124E+00 | −2.27077455E+00 | — | — |
| A14= | −6.05206788E−02 | 1.19210173E+00 | — | — |
| A16= | 3.67541301E−01 | −4.57423975E−01 | — | — |
| A18= | −2.26827355E−01 | 1.27174971E−01 | — | — |
| A20= | 7.61697742E−02 | −2.51715060E−02 | — | — |
| A22= | −1.58610162E−02 | 3.43741641E−03 | — | — |
| A24= | 2.05051925E−03 | −3.06145883E−04 | — | — |
| A26= | −1.51623355E−04 | 1.59103070E−05 | — | — |
| A28= | 4.92202587E−06 | −3.63292024E−07 | — | — |

In the 5th embodiment, the equation of the aspheric surface profiles of the aforementioned lens elements is the same as the equation of the 1st embodiment. Also, the definitions of these parameters shown in Table 5C below are the same as those stated in the 1st embodiment with corresponding values for the 5th embodiment, so an explanation in this regard will not be provided again.

Moreover, these parameters can be calculated from Table 5A and Table 5B as the following values and satisfy the following conditions:

TABLE 5C

| Values of Conditional Expressions | | | |
|---|---|---|---|
| f [mm] | 2.76 | R3/f2 | 0.59 |
| Fno | 1.89 | R3/R2 | −1.39 |
| HFOV [deg.] | 43.0 | R5/CT3 | −6.57 |
| V1/V2 | 2.88 | R8/R9 | 10.44 |
| (CT1 + CT2 + CT4 + CT5)/CT3 | 3.10 | f12/f345 | 0.73 |
| (CT2 + CT3 + CT4)/(T23 + T34) | 8.39 | f2/f4 | −2.55 |
| CT3/CT4 | 1.88 | f4/(|f3| + |f5|) | 0.06 |
| CT3/ET3 | 1.87 | Y52/R10 | 4.02 |
| TL/ImgH | 1.48 | Y52/Y11 | 2.92 |
| (|R5| + |R6|)/|f3| | 0.10 | Yc41/Yc42 | 0.90 |

TABLE 5C-continued

| Values of Conditional Expressions | | | |
|---|---|---|---|
| (R1 + R2)/f1 | 1.95 | Yc51/Y51 | 0.38 |
| (R7 + R8)/(R7 − R8) | −1.76 | Yc52/Y52 | 0.50 |

6th Embodiment

Figure 11:
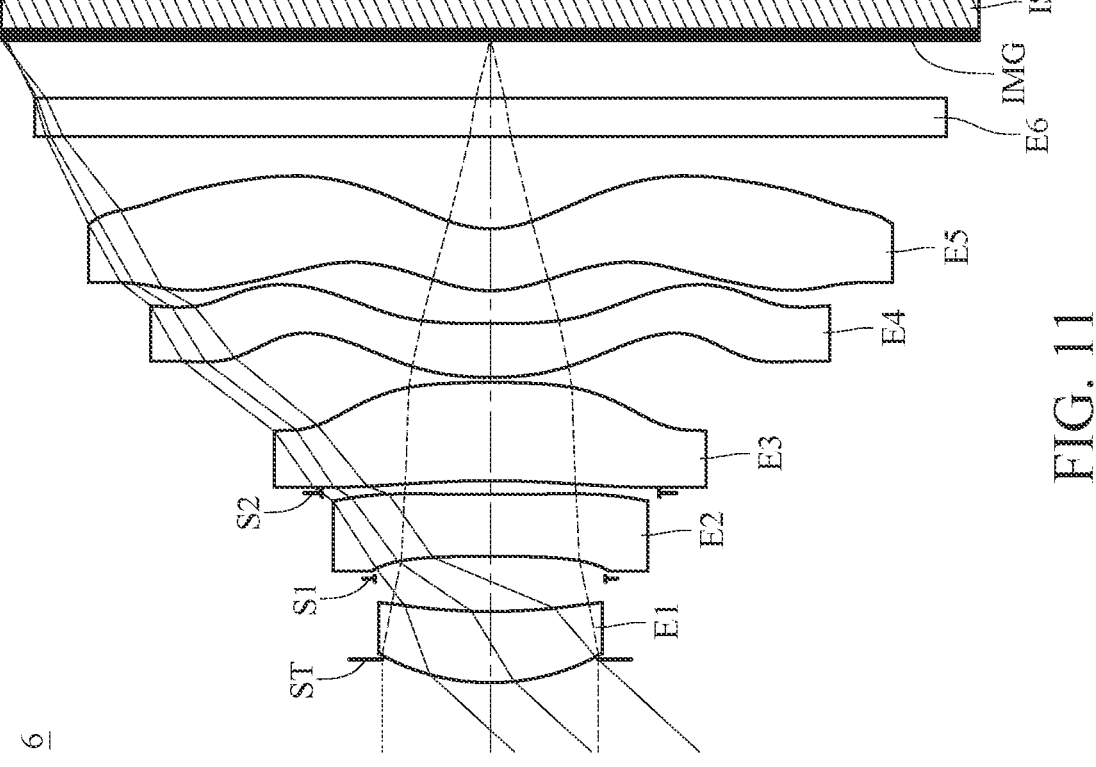
FIG. 11 is a schematic view of an image capturing unit according to the 6th embodiment of the present disclosure.
Figure 12:
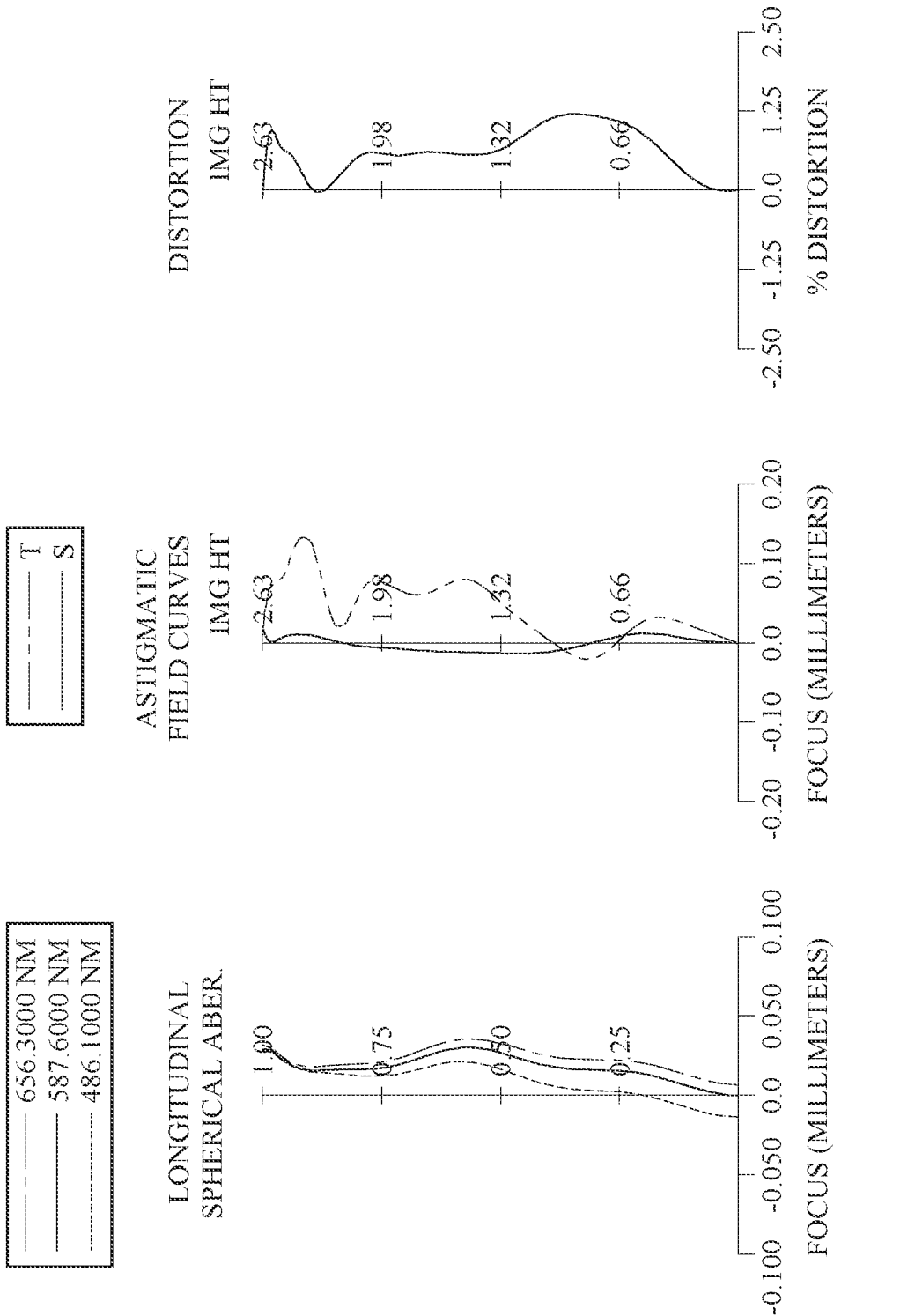
FIG. 12 shows spherical aberration curves, astigmatic field curves and a distortion curve of the image capturing unit according to the 6th embodiment.

FIG. 11 is a schematic view of an image capturing unit according to the 6th embodiment of the present disclosure. FIG. 12 shows, in order from left to right, spherical aberration curves, astigmatic field curves and a distortion curve of the image capturing unit according to the 6th embodiment. In FIG. 11, the image capturing unit 6 includes the optical imaging lens assembly (its reference numeral is omitted) of the present disclosure and an image sensor IS. The optical imaging lens assembly includes, in order from an object side to an image side along an optical axis, an aperture stop ST, a first lens element E1, a stop S1, a second lens element E2, a stop S2, a third lens element E3, a fourth lens element E4, a fifth lens element E5, a filter E6 and an image surface IMG. The optical imaging lens assembly includes five lens elements (E1, E2, E3, E4 and E5) with no additional lens element disposed between each of the adjacent five lens elements.

The first lens element E1 with positive refractive power has an object-side surface being convex in a paraxial region thereof and an image-side surface being concave in a paraxial region thereof. The first lens element E1 is made of plastic material and has the object-side surface and the image-side surface being both aspheric.

The second lens element E2 with negative refractive power has an object-side surface being concave in a paraxial region thereof and an image-side surface being concave in a paraxial region thereof. The second lens element E2 is made of plastic material and has the object-side surface and the image-side surface being both aspheric. The image-side surface of the second lens element E2 has one convex critical point in an off-axis region thereof.

The third lens element E3 with negative refractive power has an object-side surface being concave in a paraxial region thereof and an image-side surface being convex in a paraxial region thereof. The third lens element E3 is made of plastic material and has the object-side surface and the image-side surface being both aspheric. The object-side surface of the third lens element E3 has one convex critical point and one concave critical point in an off-axis region thereof.

The fourth lens element E4 with positive refractive power has an object-side surface being convex in a paraxial region thereof and an image-side surface being concave in a paraxial region thereof. The fourth lens element E4 is made of plastic material and has the object-side surface and the image-side surface being both aspheric. The object-side surface of the fourth lens element E4 has one convex critical point and one concave critical point in an off-axis region thereof. The image-side surface of the fourth lens element E4 has one convex critical point and one concave critical point in an off-axis region thereof.

The fifth lens element E5 with positive refractive power has an object-side surface being convex in a paraxial region thereof and an image-side surface being concave in a paraxial region thereof. The fifth lens element E5 is made of plastic material and has the object-side surface and the image-side surface being both aspheric. The object-side surface of the fifth lens element E5 has one convex critical point and one concave critical point in an off-axis region thereof. The image-side surface of the fifth lens element E5 has one convex critical point in an off-axis region thereof.

The filter E6 is made of glass material and located between the fifth lens element E5 and the image surface IMG, and will not affect the focal length of the optical imaging lens assembly. The image sensor IS is disposed on or near the image surface IMG of the optical imaging lens assembly.

The detailed optical data of the 6th embodiment are shown in Table 6A and the aspheric surface data are shown in Table 6B below.

TABLE 6A

| | | | | | | | |
|---|---|---|---|---|---|---|---|
| 6th Embodiment | | | | | | | |
| f = 2.39 mm, Fno = 2.05, HFOV = 47.5 deg. | | | | | | | |
| Surface # | | Curvature Radius | | Thickness | Material | Index | Abbe # | Focal Length |
| 0 | Object | Plano | | 500.000 | | | | |
| 1 | Ape. Stop | Plano | | −0.125 | | | | |
| 2 | Lens 1 | 1.26115 | (ASP) | 0.386 | Plastic | 1.545 | 56.1 | 3.47 |
| 3 | | 3.38480 | (ASP) | 0.177 | | | | |
| 4 | Stop | Plano | | 0.122 | | | | |
| 5 | Lens 2 | −15.71260 | (ASP) | 0.335 | Plastic | 1.697 | 16.3 | −10.51 |
| 6 | | 13.84640 | (ASP) | 0.010 | | | | |
| 7 | Stop | Plano | | 0.066 | | | | |
| 8 | Lens 3 | −4.55110 | (ASP) | 0.533 | Plastic | 1.544 | 56.0 | −79.03 |
| 9 | | −5.29990 | (ASP) | 0.027 | | | | |
| 10 | Lens 4 | 1.95181 | (ASP) | 0.292 | Plastic | 1.544 | 56.0 | 4.91 |
| 11 | | 6.84820 | (ASP) | 0.178 | | | | |
| 12 | Lens 5 | 0.67212 | (ASP) | 0.336 | Plastic | 1.544 | 56.0 | 124.29 |
| 13 | | 0.55929 | (ASP) | 0.500 | | | | |
| 14 | Filter | Plano | | 0.210 | Glass | 1.517 | 64.2 | — |
| 15 | | Plano | | 0.312 | | | | |
| 16 | Image | Plano | | — | | | | |

Note:
Reference wavelength is 587.6 nm (d-line).
An effective radius of the stop S1 (Surface 4) is 0.625 mm.
An effective radius of the stop S2 (Surface 7) is 0.915 mm.

TABLE 6B

| | | | | |
|---|---|---|---|---|
| Aspheric Coefficients | | | | |
| Surface # | 2 | 3 | 5 | 6 |
| k= | 0.00000E+00 | 0.00000E+00 | 0.00000E+00 | 0.00000E+00 |
| A4= | 2.29177699E−02 | 2.86457761E−01 | −7.17303078E−02 | −7.16121682E−03 |
| A6= | 2.91317426E−01 | −9.21743703E+00 | −3.29083025E+00 | −4.92432918E−01 |
| A8= | −8.20225532E+00 | 1.60152123E+02 | 2.35276127E+01 | 6.13028888E−01 |
| A10= | 1.00022473E+02 | −1.66160630E+03 | −9.83116341E+01 | 6.09780114E−01 |
| A12= | −6.13290442E+02 | 1.05660448E+04 | 2.28444142E+02 | −6.61568200E−01 |
| A14= | 2.02925130E+03 | −4.15767654E+04 | −2.83286751E+02 | −5.14751275E+00 |
| A16= | −3.47205118E+03 | 9.86317812E+04 | 1.44601707E+02 | 9.54597165E+00 |

TABLE 6B-continued

| Aspheric Coefficients | | | |
|---|---|---|---|
| A18= | 2.41155279E+03 | −1.29223057E+05 | — | −4.52577648E+00 |
| A20= | — | 7.17912906E+04 | — | — |

| Surface # | 8 | 9 | 10 | 11 |
|---|---|---|---|---|
| k= | 0.00000E+00 | 0.00000E+00 | 0.00000E+00 | 0.00000E+00 |
| A4= | 5.03938273E−02 | 1.07365357E−01 | 7.53787892E−01 | −9.38087773E−03 |
| A6= | 1.52296027E+00 | −3.13348343E+00 | −2.92473268E+00 | 3.72034991E+00 |
| A8= | −1.19779317E+01 | 1.00639741E+01 | 8.09745817E+00 | −1.41126949E+01 |
| A10= | 4.45143623E+01 | −1.76692427E+01 | −1.86189922E+01 | 2.70704960E+01 |
| A12= | −9.44416633E+01 | 1.86721284E+01 | 3.04682810E+01 | −3.31711322E+01 |
| A14= | 1.21487516E+02 | −1.08819759E+01 | −3.42101287E+01 | 2.80001017E+01 |
| A16= | −9.45626490E+01 | 2.51378780E+00 | 2.64089463E+01 | −1.67798180E+01 |
| A18= | 4.14430227E+01 | 4.62950884E−01 | −1.40906444E+01 | 7.19734318E+00 |
| A20= | −7.97198406E+00 | −3.31945112E−01 | 5.18201540E+00 | −2.19192931E+00 |
| A22= | — | 4.14641420E−02 | −1.28979282E+00 | 4.62085855E−01 |
| A24= | — | — | 2.07659991E−01 | −6.40206966E−02 |
| A26= | — | — | −1.95420261E−02 | 5.23783148E−03 |
| A28= | — | — | 8.17554979E−04 | −1.91585561E−04 |

| Surface # | 12 | 13 | — | — |
|---|---|---|---|---|
| k= | −1.02093E+00 | −1.00093E+00 | — | — |
| A4= | −1.46086665E+00 | −1.48492890E+00 | — | — |
| A6= | 2.09911337E+00 | 2.09324929E+00 | — | — |
| A8= | −2.82764549E+00 | −2.47487401E+00 | — | — |
| A10= | 2.70096702E+00 | 2.11602637E+00 | — | — |
| A12= | −1.45583162E+00 | −1.21468580E+00 | — | — |
| A14= | 2.37855721E−01 | 4.33019444E−01 | — | — |
| A16= | 2.11406465E−01 | −7.20440800E−02 | — | — |
| A18= | −1.69097968E−01 | −9.87455178E−03 | — | — |
| A20= | 6.05518386E−02 | 8.55138487E−03 | — | — |
| A22= | −1.27668065E−02 | −2.16180063E−03 | — | — |
| A24= | 1.62193768E−03 | 2.90339444E−04 | — | — |
| A26= | −1.14775295E−04 | −2.07736002E−05 | — | — |
| A28= | 3.46138942E−06 | 6.23458353E−07 | — | — |

In the 6th embodiment, the equation of the aspheric surface profiles of the aforementioned lens elements is the same as the equation of the 1st embodiment. Also, the definitions of these parameters shown in Table 6C below are the same as those stated in the 1st embodiment with corresponding values for the 6th embodiment, so an explanation in this regard will not be provided again.

Moreover, these parameters can be calculated from Table 6A and Table 6B as the following values and satisfy the following conditions:

TABLE 6C

| Values of Conditional Expressions | | | |
|---|---|---|---|
| f [mm] | 2.39 | R3/f2 | 1.50 |
| Fno | 2.05 | R3/R2 | −4.64 |
| HFOV [deg.] | 47.5 | R5/CT3 | −8.54 |
| V1/V2 | 3.45 | R8/R9 | 10.19 |
| (CT1 + CT2 + CT4 + CT5)/CT3 | 2.53 | f12/f345 | 1.16 |
| (CT2 + CT3 + CT4)/(T23 + T34) | 11.26 | f2/f4 | −2.14 |
| CT3/CT4 | 1.83 | f4/(\|f3\| + \|f5\|) | 0.02 |
| CT3/ET3 | 1.75 | Y52/R10 | 3.90 |
| TL/ImgH | 1.32 | Y52/Y11 | 3.63 |
| (\|R5\| + \|R6\|)/\|f3\| | 0.12 | Yc41/Yc42 | 0.89 |
| (R1 + R2)/f1 | 1.34 | Yc51/Y51 | 0.37 |
| (R7 + R8)/(R7 − R8) | −1.80 | Yc52/Y52 | 0.49 |

7th Embodiment

Figure 13:
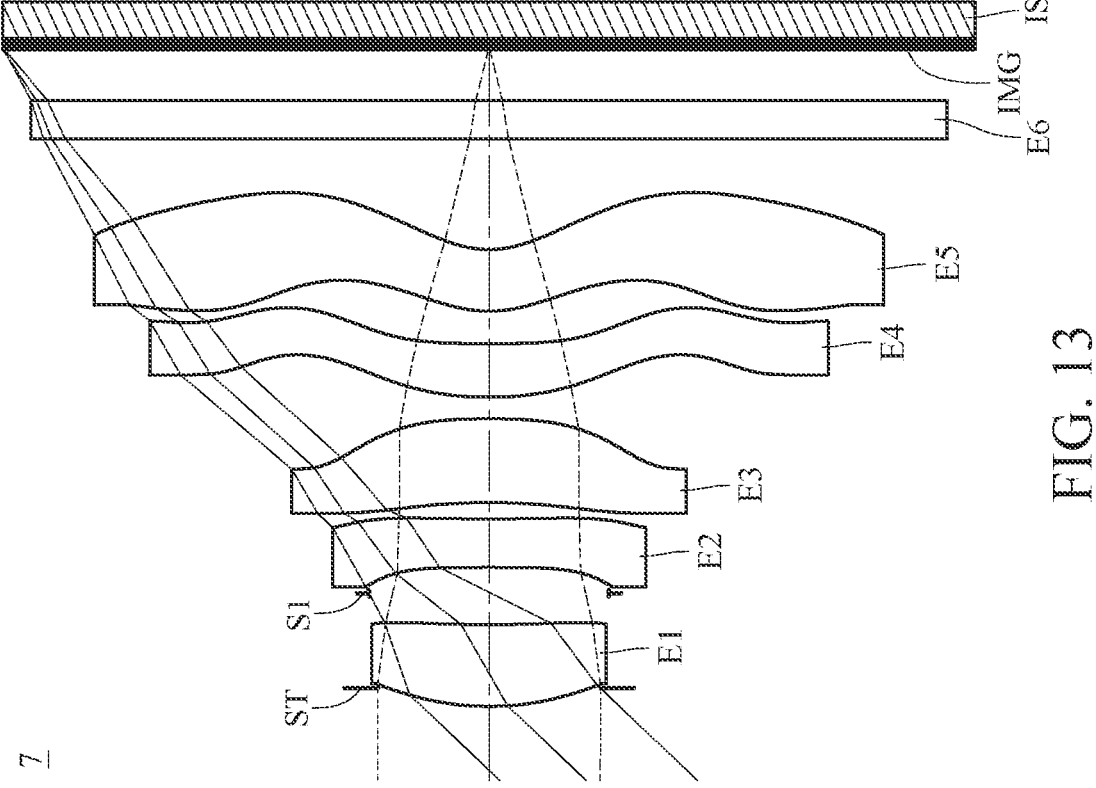
FIG. 13 is a schematic view of an image capturing unit according to the 7th embodiment of the present disclosure.
Figure 14:
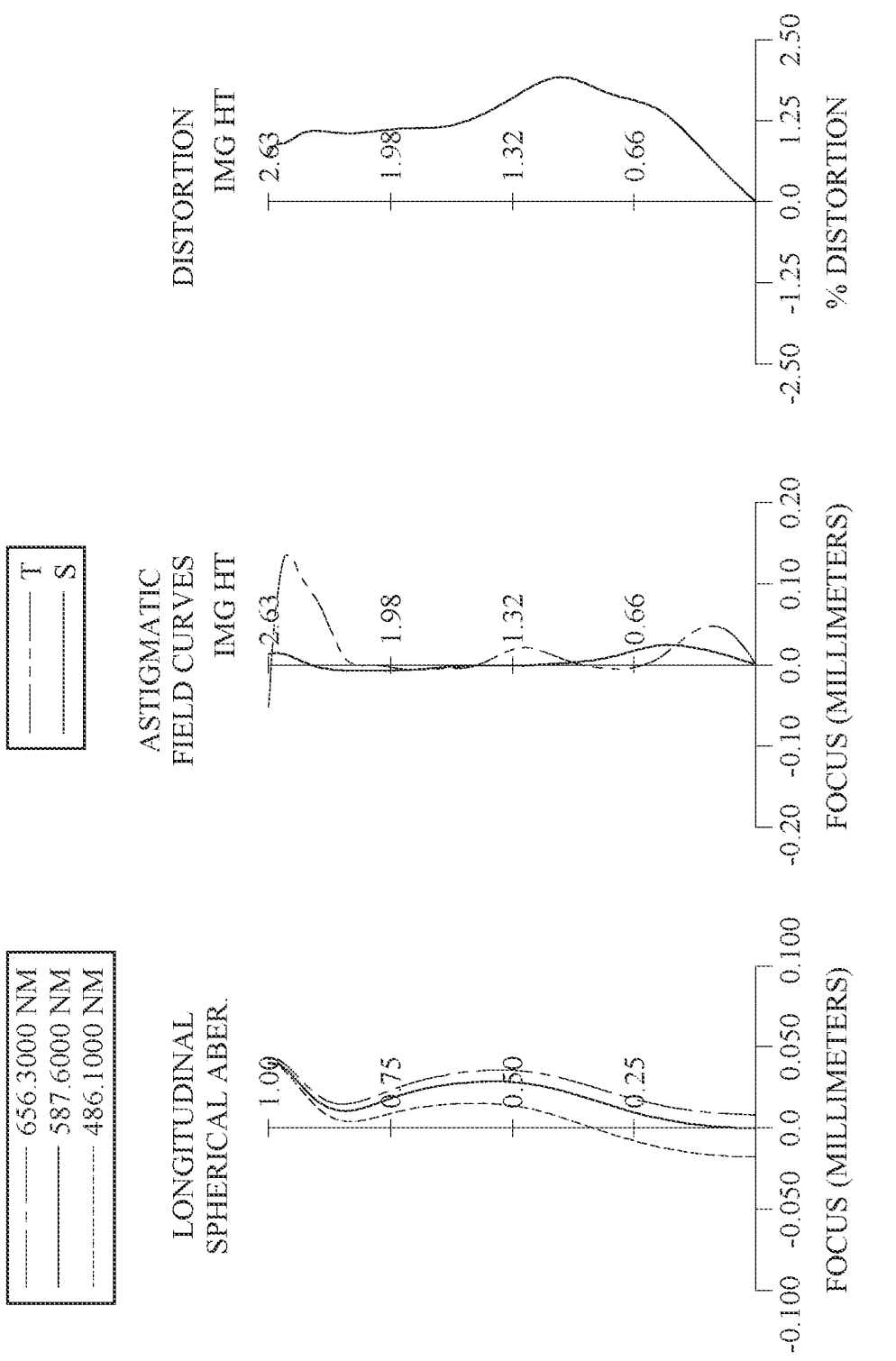
FIG. 14 shows spherical aberration curves, astigmatic field curves and a distortion curve of the image capturing unit according to the 7th embodiment.

FIG. 13 is a schematic view of an image capturing unit according to the 7th embodiment of the present disclosure. FIG. 14 shows, in order from left to right, spherical aberration curves, astigmatic field curves and a distortion curve of the image capturing unit according to the 7th embodiment. In FIG. 13, the image capturing unit 7 includes the optical imaging lens assembly (its reference numeral is omitted) of the present disclosure and an image sensor IS. The optical imaging lens assembly includes, in order from an object side to an image side along an optical axis, an aperture stop ST, a first lens element E1, a stop S1, a second lens element E2, a third lens element E3, a fourth lens element E4, a fifth lens element E5, a filter E6 and an image surface IMG. The optical imaging lens assembly includes five lens elements (E1, E2, E3, E4 and E5) with no additional lens element disposed between each of the adjacent five lens elements.

The first lens element E1 with positive refractive power has an object-side surface being convex in a paraxial region thereof and an image-side surface being concave in a paraxial region thereof. The first lens element E1 is made of plastic material and has the object-side surface and the image-side surface being both aspheric. The image-side surface of the first lens element E1 has one convex critical point in an off-axis region thereof.

The second lens element E2 with negative refractive power has an object-side surface being concave in a paraxial region thereof and an image-side surface being concave in a paraxial region thereof. The second lens element E2 is made of plastic material and has the object-side surface and the image-side surface being both aspheric. The image-side surface of the second lens element E2 has one convex critical point in an off-axis region thereof.

The third lens element E3 with negative refractive power has an object-side surface being concave in a paraxial region thereof and an image-side surface being convex in a paraxial region thereof. The third lens element E3 is made of plastic material and has the object-side surface and the image-side surface being both aspheric. The object-side surface of the third lens element E3 has one convex critical point and one concave critical point in an off-axis region thereof.

The fourth lens element E4 with positive refractive power has an object-side surface being convex in a paraxial region thereof and an image-side surface being concave in a paraxial region thereof. The fourth lens element E4 is made of plastic material and has the object-side surface and the image-side surface being both aspheric. The object-side surface of the fourth lens element E4 has one concave critical point in an off-axis region thereof. The image-side surface of the fourth lens element E4 has one convex critical point and one concave critical point in an off-axis region thereof.

The fifth lens element E5 with negative refractive power has an object-side surface being convex in a paraxial region thereof and an image-side surface being concave in a paraxial region thereof. The fifth lens element E5 is made of plastic material and has the object-side surface and the image-side surface being both aspheric. The object-side surface of the fifth lens element E5 has one convex critical point and one concave critical point in an off-axis region thereof. The image-side surface of the fifth lens element E5 has one convex critical point in an off-axis region thereof.

The filter E6 is made of glass material and located between the fifth lens element E5 and the image surface IMG, and will not affect the focal length of the optical imaging lens assembly. The image sensor IS is disposed on or near the image surface IMG of the optical imaging lens assembly.

The detailed optical data of the 7th embodiment are shown in Table 7A and the aspheric surface data are shown in Table 7B below.

TABLE 7A

|  |  |  |  | 7th Embodiment | | | |
|  |  |  | f = 2.46 mm, Fno = 2.05, HFOV = 46.4 deg. | | | | |
| Surface # |  | Curvature Radius | | Thickness | Material | Index | Abbe # | Focal Length |
|---|---|---|---|---|---|---|---|---|
| 0 | Object | Plano |  | 380.000 |  |  |  |  |
| 1 | Ape. Stop | Plano |  | −0.099 |  |  |  |  |
| 2 | Lens 1 | 1.48627 | (ASP) | 0.443 | Plastic | 1.545 | 56.1 | 3.64 |
| 3 |  | 5.32370 | (ASP) | 0.170 |  |  |  |  |
| 4 | Stop | Plano |  | 0.142 |  |  |  |  |
| 5 | Lens 2 | −18.69580 | (ASP) | 0.262 | Plastic | 1.669 | 19.5 | −11.29 |
| 6 |  | 12.75330 | (ASP) | 0.089 |  |  |  |  |
| 7 | Lens 3 | −3.52490 | (ASP) | 0.455 | Plastic | 1.544 | 56.0 | −81.76 |
| 8 |  | −4.00240 | (ASP) | 0.117 |  |  |  |  |
| 9 | Lens 4 | 1.96782 | (ASP) | 0.290 | Plastic | 1.544 | 56.0 | 4.83 |
| 10 |  | 7.42750 | (ASP) | 0.176 |  |  |  |  |
| 11 | Lens 5 | 0.65961 | (ASP) | 0.335 | Plastic | 1.544 | 56.0 | −155.75 |
| 12 |  | 0.53739 | (ASP) | 0.600 |  |  |  |  |
| 13 | Filter | Plano |  | 0.210 | Glass | 1.517 | 64.2 | — |
| 14 |  | Plano |  | 0.273 |  |  |  |  |
| 15 | Image | Plano |  | — |  |  |  |  |

Note:
Reference wavelength is 587.6 nm (d-line).
An effective radius of the stop S1 (Surface 4) is 0.650 mm.

TABLE 7B

| | Aspheric Coefficients | | | |
|---|---|---|---|---|
| Surface # | 2 | 3 | 5 | 6 |
| k= | 2.63850E−02 | 5.94126E−01 | −9.90000E+01 | −8.03891E+01 |
| A4= | −1.38021586E−01 | −2.09049044E−01 | 3.93715109E−04 | 7.09252678E−02 |
| A6= | 1.91023944E+00 | 1.81296590E+00 | −6.44942728E+00 | −1.82603557E+00 |
| A8= | −1.74908527E+01 | −1.98484951E+01 | 6.55443493E+01 | 1.08292277E+01 |
| A10= | 1.00976912E+02 | 1.00011111E+02 | −4.39120774E+02 | −4.56371657E+01 |
| A12= | −4.60271479E+02 | −1.89880869E+02 | 1.85954445E+03 | 1.28117195E+02 |
| A14= | 1.69827350E+03 | −4.73506638E+02 | −4.98059277E+03 | −2.31391510E+02 |
| A16= | −4.33901929E+03 | 3.16230426E+03 | 8.09436811E+03 | 2.52116745E+02 |
| A18= | 6.27459805E+03 | −6.00396053E+03 | −7.16807683E+03 | −1.47286829E+02 |
| A20= | −3.76446055E+03 | 4.04116560E+03 | 2.61334226E+03 | 3.48631841E+01 |
| Surface # | 7 | 8 | 9 | 10 |
| k= | 0.00000E+00 | −1.18346E−01 | −1.54229E−01 | 3.64160E+00 |
| A4= | −1.36401096E−01 | −3.80348769E−01 | 3.98356836E−01 | 7.91430750E−02 |
| A6= | 1.78245374E+00 | −2.15813561E+00 | −1.63364211E+00 | 2.18442459E+00 |
| A8= | −1.02375468E+01 | 1.66116928E+01 | 5.91408051E+00 | −6.92134022E+00 |
| A10= | 3.73456330E+01 | −6.35204269E+01 | −1.60688045E+01 | 9.90045420E+00 |
| A12= | −7.99906391E+01 | 1.53143428E+02 | 2.75381983E+01 | −8.00112662E+00 |
| A14= | 1.00125271E+02 | −2.45177705E+02 | −3.10781391E+01 | 3.36415221E+00 |
| A16= | −7.11269171E+01 | 2.68774334E+02 | 2.41912253E+01 | −2.19157667E−02 |

TABLE 7B-continued

| | | Aspheric Coefficients | | |
|---|---|---|---|---|
| A18= | 2.60297900E+01 | −2.00764351E+02 | −1.33508734E+01 | −8.55893444E−01 |
| A20= | −3.73445863E+00 | 9.74678255E+01 | 5.28220569E+00 | 5.44003527E−01 |
| A22= | — | −2.75674236E+01 | −1.49138529E+01 | −1.85903020E−01 |
| A24= | — | 3.42673391E+00 | 2.93632796E−01 | 3.95267204E−02 |
| A26= | — | — | −3.83027485E−02 | −5.23415364E−03 |
| A28= | — | — | 2.97230738E−03 | 3.96892947E−04 |
| A30= | — | — | −1.03702948E−04 | −1.32016329E−05 |

| Surface # | 11 | 12 | — | — |
|---|---|---|---|---|
| k= | −1.03033E+00 | −9.96850E−01 | — | — |
| A4= | −1.58063511E+00 | −1.63864735E+00 | — | — |
| A6= | 3.07583408E+00 | 2.76909410E+00 | — | — |
| A8= | −6.32335394E+00 | −4.32231458E+00 | — | — |
| A10= | 1.05047979E+01 | 5.37367058E+00 | — | — |
| A12= | −1.27272405E+01 | −5.03803939E+00 | — | — |
| A14= | 1.10057694E+01 | 3.49891935E+00 | — | — |
| A16= | −6.79973594E+00 | −1.78891527E+00 | — | — |
| A18= | 3.01752290E+00 | 6.70931307E−01 | — | — |
| A20= | −9.62559336E−01 | −1.83393992E−01 | — | — |
| A22= | 2.18709795E−01 | 3.60204953E−02 | — | — |
| A24= | −3.45365020E−02 | −4.94353747E−03 | — | — |
| A26= | 3.60176341E−03 | 4.49577670E−04 | — | — |
| A28= | −2.23022817E−04 | −2.43259216E−05 | — | — |
| A30= | 6.20847935E−06 | 5.92520648E−07 | — | — |

In the 7th embodiment, the equation of the aspheric surface profiles of the aforementioned lens elements is the same as the equation of the 1st embodiment. Also, the definitions of these parameters shown in Table 7C below are the same as those stated in the 1st embodiment with corresponding values for the 7th embodiment, so an explanation in this regard will not be provided again.

Moreover, these parameters can be calculated from Table 7A and Table 7B as the following values and satisfy the following conditions:

TABLE 7C

| Values of Conditional Expressions | | | |
|---|---|---|---|
| f [mm] | 2.46 | R3/f2 | 1.66 |
| Fno | 2.05 | R3/R2 | −3.51 |
| HFOV [deg.] | 46.4 | R5/CT3 | −7.75 |
| V1/V2 | 2.88 | R8/R9 | 11.26 |
| (CT1 + CT2 + CT4 + CT5)/CT3 | 2.92 | f12/f345 | 1.18 |
| (CT2 + CT3 + CT4)/(T23 + T34) | 4.89 | f2/f4 | −2.34 |
| CT3/CT4 | 1.57 | f4/(|f3| + |f5|) | 0.02 |
| CT3/ET3 | 1.89 | Y52/R10 | 3.98 |
| TL/ImgH | 1.35 | Y52/Y11 | 3.50 |
| (|R5| + |R6|)/|f3| | 0.09 | Yc41/Yc42 | 0.95 |
| (R1 + R2)/f1 | 1.87 | Yc51/Y51 | 0.41 |
| (R7 + R8)/(R7 − R8) | −1.72 | Yc52/Y52 | 0.52 |

8th Embodiment

Figure 15:
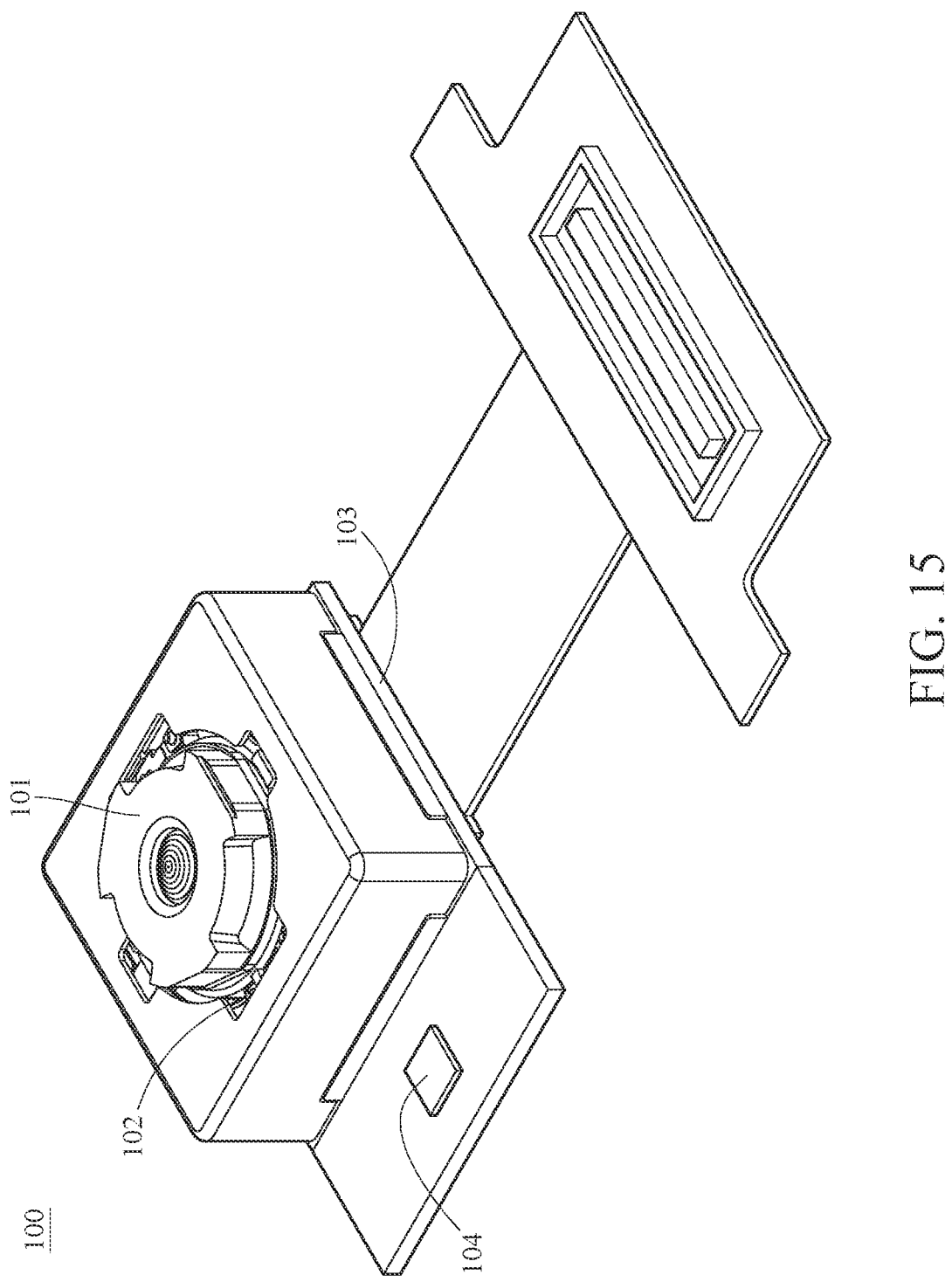
FIG. 15 is a perspective view of an image capturing unit according to the 8th embodiment of the present disclosure.

FIG. 15 is a perspective view of an image capturing unit according to the 8th embodiment of the present disclosure. In this embodiment, an image capturing unit 100 is a camera module including a lens unit 101, a driving device 102, an image sensor 103 and an image stabilizer 104. The lens unit 101 includes the optical imaging lens assembly as disclosed in the 1st embodiment, a barrel and a holder member (their reference numerals are omitted) for holding the optical imaging lens assembly. However, the lens unit 101 may alternatively be provided with the optical imaging lens assembly as disclosed in other embodiments of the present disclosure, and the present disclosure is not limited thereto.

The imaging light converges in the lens unit 101 of the image capturing unit 100 to generate an image with the driving device 102 utilized for image focusing on the image sensor 103, and the generated image is then digitally transmitted to other electronic component for further processing.

The driving device 102 can have auto focusing functionality, and different driving configurations can be obtained through the usages of voice coil motors (VCM), micro electro-mechanical systems (MEMS), piezoelectric systems or shape memory alloy materials. The driving device 102 is favorable for obtaining a better imaging position of the lens unit 101, so that a clear image of the imaged object can be captured by the lens unit 101 with different object distances. The image sensor 103 (for example, CMOS or CCD), which can feature high photosensitivity and low noise, is disposed on the image surface of the optical imaging lens assembly to provide higher image quality.

The image stabilizer 104, such as an accelerometer, a gyro sensor and a Hall Effect sensor, is configured to work with the driving device 102 to provide optical image stabilization (OIS). The driving device 102 working with the image stabilizer 104 is favorable for compensating for pan and tilt of the lens unit 101 to reduce blurring associated with motion during exposure. In some cases, the compensation can be provided by electronic image stabilization (EIS) with image processing software, thereby improving image quality while in motion or low-light conditions.

9th Embodiment

Figure 16:
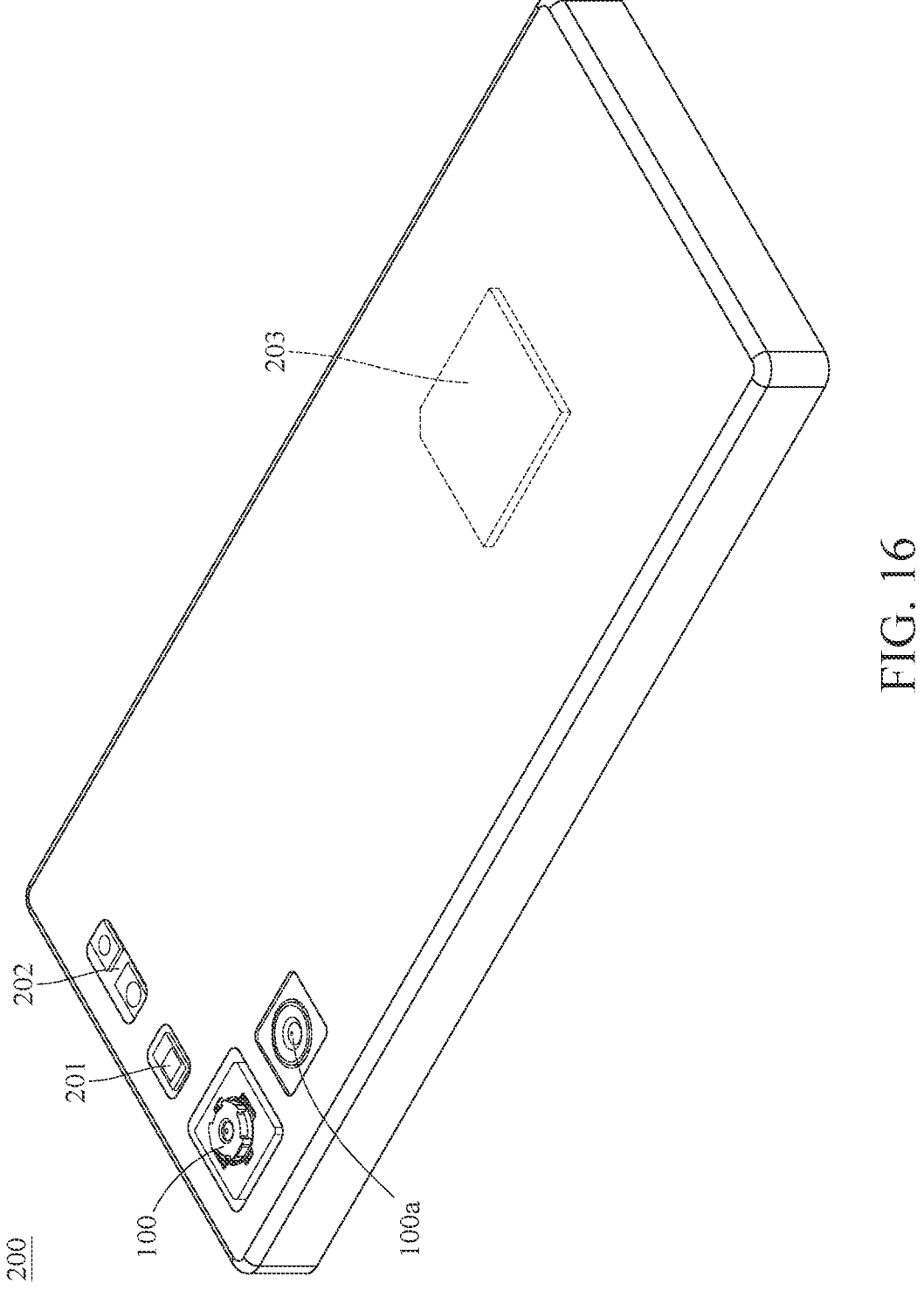
FIG. 16 is one perspective view of an electronic device according to the 9th embodiment of the present disclosure.
Figure 17:
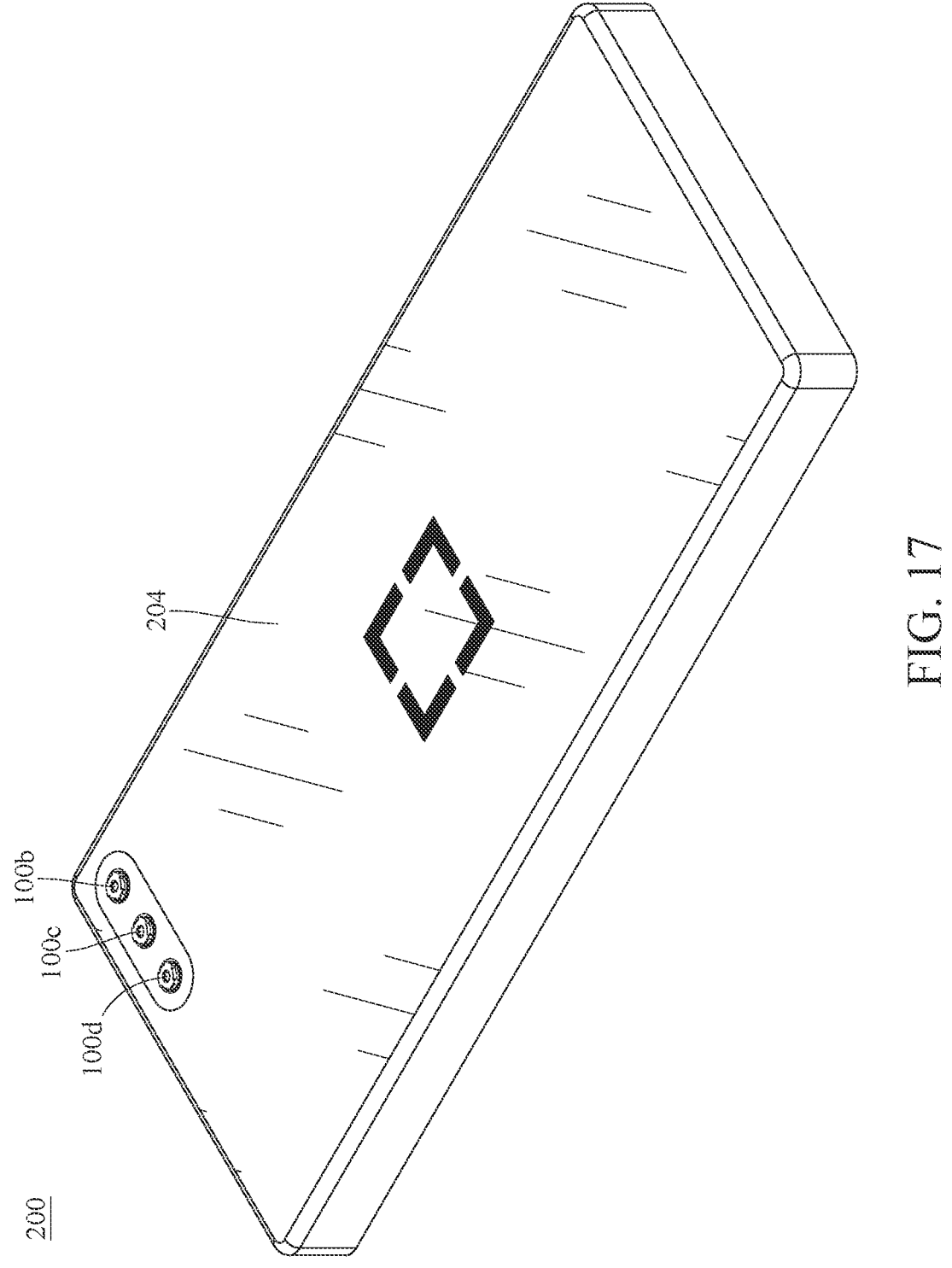
FIG. 17 is another perspective view of the electronic device in FIG. 16.
Figure 18:
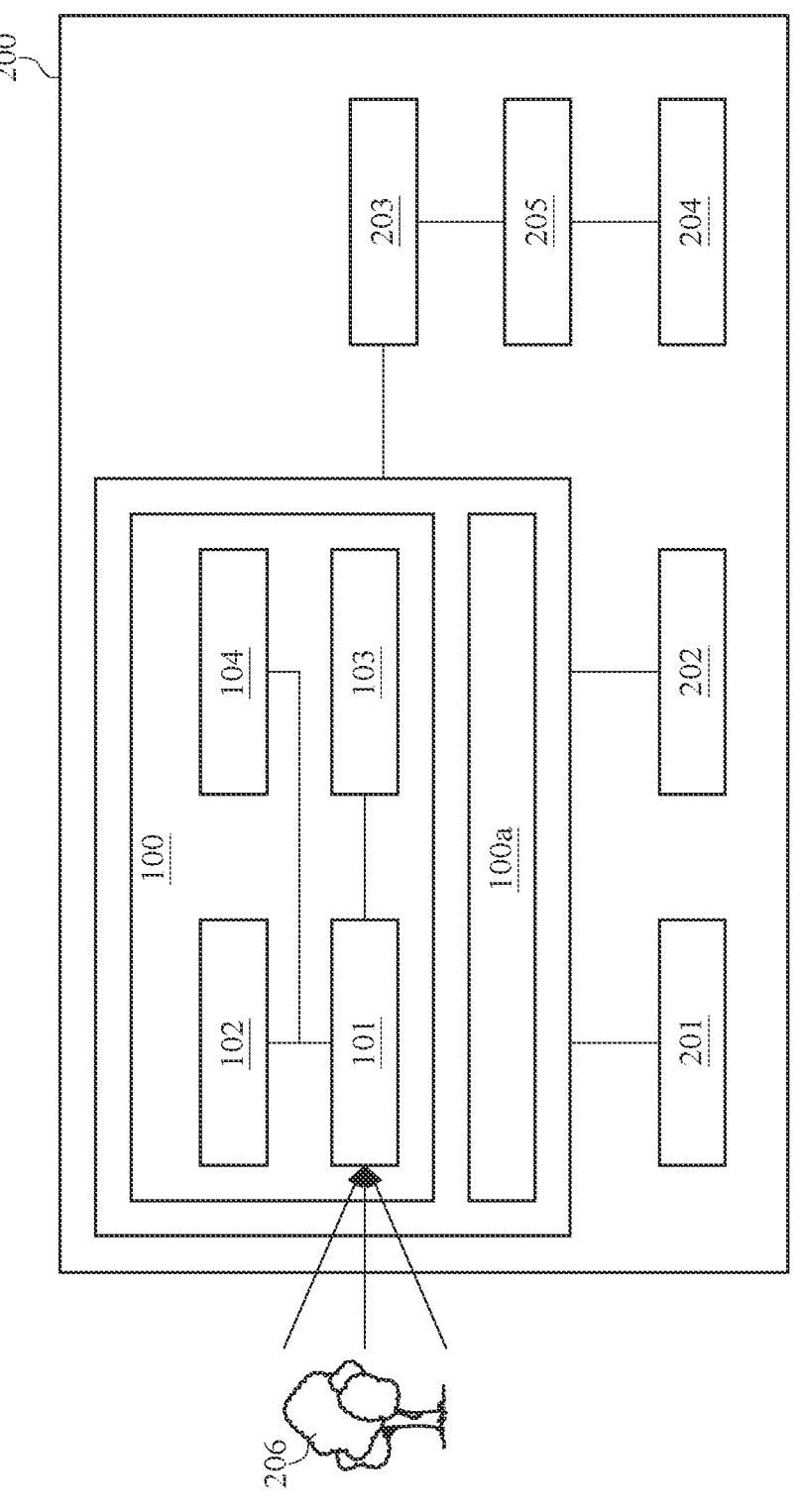
FIG. 18 is a block diagram of the electronic device in FIG. 16.

FIG. 16 is one perspective view of an electronic device according to the 9th embodiment of the present disclosure. FIG. 17 is another perspective view of the electronic device in FIG. 16. FIG. 18 is a block diagram of the electronic device in FIG. 16.

In this embodiment, an electronic device 200 is a smartphone including the image capturing unit 100 as disclosed in the 8th embodiment, an image capturing unit 100a, an image capturing unit 100b, an image capturing unit 100c, an image capturing unit 100d, a flash module 201, a focus assist module 202, an image signal processor 203, a display module 204 and an image software processor 205. The image capturing unit 100 and the image capturing unit 100*a* are disposed on the same side of the electronic device 200 and each of the image capturing units 100 and 100*a* has a single focal point. The focus assist module 202 can be a laser rangefinder or a ToF (time of flight) module, but the present disclosure is not limited thereto. The image capturing unit 100*b*, the image capturing unit 100*c*, the image capturing unit 100*d* and the display module 204 are disposed on the opposite side of the electronic device 200, and the display module 204 can be a user interface, such that the image capturing units 100*b*, 100*c* and 100*d* can be front-facing cameras of the electronic device 200 for taking selfies, but the present disclosure is not limited thereto. Furthermore, each of the image capturing units 100*a*, 100*b*, 100*c* and 100*d* can include the optical imaging lens assembly of the present disclosure and can have a configuration similar to that of the image capturing unit 100. In detail, each of the image capturing units 100*a*, 100*b*, 100*c* and 100*d* can include a lens unit, a driving device, an image sensor and an image stabilizer, and can also include a light-folding element for folding optical path. In addition, each lens unit of the image capturing units 100*a*, 100*b*, 100*c* and 100*d* can include the optical imaging lens assembly of the present disclosure, a barrel and a holder member for holding the optical imaging lens assembly.

The image capturing unit 100 is a wide-angle image capturing unit, the image capturing unit 100*a* is an ultra-wide-angle image capturing unit, the image capturing unit 100*b* is a wide-angle image capturing unit, the image capturing unit 100*c* is an ultra-wide-angle image capturing unit, and the image capturing unit 100*d* is a ToF image capturing unit. In this embodiment, the image capturing units 100, 100*a*, 100*b* and 100*c* have different fields of view, such that the electronic device 200 can have various magnification ratios so as to meet the requirement of optical zoom functionality. In addition, the image capturing unit 100*d* can determine depth information of the imaged object. Moreover, the image capturing unit(s) can have a light-folding configuration similar to one of the configurations as shown in FIG. 22 to FIG. 24, which can be referred to foregoing descriptions corresponding to FIG. 22 to FIG. 24, and the details in this regard will not be provided again. In this embodiment, the electronic device 200 includes multiple image capturing units 100, 100*a*, 100*b*, 100*c* and 100*d*, but the present disclosure is not limited to the number and arrangement of image capturing units.

When a user captures images of an object 206, the light rays converge in the image capturing unit 100 or the image capturing unit 100*a* to generate images, and the flash module 201 is activated for light supplement. The focus assist module 202 detects the object distance of the imaged object 206 to achieve fast auto focusing. The image signal processor 203 is configured to optimize the captured image to improve image quality. The light beam emitted from the focus assist module 202 can be either conventional infrared or laser. In addition, the light rays may converge in the image capturing unit 100*b*, 100*c* or 100*d* to generate images. The display module 204 can include a touch screen, and the user is able to interact with the display module 204 and the image software processor 205 having multiple functions to capture images and complete image processing. Alternatively, the user may capture images via a physical button. The image processed by the image software processor 205 can be displayed on the display module 204.

10th Embodiment

Figure 19:
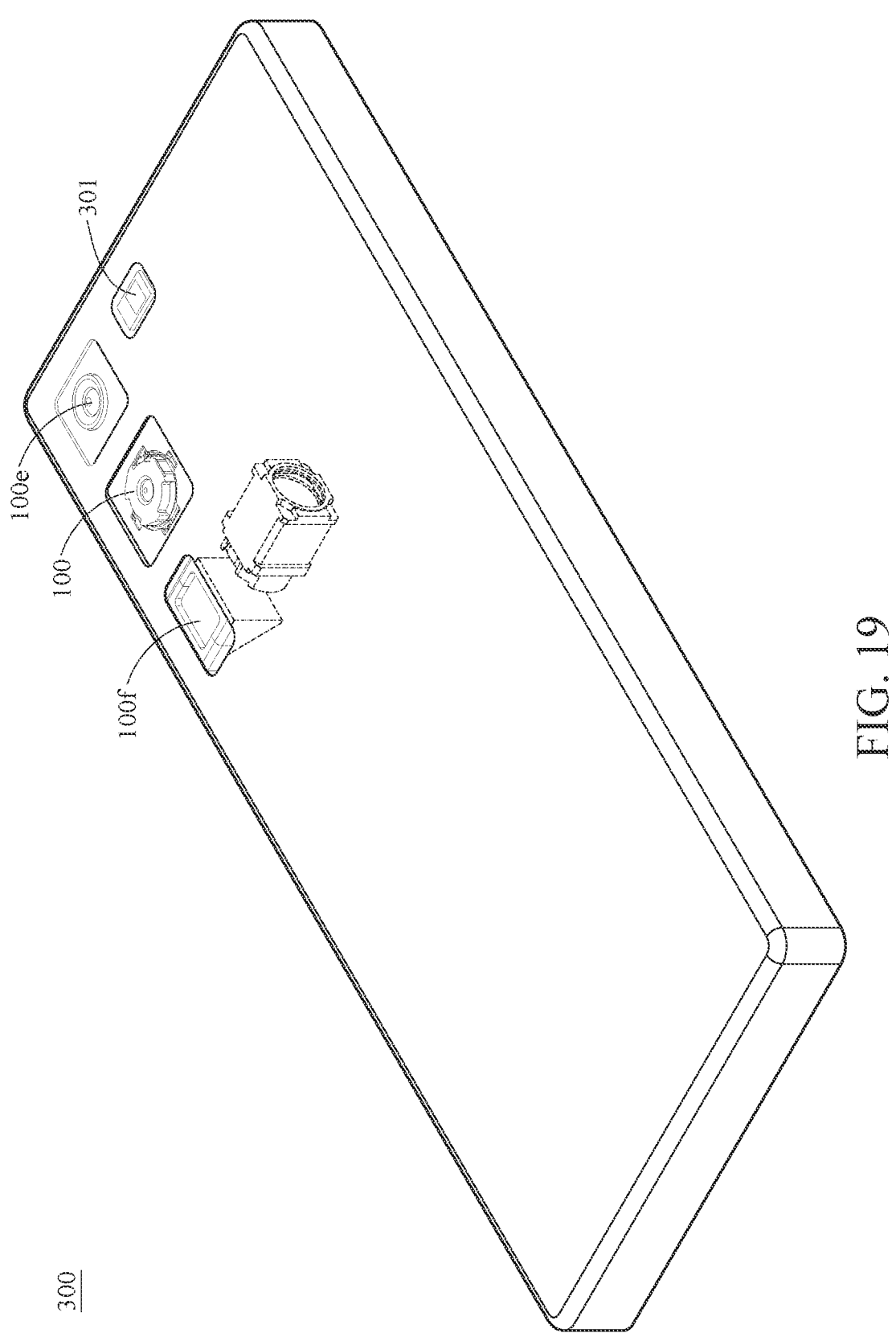
FIG. 19 is a perspective view of an electronic device according to the 10th embodiment of the present disclosure.

FIG. 19 is a perspective view of an electronic device according to the 10th embodiment of the present disclosure.

In this embodiment, an electronic device 300 is a smartphone including the image capturing unit 100 as disclosed in the 8th embodiment, an image capturing unit 100*e*, an image capturing unit 100*f*, a flash module 301, a focus assist module, an image signal processor, a display module and an image software processor (not shown). The image capturing unit 100, the image capturing unit 100*e* and the image capturing unit 100*f* are disposed on the same side of the electronic device 300, while the display module is disposed on the opposite side of the electronic device 300. Furthermore, each of the image capturing units 100*e* and 100*f* can include the optical imaging lens assembly of the present disclosure and can have a configuration similar to that of the image capturing unit 100, and the details in this regard will not be provided again.

The image capturing unit 100 is a wide-angle image capturing unit, the image capturing unit 100*e* is an ultra-wide-angle image capturing unit, and the image capturing unit 100*f* is a telephoto image capturing unit with optical path folding function. In this embodiment, the image capturing units 100, 100*e* and 100*f* have different fields of view, such that the electronic device 300 can have various magnification ratios so as to meet the requirement of optical zoom functionality. Moreover, the light-folding configuration of the image capturing unit 100*f* can be similar to, for example, one of the structures shown in FIG. 22 to FIG. 24, which can be referred to foregoing descriptions corresponding to FIG. 22 to FIG. 24, and the details in this regard will not be provided again. In this embodiment, the electronic device 300 includes multiple image capturing units 100, 100*e* and 100*f*, but the present disclosure is not limited to the number and arrangement of image capturing units. When a user captures images of an object, the light rays converge in the image capturing unit 100, 100*e* or 100*f* to generate images, and the flash module 301 is activated for light supplement. Further, the subsequent processes are performed in a manner similar to the abovementioned embodiments, and the details in this regard will not be provided again.

11th Embodiment

Figure 20:
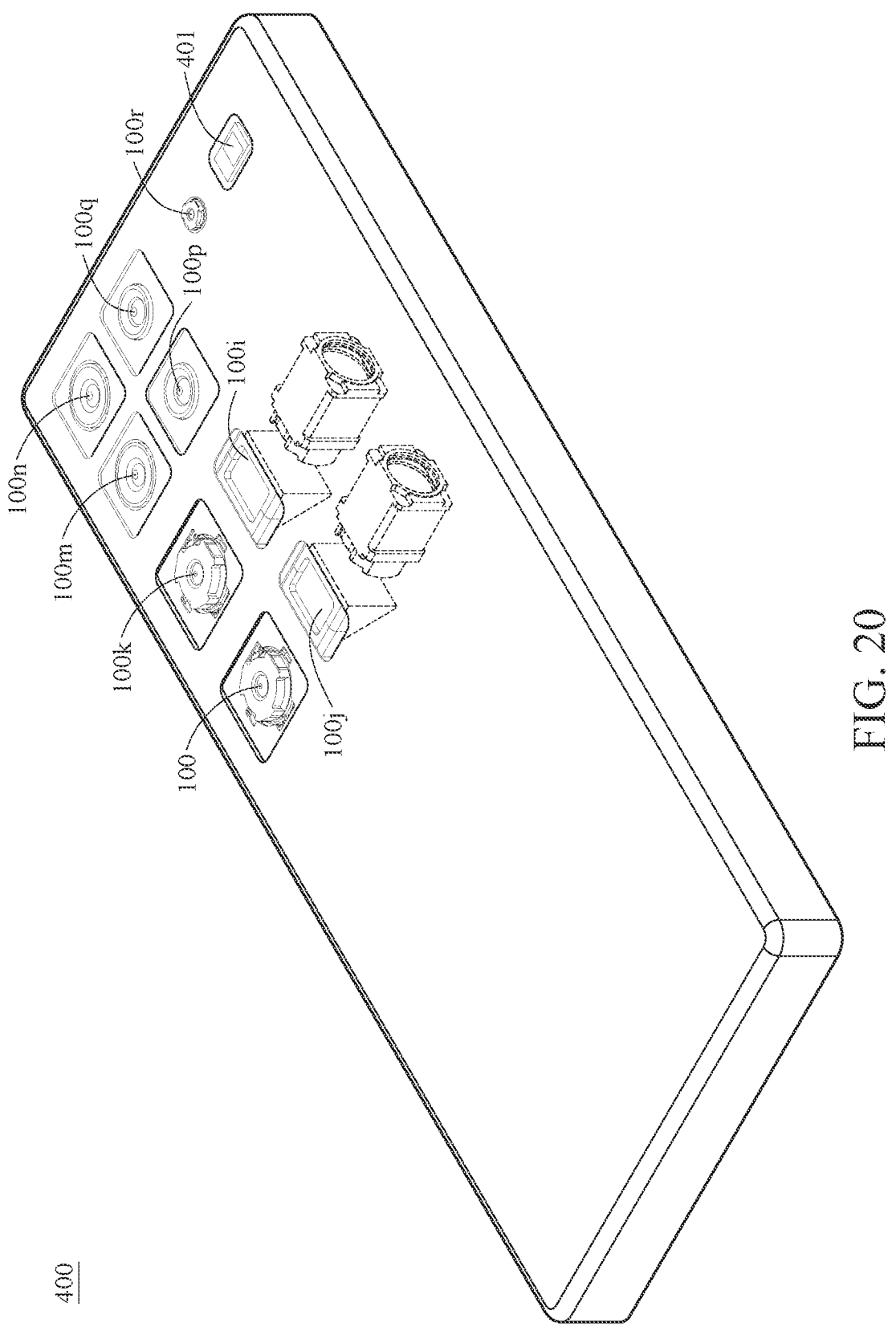
FIG. 20 is a schematic view of an electronic device according to the 11th embodiment of the present disclosure.

FIG. 20 is a perspective view of an electronic device according to the 11th embodiment of the present disclosure.

In this embodiment, an electronic device 400 is a smartphone including the image capturing unit 100 as disclosed in the 8th embodiment, an image capturing unit 100*i*, an image capturing unit 100*j*, an image capturing unit 100*k*, an image capturing unit 100*m*, an image capturing unit 100*n*, an image capturing unit 100*p*, an image capturing unit 100*q*, an image capturing unit 100*r*, a flash module 401, a focus assist module, an image signal processor, a display module and an image software processor (not shown). The image capturing units 100, 100*i*, 100*j*, 100*k*, 100*m*, 100*n*, 100*p*, 100*q* and 100*r* are disposed on the same side of the electronic device 400, while the display module is disposed on the opposite side of the electronic device 400. Furthermore, each of the image capturing units 100*i*, 100*j*, 100*k*, 100*m*, 100*n*, 100*p*, 100*q* and 100*r* can include the optical imaging lens assembly of the present disclosure and can have a configuration similar to that of the image capturing unit 100, and the details in this regard will not be provided again.

The image capturing unit 100 is a wide-angle image capturing unit, the image capturing unit 100*i* is a telephoto image capturing unit with optical path folding function, the image capturing unit 100*j* is a telephoto image capturing unit with optical path folding function, the image capturing unit 100*k* is a wide-angle image capturing unit, the image capturing unit 100*m* is an ultra-wide-angle image capturing unit, the image capturing unit 100*n* is an ultra-wide-angle telephoto image capturing unit, the image capturing unit 100*p* is a telephoto image capturing unit, the image capturing unit 100*q* is a telephoto image capturing unit, and the image capturing unit 100*r* is a ToF image capturing unit. In this embodiment, the image capturing units 100, 100*i*, 100*j*, 100*k*, 100*m*, 100*n*, 100*p* and 100*q* have different fields of view, such that the electronic device 400 can have various magnification ratios so as to meet the requirement of optical zoom functionality. In addition, the image capturing unit 100*r* can determine depth information of the imaged object. Moreover, the light-folding configuration of the image capturing units 100*i* and 100*j* can be similar to, for example, one of the structures shown in FIG. 22 to FIG. 24, which can be referred to foregoing descriptions corresponding to FIG. 22 to FIG. 24, and the details in this regard will not be provided again. In this embodiment, the electronic device 400 includes multiple image capturing units 100, 100*i*, 100*j*, 100*k*, 100*m*, 100*n*, 100*p*, 100*q* and 100*r*, but the present disclosure is not limited to the number and arrangement of image capturing units. When a user captures images of an object, the light rays converge in the image capturing unit 100, 100*i*, 100*j*, 100*k*, 100*m*, 100*n*, 100*p*, 100*q* or 100*r* to generate images, and the flash module 401 is activated for light supplement. Further, the subsequent processes are performed in a manner similar to the abovementioned embodiments, and the details in this regard will not be provided again.

The smartphone in the embodiments are only exemplary for showing the image capturing unit of the present disclosure installed in an electronic device, and the present disclosure is not limited thereto. The image capturing unit can be optionally applied to optical systems with a movable focus. Furthermore, the optical imaging lens assembly of the image capturing unit features good capability in aberration corrections and high image quality, and can be applied to 3D (three-dimensional) image capturing applications, in products such as digital cameras, mobile devices, digital tablets, smart televisions, network surveillance devices, dashboard cameras, vehicle backup cameras, multi-camera devices, image recognition systems, motion sensing input devices, unmanned aerial vehicles, wearable devices, portable video recorders and other electronic imaging devices.

The foregoing description, for the purpose of explanation, has been described with reference to specific embodiments. It is to be noted that TABLES 1A-7C show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An optical imaging lens assembly comprising five lens elements, the five lens elements being, in order from an object side to an image side along an optical path, a first lens element, a second lens element, a third lens element, a fourth lens element and a fifth lens element, and each of the five lens elements having an object-side surface facing toward the object side and an image-side surface facing toward the image side;

wherein the first lens element has positive refractive power, the object-side surface of the first lens element is convex in a paraxial region thereof, the image-side surface of the first lens element is concave in a paraxial region thereof, the object-side surface of the second lens element is concave in a paraxial region thereof, the object-side surface of the third lens element is concave in a paraxial region thereof, the fourth lens element has positive refractive power, the object-side surface of the fourth lens element is convex in a paraxial region thereof, the image-side surface of the fourth lens element is concave in a paraxial region thereof, the object-side surface of the fifth lens element is convex in a paraxial region thereof, and at least one surface of at least one lens element in the optical imaging lens assembly has at least one critical point in an off-axis region thereof;

wherein a curvature radius of the image-side surface of the first lens element is R2, a curvature radius of the object-side surface of the second lens element is R3, a curvature radius of the object-side surface of the third lens element is R5, a central thickness of the third lens element is CT3, and the following conditions are satisfied:

$$R3/R2 < -1.1; \text{ and}$$

$$-25 < R5/CT3 < -5.0.$$

2. The optical imaging lens assembly of claim 1, wherein the curvature radius of the image-side surface of the first lens element is R2, the curvature radius of the object-side surface of the second lens element is R3, the curvature radius of the object-side surface of the third lens element is R5, the central thickness of the third lens element is CT3, and the following conditions are satisfied:

$$-9.0 < R3/R2 < -1.2; \text{ and}$$

$$-20 < R5/CT3 < -5.0.$$

3. The optical imaging lens assembly of claim 2, wherein the curvature radius of the image-side surface of the first lens element is R2, the curvature radius of the object-side surface of the second lens element is R3, the curvature radius of the object-side surface of the third lens element is R5, the central thickness of the third lens element is CT3, and the following conditions are satisfied:

$$-5.12 \le R3/R2 \le -1.39; \text{ and}$$

$$-12.14 \le R5/CT3 \le -6.57.$$

4. The optical imaging lens assembly of claim 1, wherein a central thickness of the first lens element is CT1, a central thickness of the second lens element is CT2, the central thickness of the third lens element is CT3, a central thickness of the fourth lens element is CT4, a central thickness of the fifth lens element is CT5, and the following condition is satisfied:

$$1.0 < (CT1 + CT2 + CT4 + CT5)/CT3 < 4.5.$$

5. The optical imaging lens assembly of claim 1, wherein the central thickness of the third lens element is CT3, a distance in parallel with an optical axis between a maximum effective radius position of the object-side surface of the third lens element and a maximum effective radius position of the image-side surface of the third lens element is ET3, and the following condition is satisfied:

$$1.3 < CT3/ET3 < 2.4.$$

6. The optical imaging lens assembly of claim 1, wherein a curvature radius of the image-side surface of the fourth lens element is R8, a curvature radius of the object-side surface of the fifth lens element is R9, and the following condition is satisfied:

$$6.5 < R8/R9 < 14.$$

7. The optical imaging lens assembly of claim 1, wherein a composite focal length of the first lens element and the second lens element is f12, a composite focal length of the third lens element, the fourth lens element and the fifth lens element is f345, and the following condition is satisfied:

$$0.25 < f12/f345 < 2.5.$$

8. The optical imaging lens assembly of claim 1, wherein the second lens element has negative refractive power;
wherein a focal length of the second lens element is f2, a focal length of the fourth lens element is f4, and the following condition is satisfied:

$$f2/f4 < -0.80.$$

9. The optical imaging lens assembly of claim 1, wherein the image-side surface of the third lens element is convex in a paraxial region thereof;
wherein the curvature radius of the object-side surface of the third lens element is R5, a curvature radius of the image-side surface of the third lens element is R6, a focal length of the third lens element is f3, and the following condition is satisfied:

$$(|R5| + |R6|)/|f3| < 0.60.$$

10. The optical imaging lens assembly of claim 1, wherein a vertical distance between a concave critical point on the object-side surface of the fourth lens element and an optical axis is Yc41, a vertical distance between a convex critical point on the image-side surface of the fourth lens element and the optical axis is Yc42, and the object-side surface of the fourth lens element has at least one concave critical point in an off-axis region thereof and the image-side surface of the fourth lens element has at least one convex critical point in an off-axis region thereof which satisfy the following condition:

$$0.70 < Yc41/Yc42 < 1.2.$$

11. The optical imaging lens assembly of claim 1, wherein half of a maximum field of view of the optical imaging lens assembly is HFOV, a maximum effective radius of the object-side surface of the first lens element is Y11, a maximum effective radius of the image-side surface of the fifth lens element is Y52, and the following conditions are satisfied:

$$42.0 \text{ degrees} < HFOV < 51.0 \text{ degrees};$$

and $$2.7 < Y52/Y11 < 4.0;$$

wherein a vertical distance between a concave critical point on the object-side surface of the fifth lens element and an optical axis is Yc51, a maximum effective radius of the object-side surface of the fifth lens element is Y51, and the object-side surface of the fifth lens element has at least one concave critical point in an off-axis region thereof satisfying the following condition:

$$0.20 < Yc51/Y51 < 0.60.$$

12. An image capturing unit comprising:
the optical imaging lens assembly of claim 1; and
an image sensor disposed on an image surface of the optical imaging lens assembly.
13. An electronic device comprising:
the image capturing unit of claim 12.
14. An optical imaging lens assembly comprising five lens elements, the five lens elements being, in order from an object side to an image side along an optical path, a first lens element, a second lens element, a third lens element, a fourth lens element and a fifth lens element, and each of the five lens elements having an object-side surface facing toward the object side and an image-side surface facing toward the image side;
wherein the image-side surface of the first lens element is concave in a paraxial region thereof, the object-side surface of the second lens element is concave in a paraxial region thereof, the object-side surface of the third lens element is concave in a paraxial region thereof, the fourth lens element has positive refractive power, the object-side surface of the fourth lens element is convex in a paraxial region thereof, the image-side surface of the fourth lens element is concave in a paraxial region thereof, the image-side surface of the fifth lens element is concave in a paraxial region thereof, and at least one surface of at least one lens element in the optical imaging lens assembly has at least one critical point in an off-axis region thereof;

wherein a curvature radius of the image-side surface of the first lens element is R2, a curvature radius of the object-side surface of the second lens element is R3, a curvature radius of the object-side surface of the third lens element is R5, a central thickness of the third lens element is CT3, and the following conditions are satisfied:

$$R3/R2 < -1.1;$$

and $$-16 < R5/CT3 < -5.0.$$

15. The optical imaging lens assembly of claim 14, wherein an Abbe number of the first lens element is V1, an Abbe number of the second lens element is V2, an axial distance between the object-side surface of the first lens element and an image surface is TL, a maximum image height of the optical imaging lens assembly is ImgH, an f-number of the optical imaging lens assembly is Fno, and the following conditions are satisfied:

$$2.85 < V1/V2 < 4.50;$$

$$1.1 < TL/ImgH < 1.5;$$

and $$1.5 < Fno < 2.5.$$

16. The optical imaging lens assembly of claim 14, wherein a central thickness of the second lens element is CT2, the central thickness of the third lens element is CT3, a central thickness of the fourth lens element is CT4, an axial distance between the second lens element and the third lens element is T23, an axial distance between the third lens element and the fourth lens element is T34, and the following condition is satisfied:

$$4.0 < (CT2 + CT3 + CT4)/(T23 + T34) < 15.$$

17. The optical imaging lens assembly of claim 14, wherein the central thickness of the third lens element is CT3, a central thickness of the fourth lens element is CT4, and the following condition is satisfied:

$$1.1 < CT3/CT4 < 3.5.$$

18. The optical imaging lens assembly of claim 14, wherein a focal length of the third lens element is f3, a focal length of the fourth lens element is f4, a focal length of the fifth lens element is f5, and the following condition is satisfied:

$$0 < f4/(|f3| + |f5|) < 0.12.$$

19. The optical imaging lens assembly of claim 14, wherein the first lens element has positive refractive power, and the object-side surface of the first lens element is convex in a paraxial region thereof;
wherein a curvature radius of the object-side surface of the first lens element is R1, the curvature radius of the image-side surface of the first lens element is R2, a curvature radius of the object-side surface of the fourth lens element is R7, a curvature radius of the image-side surface of the fourth lens element is R8, a focal length of the first lens element is f1, and the following conditions are satisfied:

$$1.0 < (R1 + R2)/f1 < 2.3;$$

and $$-3.0 < (R7 + R8)/(R7 - R8) < -1.4.$$

20. The optical imaging lens assembly of claim 14, wherein the second lens element has negative refractive power;
wherein the curvature radius of the object-side surface of the second lens element is R3, a focal length of the second lens element is f2, and the following condition is satisfied:

$$0 < R3/f2 < 6.0.$$

21. The optical imaging lens assembly of claim 14, wherein a maximum effective radius of the image-side surface of the fifth lens element is Y52, a curvature radius of the image-side surface of the fifth lens element is R10, and the following condition is satisfied:

$$3.5 < Y52/R10 < 4.5;$$

wherein a vertical distance between a convex critical point on the image-side surface of the fifth lens element and an optical axis is Yc52, and the image-side surface of the fifth lens element has at least one convex critical point in an off-axis region thereof satisfying the following condition:

$$0.30 < Yc52/Y52 < 0.70.$$

* * * * *